(12) United States Patent
Mahgerefteh et al.

(10) Patent No.: US 10,261,251 B2
(45) Date of Patent: Apr. 16, 2019

(54) TWO-STAGE ADIABATICALLY COUPLED PHOTONIC SYSTEMS

(71) Applicant: FINISAR CORPORATION, Sunnyvale, CA (US)

(72) Inventors: Daniel Mahgerefteh, Los Angeles, CA (US); Bryan Park, Sunnyvale, CA (US); Jianxiao Chen, Fremont, CA (US); Xiaojie Xu, Pleasanton, CA (US); Gilles P. Denoyer, San Jose, CA (US); Bernd Huebner, Mountain View, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 15/692,793

(22) Filed: Aug. 31, 2017

(65) Prior Publication Data

US 2017/0363808 A1   Dec. 21, 2017

Related U.S. Application Data

(62) Division of application No. 14/938,807, filed on Nov. 11, 2015, now Pat. No. 10,001,599.

(Continued)

(51) Int. Cl.
*G02B 6/12* (2006.01)
*G02B 6/122* (2006.01)
(Continued)

(52) U.S. Cl.
CPC ........... *G02B 6/1228* (2013.01); *G02B 6/124* (2013.01); *G02B 6/125* (2013.01); *G02B 6/126* (2013.01);
(Continued)

(58) Field of Classification Search
CPC .. G02B 6/1228; G02B 6/1221; G02B 6/1223; G02B 6/124; G02B 6/125; G02B 6/126;
(Continued)

(56) References Cited

U.S. PATENT DOCUMENTS 6,730,944 B1   5/2004   Tandon et al.
7,532,784 B2   5/2009   Tolshikhin et al.
(Continued)

FOREIGN PATENT DOCUMENTS

EP   0389172 A2   9/1990
EP   0561672 A1   9/1993
(Continued)

OTHER PUBLICATIONS

European Communication, as issued in connection with European Application No. 15797781.0, dated Jun. 27, 2017, 2 pgs.
(Continued)

*Primary Examiner* — Jerry M Blevins
(74) *Attorney, Agent, or Firm* — Maschoff Brennan

(57) ABSTRACT

In an example, a photonic system includes a Si PIC with a Si substrate, a $SiO_2$ box formed on the Si substrate, a first layer, and a second layer. The first layer is formed above the $SiO_2$ box and includes a SiN waveguide with a coupler portion at a first end and a tapered end opposite the first end. The second layer is formed above the $SiO_2$ box and vertically displaced above or below the first layer. The second layer includes a Si waveguide with a tapered end aligned in two orthogonal directions with the coupler portion of the SiN waveguide such that the tapered end of the Si waveguide overlaps in the two orthogonal directions and is parallel to the coupler portion of the SiN waveguide. The tapered end of the SiN waveguide is configured to be adiabatically coupled to a coupler portion of an interposer waveguide.

23 Claims, 50 Drawing Sheets

Related U.S. Application Data

(60) Provisional application No. 62/078,259, filed on Nov. 11, 2014, provisional application No. 62/120,194, filed on Feb. 24, 2015, provisional application No. 62/181,679, filed on Jun. 18, 2015, provisional application No. 62/238,542, filed on Oct. 7, 2015.

(51) Int. Cl.

| | | |
|---|---|---|
| *G02B 6/136* | (2006.01) | |
| *G02B 6/124* | (2006.01) | |
| *G02B 6/126* | (2006.01) | |
| *G02B 6/27* | (2006.01) | |
| *G02B 6/125* | (2006.01) | |
| G02B 6/30 | (2006.01) | |
| G02B 6/42 | (2006.01) | |

(52) U.S. Cl.
CPC ......... *G02B 6/1221* (2013.01); *G02B 6/1223* (2013.01); *G02B 6/136* (2013.01); *G02B 6/2726* (2013.01); *G02B 6/2773* (2013.01); G02B 6/305 (2013.01); G02B 6/4208 (2013.01); G02B 6/4215 (2013.01); G02B 2006/12038 (2013.01); G02B 2006/12061 (2013.01); G02B 2006/12069 (2013.01); G02B 2006/12097 (2013.01); G02B 2006/12121 (2013.01); G02B 2006/12123 (2013.01); G02B 2006/12147 (2013.01); G02B 2006/12157 (2013.01); G02B 2006/12164 (2013.01)

(58) Field of Classification Search
CPC .... G02B 6/136; G02B 6/2726; G02B 6/2773; G02B 6/305; G02B 6/4208; G02B 6/4215; G02B 2006/12038; G02B 2006/12061; G02B 2006/12069; G02B 2006/12097; G02B 2006/12121; G02B 2006/12123; G02B 2006/12147; G02B 2006/12157; G02B 2006/12164
USPC .......................................................... 385/11
See application file for complete search history.

(56) References Cited

U.S. PATENT DOCUMENTS

| | | | |
|---|---|---|---|
| 8,041,164 | B2 | 10/2011 | Granestrand et al. |
| 8,837,885 | B2 | 9/2014 | Seo et al. |
| 2003/0081902 | A1 | 5/2003 | Blauvelt et al. |
| 2004/0240767 | A1 | 12/2004 | Kimura et al. |
| 2009/0297093 | A1 | 12/2009 | Webster et al. |
| 2009/0324163 | A1 | 12/2009 | Dougherty et al. |
| 2012/0093456 | A1 | 4/2012 | Taillaert et al. |
| 2013/0032281 | A1 | 2/2013 | Van Den Berg et al. |
| 2013/0322813 | A1 | 12/2013 | Grondin et al. |
| 2014/0140655 | A1 | 5/2014 | Chakravarty et al. |
| 2014/0270620 | A1 | 9/2014 | Anderson et al. |
| 2015/0316720 | A1 | 11/2015 | Yang et al. |
| 2015/0338577 | A1 | 11/2015 | Shi et al. |
| 2016/0018601 | A1 | 1/2016 | Gardes et al. |
| 2016/0047983 | A1 | 2/2016 | Collins et al. |
| 2017/0075063 | A1* | 3/2017 | Brouckaert ............ G02B 6/126 |

FOREIGN PATENT DOCUMENTS

| | | |
|---|---|---|
| EP | 2664949 A2 | 11/2013 |
| JP | 02-195309 | 8/1990 |
| JP | 05216079 A | 8/1993 |
| JP | 2003-510656 | 3/2003 |
| JP | 2003-282569 | 10/2003 |
| JP | 2005-115117 | 4/2005 |
| JP | 2006-023385 | 1/2006 |
| JP | 2006-047462 | 2/2006 |
| JP | 2007-052328 | 3/2007 |
| JP | 2014-081587 | 5/2014 |
| JP | 2014-191301 | 10/2014 |
| KR | 10-2013-0104838 A | 9/2013 |
| WO | 01/88577 A1 | 11/2001 |
| WO | 2009106139 A1 | 9/2009 |
| WO | 2009106140 A1 | 9/2009 |
| WO | 2014/112077 | 7/2014 |

OTHER PUBLICATIONS

European Communication, as issued in connection with European Application No. 15801046.2, dated Jun. 23, 2017, 2 pgs.
Korean Preliminary Rejection, as issued in connection with Korean Application No. 10-2017-7016051, dated Jul. 18, 2017, 12 pgs.
Korean Preliminary Rejection, as issued in connection with Korean Application No. 10-2017-7016051, dated Nov. 16, 2017, 6 pgs.
International Search Report and Written Opinion, as issued in connection with International Patent Application No. PCT/US2015/060223, dated May 23, 2016, 13 pgs.
International Search Report and Written Opinion, as issued in connection with International Patent Application No. PCT/US2015/060224, dated May 13, 2016, 11 pgs.
Shani et al., "Integrated Optic Adiabatic Devices on Silicon", IEEE Journal of Quantum Electronics, vol. 27, No. 3, Mar. 1991, pp. 556-566.
Shani et al., "Integrated Optic Adiabatic Polarization Splitter on Silicon", Applied Physics Letters, American Institute of Physics, vol. 56, No. 2, Jan. 8, 1990, pp. 120-121.
Korean Preliminary Rejection, as issued in connection with Korean Application No. 10-2017-7016050, dated Jun. 12, 2018, 22 pgs.

* cited by examiner

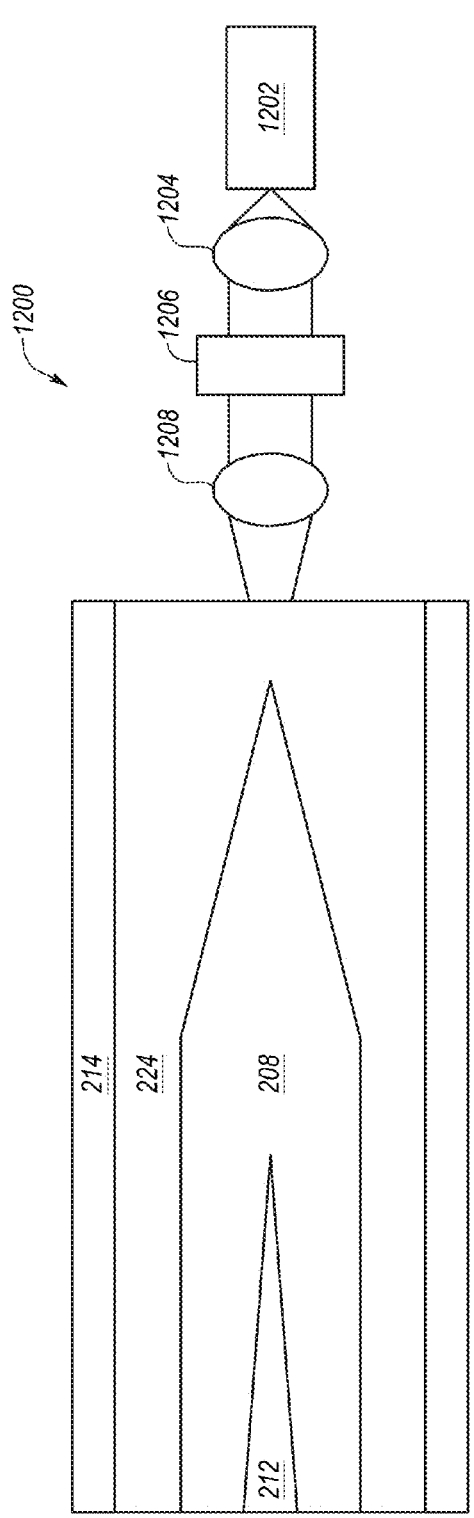
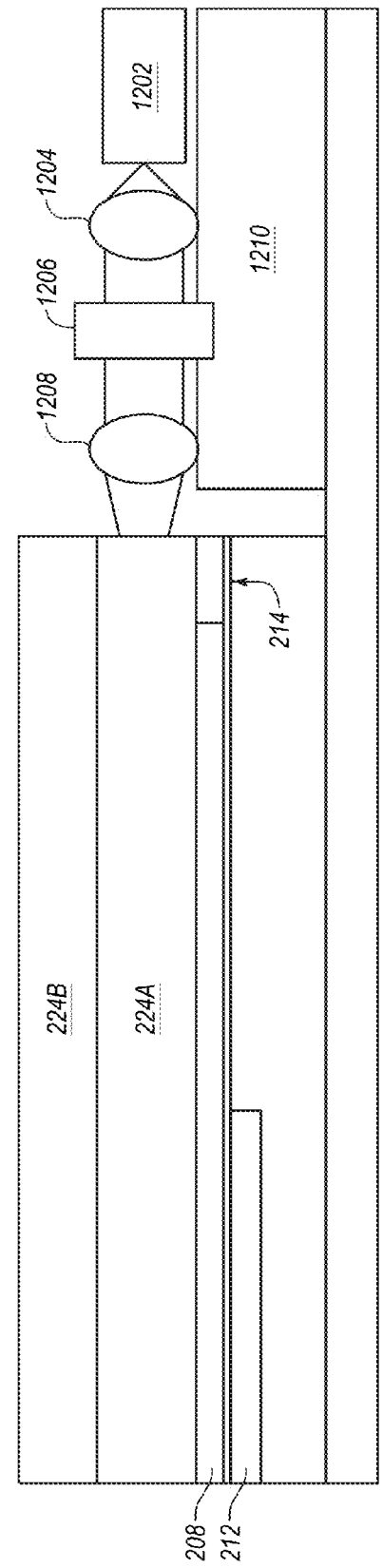
FIG. 12A
FIG. 12B

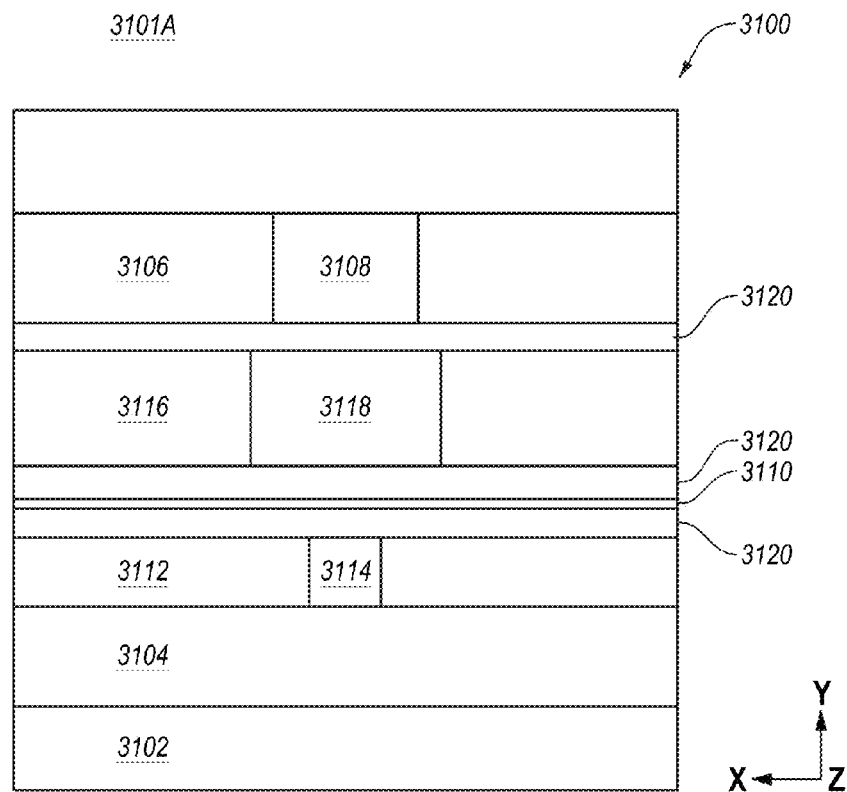
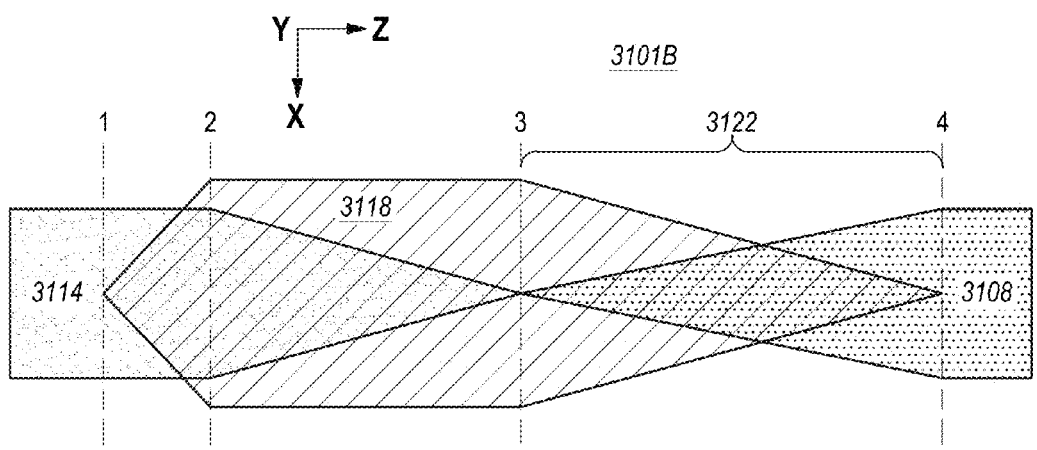
FIG. 31A

| 3302 | | First Region 3216 | Second Region 3218 |
|---|---|---|---|
| | Length | 90μm | 10μm |
| | Si Waveguide Width | 0.08μm →1.5μm | 1.5μm |
| | SiN Waveguide Width | 2μm | 2μm →0.2μm |
| 3304 | | TE00 | TM00 | TE01 | TM01 |
|---|---|---|---|---|---|
| | Transmission | 0.99 | 0.98 | 0.97 | 0.95 |
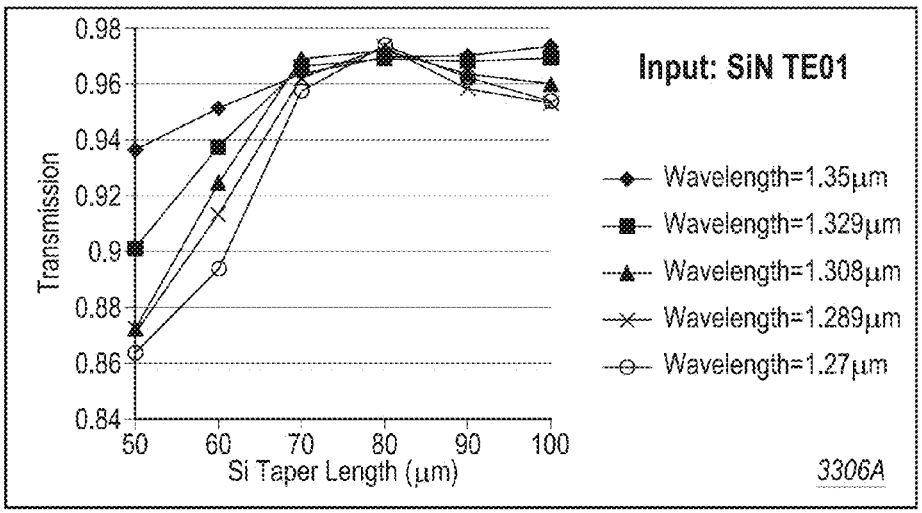
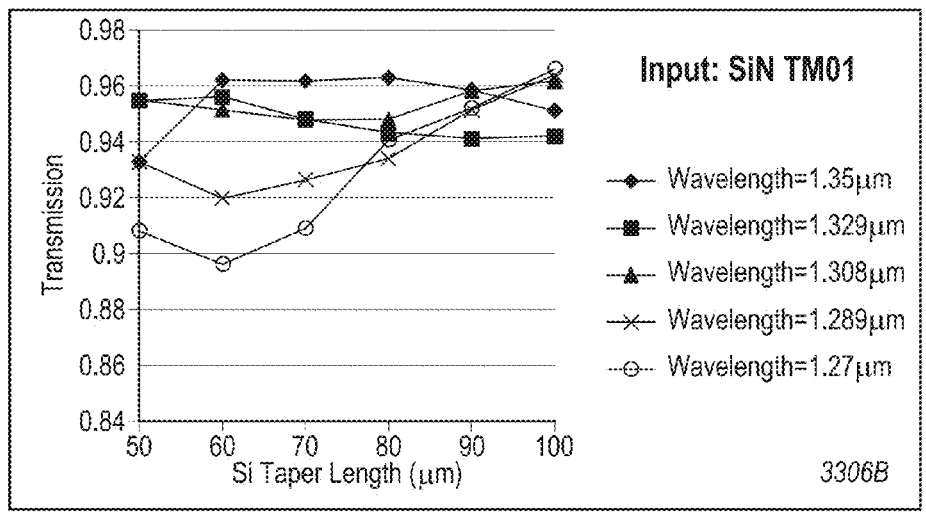
FIG. 33A

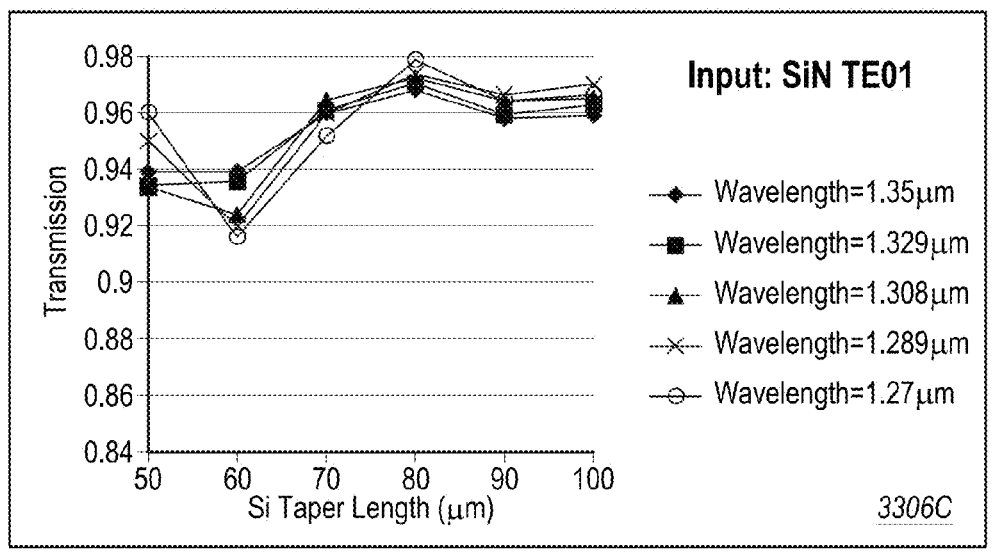
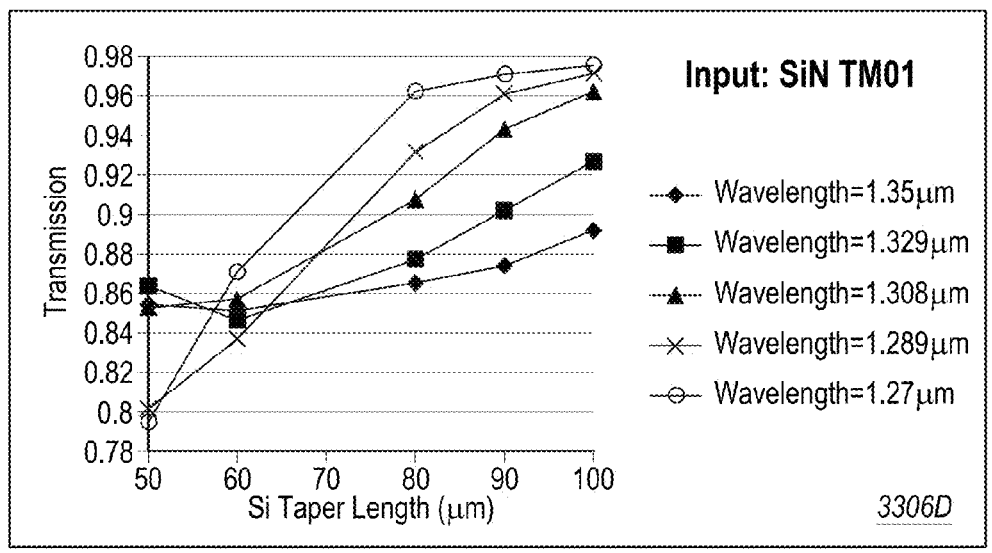
FIG. 33B

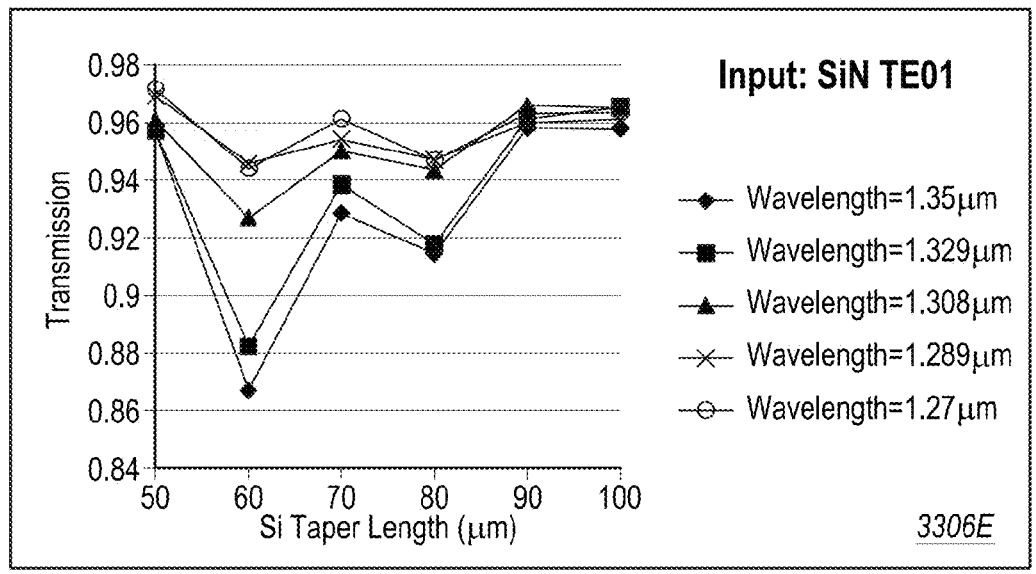
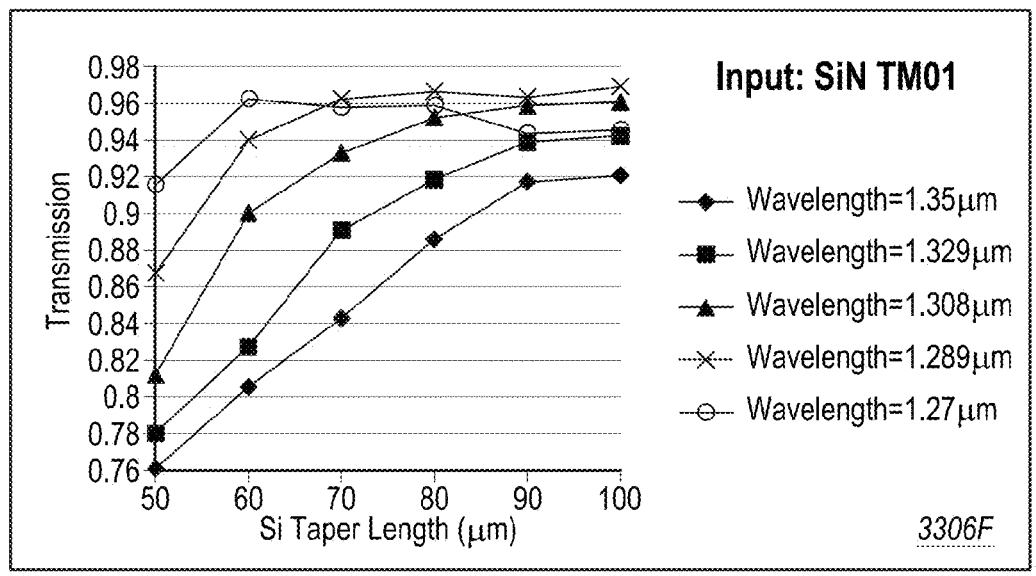
FIG. 33C

| | First Region 3216 | Second Region 3218 |
|---|---|---|
| Length | 100μm | 10μm |
| Si Waveguide Width | 0.08μm →1.5μm | 1.5μm |
| SiN Waveguide Width | 2.5μm | 2.5μm →0.2μm |
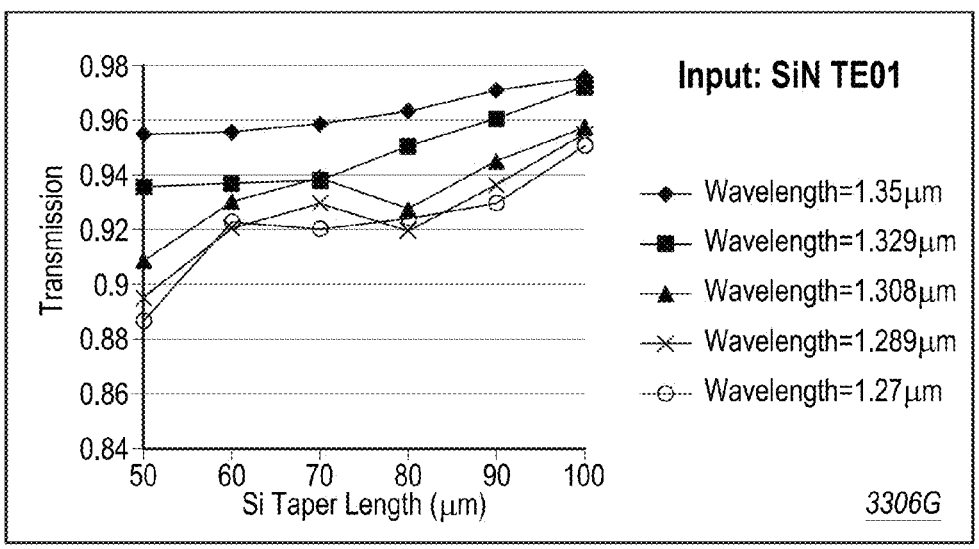
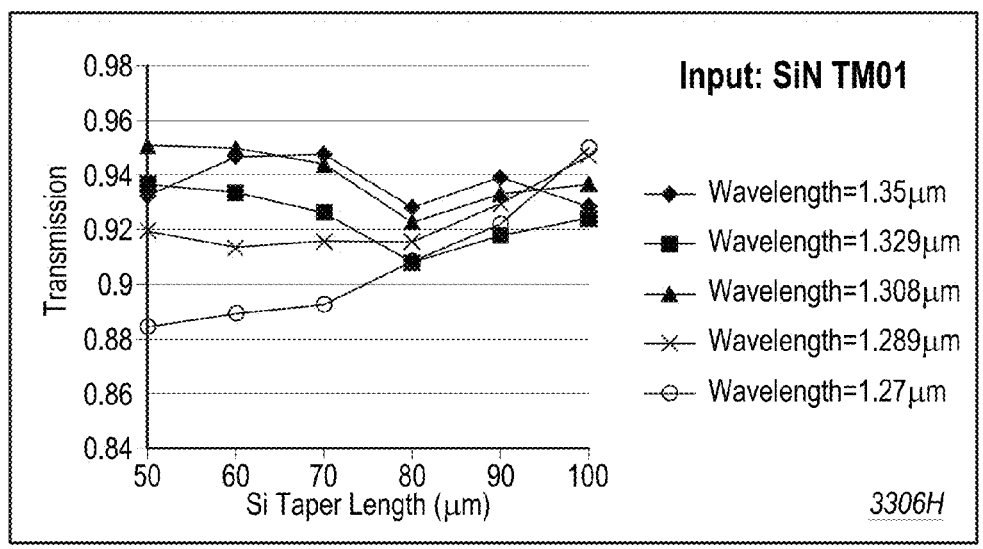
FIG. 33D

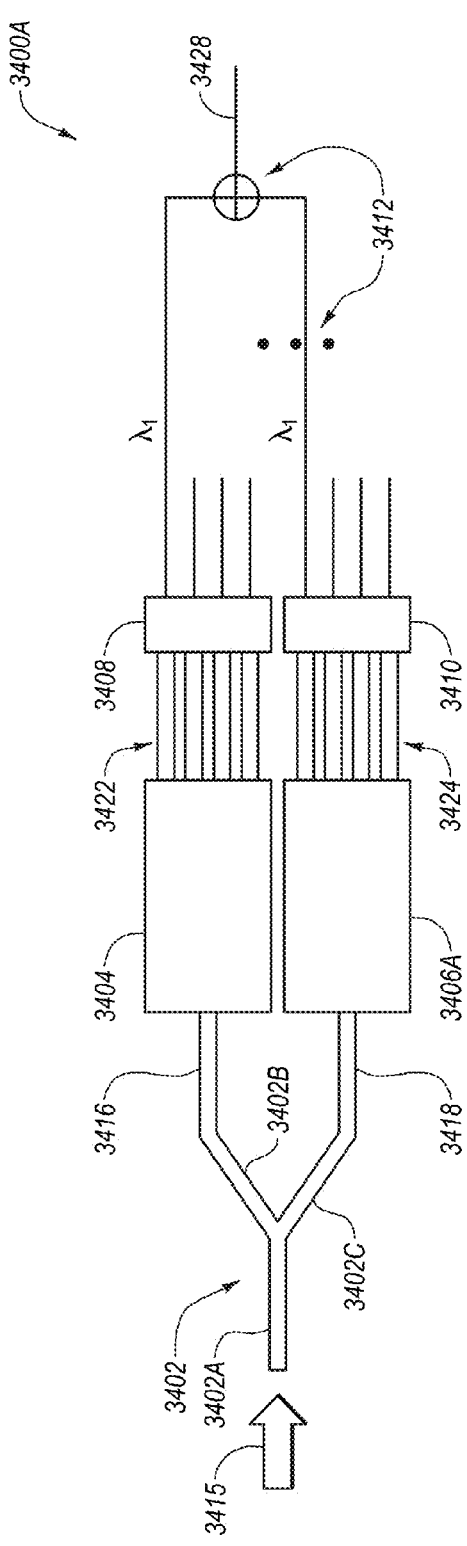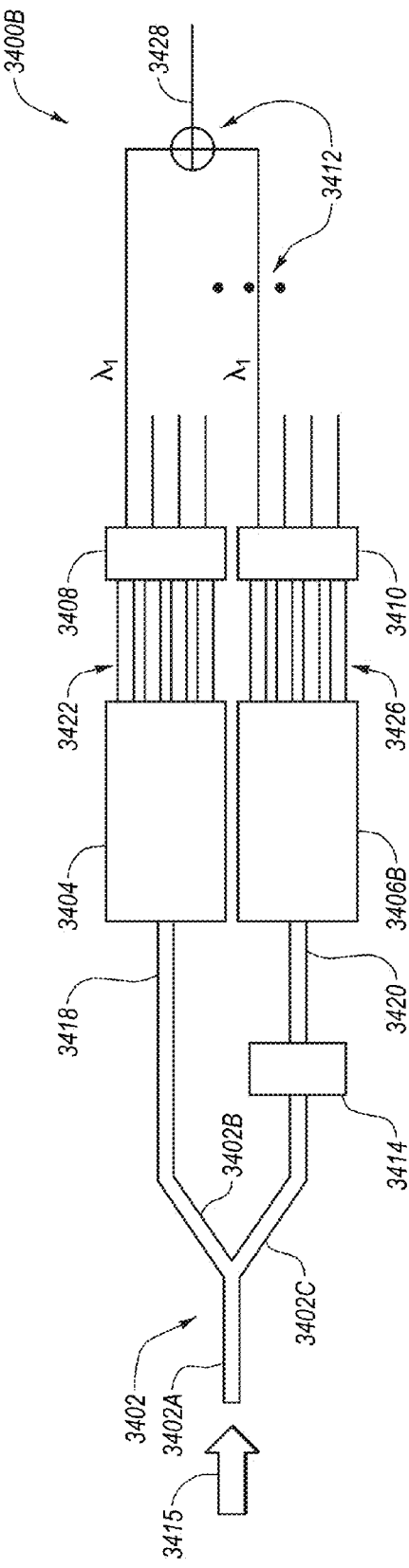
FIG. 34A
FIG. 34B

TWO-STAGE ADIABATICALLY COUPLED PHOTONIC SYSTEMS

CROSS-REFERENCE TO RELATED APPLICATIONS

The present application is a divisional of U.S. application Ser. No. 14/938,807, filed on Nov. 11, 2015, which claims the benefit of and priority to U.S. Provisional Patent Application No. 62/078,259, filed on Nov. 11, 2014, U.S. Provisional Patent Application No. 62/120,194, filed on Feb. 24, 2015, U.S. Provisional Patent Application No. 62/181,679, filed on Jun. 18, 2015, and U.S. Provisional Patent Application No. 62/238,542, filed on Oct. 7, 2015. The foregoing applications are incorporated herein by reference.

FIELD

The embodiments discussed herein are related to two-stage adiabatically coupled photonic systems.

BACKGROUND

Unless otherwise indicated herein, the materials described herein are not prior art to the claims in the present application and are not admitted to be prior art by inclusion in this section.

There are two common solutions to couple light into or out of a silicon (Si) photonic integrated circuit (PIC). For example, surface grating couplers on the Si PIC can couple light into or out of the Si PIC. However, many surface grating couplers are highly wavelength dependent and may have a relatively small pass band.

As another example, edge coupling from an edge of the Si PIC may be implemented to couple light into or out of the Si PIC. However, the edge coupling may require that the Si PIC have a cleaved facet and some fabs/manufacturers may be unable or unwilling to test such a process.

The subject matter claimed herein is not limited to implementations that solve any disadvantages or that operate only in environments such as those described above. Rather, this background is only provided to illustrate one example technology area where some implementations described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to two-stage adiabatically coupled photonic systems.

In an example embodiment, a photonic system includes a Si PIC that includes a Si substrate, a silicon dioxide ($SiO_2$) box, a first layer, and a second layer. The $SiO_2$ box may be formed on the Si substrate. The first layer may be formed above the $SiO_2$ box and may include a SiN waveguide with a coupler portion at a first end and a tapered end opposite the first end. The second layer may be formed above the $SiO_2$ box and vertically displaced above or below the first layer. The second layer may include a Si waveguide with a tapered end aligned in two orthogonal directions with the coupler portion of the SiN waveguide such that the tapered end of the Si waveguide overlaps in the two orthogonal directions and is parallel to the coupler portion of the SiN waveguide. The two orthogonal directions may correspond to a length direction and a width direction of the Si and SiN waveguides. The Si PIC may define an etched window through one or more layers above the first layer down to the first layer at least above the tapered end of the SiN waveguide. The etched window may be configured to receive at least a portion of an interposer that includes an interposer waveguide with a coupler portion configured to be positioned above the tapered end of the SiN waveguide and aligned in the two orthogonal dimensions with the tapered end of the SiN waveguide such that the coupler portion of the interposer waveguide overlaps in the two orthogonal directions and is parallel to the tapered end of the SiN waveguide.

In another example embodiment, a Si PIC includes a Si substrate, a $SiO_2$ box, a first layer, and a second layer. The $SiO_2$ box may be formed on the Si substrate. The first layer may be formed above the $SiO_2$ box and may include a SiN waveguide with a coupler portion at a first end and a tapered end opposite the first end. The second layer may be formed above the $SiO_2$ box and below the first layer and may include a Si waveguide with a tapered end aligned in two orthogonal directions with the coupler portion of the SiN waveguide such that the tapered end of the Si waveguide overlaps in the two orthogonal directions and is parallel to the coupler portion of the SiN waveguide. The two orthogonal directions may correspond to a length direction and a width direction of the Si and SiN waveguides. In a vertical direction that is orthogonal to a plane defined by the two orthogonal directions, a total thickness of all layers of the Si PIC between a top of the Si substrate and a bottom of the first layer that includes the SiN waveguide may be at least 1.2 micrometers.

In another example embodiment, a Si PIC includes a Si substrate, a $SiO_2$ box, a first layer, a second layer, and a third layer. The $SiO_2$ box may be formed on the Si substrate. The first layer may be formed above the $SiO_2$ box and may include a SiN waveguide with a tapered end. The second layer may be formed above the $SiO_2$ box and below the first layer and may include a Si waveguide with a tapered end. The third layer may be formed between the first layer and the second layer and may include a SiN transition waveguide with a coupler portion at a first end and a tapered end opposite the first end. The tapered end of the SiN transition waveguide may be aligned in two orthogonal directions with the tapered end of the SiN waveguide such that the tapered end of the SiN transition waveguide overlaps in the two orthogonal directions and is parallel to the tapered end of the SiN waveguide. The tapered end of the Si waveguide may be aligned in two orthogonal directions with the coupler portion of the SiN transition waveguide such that the tapered end of the Si waveguide overlaps in the two orthogonal directions and is parallel to the coupler portion of the SiN transition waveguide.

In another example embodiment, a Si PIC includes a Si substrate, a $SiO_2$ box, a first layer, and a second layer. The $SiO_2$ box may be formed on the Si substrate. The first layer may be formed above the $SiO_2$ box and may include a SiN waveguide with an untampered end portion and a tapered end that begins where the untampered end portion of the SiN waveguide ends. The second layer may be formed above the $SiO_2$ box and below the first layer and may include a Si waveguide with an untampered end portion and a tapered end that begins where the untampered end portion of the Si waveguide ends. The untampered end portion of the SiN waveguide may be aligned in two orthogonal directions with the tapered end of the Si waveguide such that the untapered end portion of the SiN waveguide overlaps in the two orthogonal directions and is parallel to the tapered end of the Si waveguide. The tapered end of the SiN waveguide may be aligned in the two orthogonal directions with the untapered end portion of the Si waveguide such that the tapered end of the SiN waveguide overlaps in the two orthogonal directions and is parallel to the untapered end portion of the Si waveguide. The Si waveguide and the SiN waveguide may be configured to exchange therebetween a multimode optical signal.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 12A and 12B include an overhead view and a longitudinal cross-sectional view of another example optoelectronic system (hereinafter "system");

FIG. 31A illustrates another example Si PIC;

FIGS. 33A-33D include various simulations for the coupler of FIG. 32 with various different sets of parameters;

FIGS. 34A and 34B illustrate embodiments of a demultiplexer system (collectively "demultiplexer systems");

DETAILED DESCRIPTION OF SOME EXAMPLE EMBODIMENTS

Figure 1:
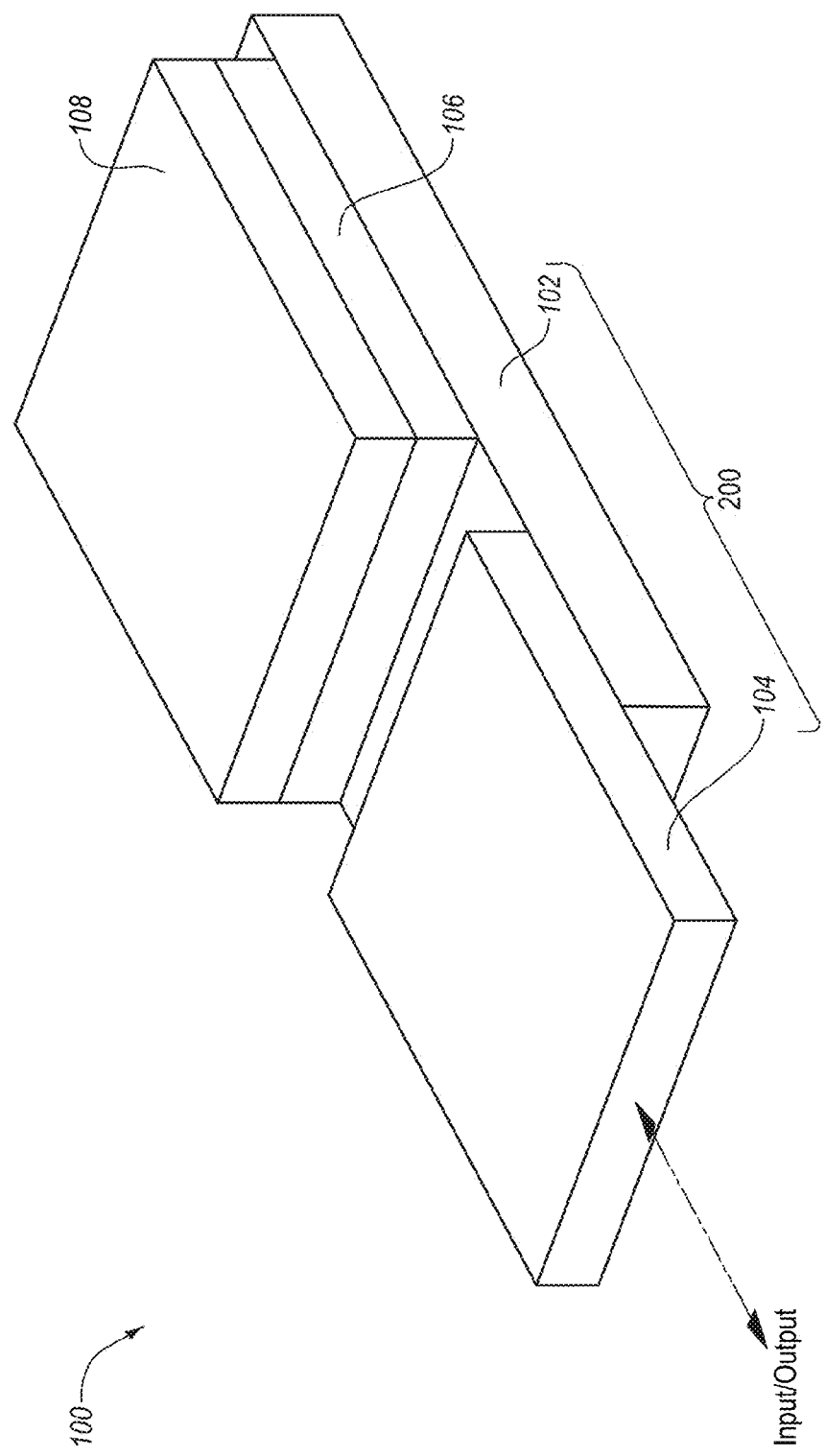
FIG. 1 is a perspective view of an example optoelectronic system (hereinafter "system")

Some embodiments described herein generally relate to adiabatic coupling of light from a silicon (Si) waveguide to an intermediate silicon nitride ($Si_xN_y$, generically referred to herein as SiN) waveguide and then from the SiN waveguide to an interposer waveguide (e.g., polymer or high index glass waveguide), or vice versa. For ease of reference in the discussion that follows, the adiabatic coupling is often discussed in the context of a single Si waveguide-to-SiN waveguide-to-interposer waveguide coupling with the understanding that multiple such couplings may be included in a given system.

The Si waveguide may have a first optical mode size, the SiN waveguide may have a second optical mode size substantially larger than the first optical mode size, and the polymer or other interposer waveguide may have a third optical mode size substantially larger than the second mode size. For example, the first optical mode size may be about 0.3 µm, or in a range between 0.25 µm and 0.5 µm; the second optical mode size may be about 1 µm, or in a range between 0.7 µm and 3 µm; and the third optical mode size may be about 10 µm, or in a range between 8 µm and 12 µm. The third optical mode size may be substantially similar to an optical mode size of a standard single mode optical fiber. For example, a standard single mode optical fiber may have an optical mode size of about 10 µm, which is substantially similar to the third optical mode size.

The Si waveguide may be inverse tapered to a width of about 80 nanometers (nm) to increase a size of the light mode and bring it out into a cladding of the Si waveguide. The SiN waveguide may be fabricated on a Si photonic integrated circuit (PIC) that includes the Si waveguide. The SiN waveguide may receive the light from the Si inverse taper. Similar to the Si waveguide, the SiN waveguide may be inverse tapered to a width of 80-300 nm. The interposer waveguide with approximately a 3-8 (µm) core may be placed in close optical contact with the SiN waveguide. Light from the Si waveguide inverse taper may be adiabatically coupled to the SiN waveguide and then to the interposer waveguide in steps along the direction of propagation and may be completely or substantially completely translated to it. The interposer waveguide may be processed on a separate rigid or flexible substrate and may be attached to the SiN waveguide using various techniques including thermomechanical attachment, or by use of index matching adhesive. The Si PIC may include modulators, waveguides, detectors, couplers, and other optical components in a Si on Insulator (e.g., silicon on silicon dioxide ($SiO_2$) box layer) on Si substrate. An integrated circuit (IC) may be flip chip bonded (e.g., by copper pillar) on the Si PIC in a portion of the Si PIC away from a coupling region where the SiN waveguide and interposer waveguide may be located. The interposer waveguide may be included in an interposer that may be transparent and/or have that may have alignment marks to allow ease in optical alignment of the SiN waveguide on the Si PIC with the interposer waveguide on the interposer. The interposer waveguide and the SiN waveguide can be aligned either passively or actively.

The SiN waveguide or waveguides may be defined in a fabrication process of the Si PIC to which a $SiN/SiO_2$ layer section is added for coupling and passive functions. A standard Si photonic stack layer has a Si substrate, $SiO_2$ oxide layer (called BOX or $SiO_2$ box), and Si waveguide layer in which Si waveguides are surrounded by $SiO_2$ cladding to confine the light. Embodiments described herein may add a SiN layer to this standard stack for two stage coupling and optionally passive optical functions. The SiN layer has regions of SiN core waveguides surrounded by $SiO_2$ cladding to confine the light. SiN has an intermediate index of refraction between indexes of refraction of Si and polymer and so allows efficient adiabatic coupling between the two layers with taper widths that are within critical dimensions of some standard complementary metal-oxide-semiconductor (CMOS) fabs. The low loss of SiN and the lower core/cladding index difference of SiN relative to $SiO_2$ cladding compared to that of Si and $SiO_2$ allows fabrication of passive components with better performance. For example wavelength division multiplexers (WDM mux) and demultiplexers (WDM demux) in SiN have higher channel isolation than in Si. In addition, passive components in SiN have a 5× smaller drift of peak wavelengths with temperature relative to the same in Si.

In some embodiments, transmit (TX) and receive (RX) Si waveguides on the Si PIC may be in one plane or accessible at one planar interface of the Si PIC whereas an MT connector for parallel single mode fibers can have configurations by multisource agreement (MSA) in which a TX array is in one row and a RX array is in a row below it. It may also be possible for both TX and RX to be in the same row but separated. Embodiments described herein include a an interposer that can connect from SiN waveguide inputs/outputs in a plane of the Si PIC and present to, e.g., an MT connector, two vertically separated rows of inputs/outputs.

In some embodiments, wavelength division multiplexing or other passive optical functions may be integrated in a same $SiN/SiO_2$ layer in which the SiN waveguide is formed. Use of the $SiN/SiO_2$ layer may be advantageous as compared to implementing such optical functions in other layers and/or materials in that it may provide lower loss, better channel isolation due to lower loss in SiN and smaller index difference between core and cladding.

Some embodiments described herein may be wavelength independent over a range of operation. For instance, some embodiments described herein may be wavelength independent over a range of operation of 1310 nm standard long reach (LR) standards, whereas surface grating couplers may have a relatively narrow 20-30 nm pass band.

The Si waveguide and the SiN waveguide are included in different layers of the Si PIC. The Si waveguide may include Si as the waveguide core surrounded by $SiO_2$ as the waveguide cladding. Similarly, the SiN waveguide may include SiN as the waveguide core surrounded by $SiO_2$ as the waveguide cladding.

In some embodiments, the layer of the Si PIC that includes the SiN waveguide is below the layer of the Si PIC that includes the Si waveguide and below the interposer waveguide. To make the fabrication of the Si/SiO$_2$ with SiN/SiO$_2$ compatible with a standard Si photonic process, which currently may not include a layer for the SiN waveguide, it may be possible to use wafer bonding to fabricate a structure with fully processed Si (so called Front End of Line (FEOL)) and Back End of Line (BEOL) with SiN in a lower layer. Given this structure and a window that can be etched for coupling, the optical coupling between the SiN waveguide and the interposer waveguide can be achieved. As such, light propagating from the Si waveguide to the SiN waveguide to the interposer waveguide may go from the Si waveguide down to the SiN waveguide and then up into the interposer waveguide, where it may then be coupled into an optical fiber or the like, or light may travel on the reverse path. In these and other embodiments, the interposer waveguide can include polymer or a high index glass waveguide having similar cladding refractive index near 1.5.

Whether the layer of the Si PIC that includes the SiN waveguide is below or above the layer of the Si PIC that includes the Si waveguide, the SiN waveguide may be included in a region of the Si PIC that includes a wavelength division multiplexing (WDM) component within the Si PIC. Alternatively or additionally, a SiO$_2$ cladding that surrounds the SiN waveguide may be relatively thick and/or the SiN waveguide may have a square cross-sectional profile to render the SiN waveguide polarization insensitive.

In some embodiments in which the layer of the Si PIC that includes the SiN waveguide is below the layer of the Si PIC that includes the Si waveguide, a semiconductor chip with an indium phosphide (InP)-based gain element or InP-based pin detector may be wafer bonded to the Si PIC above the layer of the Si PIC that includes the Si waveguide. In the case of an InP-based gain element, light emitted by the InP-based gain element may be optically coupled into the Si waveguide, and then into the SiN waveguide, and then into the interposer waveguide, and then into, e.g., an optical fiber. In the case of an InP-based pin detector, light received into the interposer waveguide may be coupled into the SiN waveguide, then into the Si waveguide, and then into the InP-based pin detector.

In some embodiments, a top layer of the Si PIC may include metal 'dummies,' at least in a region that bounds an area to be etched as an etched window for a polymer (or other material) waveguide strip that includes the interposer waveguide, e.g., a polymer waveguide in this example. Metal 'dummies' are arrays of metal filled holes in the dielectric stack that function to produce a mechanically flat surface on average over the wafer after chemical mechanical polishing (CMP) in the BEOL process. They are so called dummies because they do not function as electrical contacts, whereas other metal in the BEOL process functions as electrical connections between various contacts and the output electrical ports of the PIC. The top layer and any intervening layers down to the layer of the Si PIC that includes the SiN waveguide may be etched through down to the layer that includes the SiN waveguide to receive in the etched window the polymer waveguide strip and allow the polymer waveguide to be optically coupled to the SiN waveguide. In some embodiments, polymer ridges, anchor windows, and/or dummy polymer islands may be provided to facilitate alignment and mechanical connection between the Si PIC and a polymer interposer that includes the polymer waveguide.

In some embodiments, WDM components included in the Si PIC may be polarization sensitive. For example, WDM components such as SiN based Echelle gratings may exhibit a polarization-dependent filter function. In particular, the filter function of such WDM components may shift one polarization of light more than another polarization of light which can lead to cross-talk for channels at a receiver. For example, a SiN based Echelle grating may shift TE polarization at a 1310 nm wavelength channel to an output guide that also receives TM polarization at a different wavelength channel, resulting in cross-talk between the two channels.

Accordingly, the Si PIC may additionally include a polarization splitter. In general, the polarization splitter may use an SiN/Si adiabatic coupler that includes two SiN waveguides and at least one Si waveguide with two tapered ends. The tapered ends of the Si waveguide may have tip widths that favor adiabatic coupling of one of two polarizations of light over the other. For example, TM polarization may couple from SiN to Si at a much narrower Si tip width than TE polarization. The Si tip width may be selected to, in general, adiabatically couple TE polarization from the first SiN waveguide through the Si waveguide to the second SiN waveguide, while the TM polarization generally remains in the first SiN waveguide.

In the discussion that follows, numerous embodiments are disclosed. The various embodiments are not mutually exclusive unless context dictates otherwise. For instance, a portion or all of one or more embodiments may be combined with a portion or all of one or more other embodiments unless context dictates otherwise.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1 is a perspective view of an example optoelectronic system 100 (hereinafter "system 100"), arranged in accordance with at least one embodiment described herein. As illustrated, the system 100 includes a Si PIC 102, an interposer 104, a three-dimensional (3D) stack region 106, and a flip chip bonded integrated circuit (IC) 108. The Si PIC 102 and the interposer 104 together form a two-stage adiabatically coupled photonic system 200 (hereinafter "photonic system 200").

In general, the Si PIC 104 may include one or more optical elements, such as a modulator, waveguide, coupler, or other optical element(s) in a Si-on-insulator substrate.

In general, the 3D stack region 106 may provide electrical connections to one or more active optical components of the Si PIC 104. Accordingly, the 3D stack region 106 may include, e.g., metallized pillars, traces, and/or contacts as well as insulative dielectric and/or other materials and elements.

In general, the flip chip bonded IC 108 may include one or more active and/or passive electrical devices that may be communicatively coupled through the 3D stack region 106 to the one or more active optical components of the Si PIC 104.

The interposer 104 may be mechanically coupled to the Si PIC 102. An interposer waveguide of the interposer 104 and a SiN waveguide and Si waveguide of the Si PIC 102 may be configured to adiabatically couple light into or out of the Si PIC 102. As used herein, light may be adiabatically coupled from one optical component or device, which here we call the 'initial state' waveguide to another, here called the final state waveguide, in a transitional interaction region, sometimes referred to herein as an adiabatic coupler region. To transfer optical power from the initial state waveguide to the final state waveguide one or more optical properties of either or both initial and final state waveguides, such as width, height, effective refractive index, etc. are varied along the optical axis. Here the initial state and final state waveguides form one system within the transitional interaction region and light remains in a single mode of the joint system while it physically gets transferred from the initial state waveguide to the final state waveguide. The initial state and final state waveguides may respectively correspond to the Si waveguide and the SiN waveguide, or vice versa. Alternatively or additionally, the initial and final state waveguides may respectively correspond to the SiN waveguide and the interposer waveguide, or vice versa. Alternatively or additionally, two components may be said to be adiabatically coupled together or to each other when the two components are configured as described herein to form an adiabatic coupler region.

Moreover, light is used generically herein to refer to electromagnetic radiation of any suitable wavelength, and may include light with wavelengths of, e.g., about 800-900 nm, 2200-1360 nm, 1360-1460 nm, 1530-1565 nm, or other suitable wavelengths. Light can also have TE or TM polarization.

In these and other implementations, the SiN waveguide in the Si PIC 102 may be aligned with and optically coupled to the Si waveguide in the Si PIC 102. Additionally, the interposer waveguide in the interposer 104 may be aligned with and optically coupled to the SiN waveguide in the Si PIC 102. The Si waveguide may have a first index of refraction n1. The SiN waveguide may have a second index of refraction n2. The interposer waveguide may have a third index of refraction n3. In general, the second index of refraction n2 of the SiN waveguide may be intermediate between the first index of refraction n1 of the Si waveguide and the third index of refraction n3 of the interposer waveguide. In addition, n1>n2>n3. In some embodiments, for a two-stage adiabatically coupled photonic system with three waveguides, each with a corresponding one of the indexes of refraction n1, n2, n3, the first index of refraction n1 may be in a range of 3 to 3.5, the second index of refraction n2 may be in a range of 1.8 to 2.2, and the third index of refraction n3 may be in a range of 1.49 to 1.6.

The interposer waveguide in the interposer 104 may additionally be aligned with and optically coupled to an input and/or output for one or more optical signals. An example input source may include an optical signal source (e.g., a laser), an optical fiber, a fiber end connector, a lens, or other optical component or device from which incoming optical signals (e.g., signals coming toward the Si PIC 102) are provided to the interposer 104 for input to the Si PIC 102. An example output device to which output may be sent may include a laser, an optical receiver (e.g., a photodiode), an optical fiber, a fiber end connector, a lens, or other optical component or device to which outgoing signals (e.g., signals leaving the Si PIC 102) may be provided through the interposer 104. One or more of the active optical components of the Si PIC 102 may generate or otherwise be the source of outgoing signals that are outputted from the photonic system 200 through the Si waveguide, the SiN waveguide, and the interposer waveguide. Alternately or additionally, one or more of the active optical components of the Si PIC 102 may be configured to receive and process incoming signals that are inputted to the photonic system 200 through the interposer waveguide, the SiN waveguide, and the Si waveguide.

Figure 2:
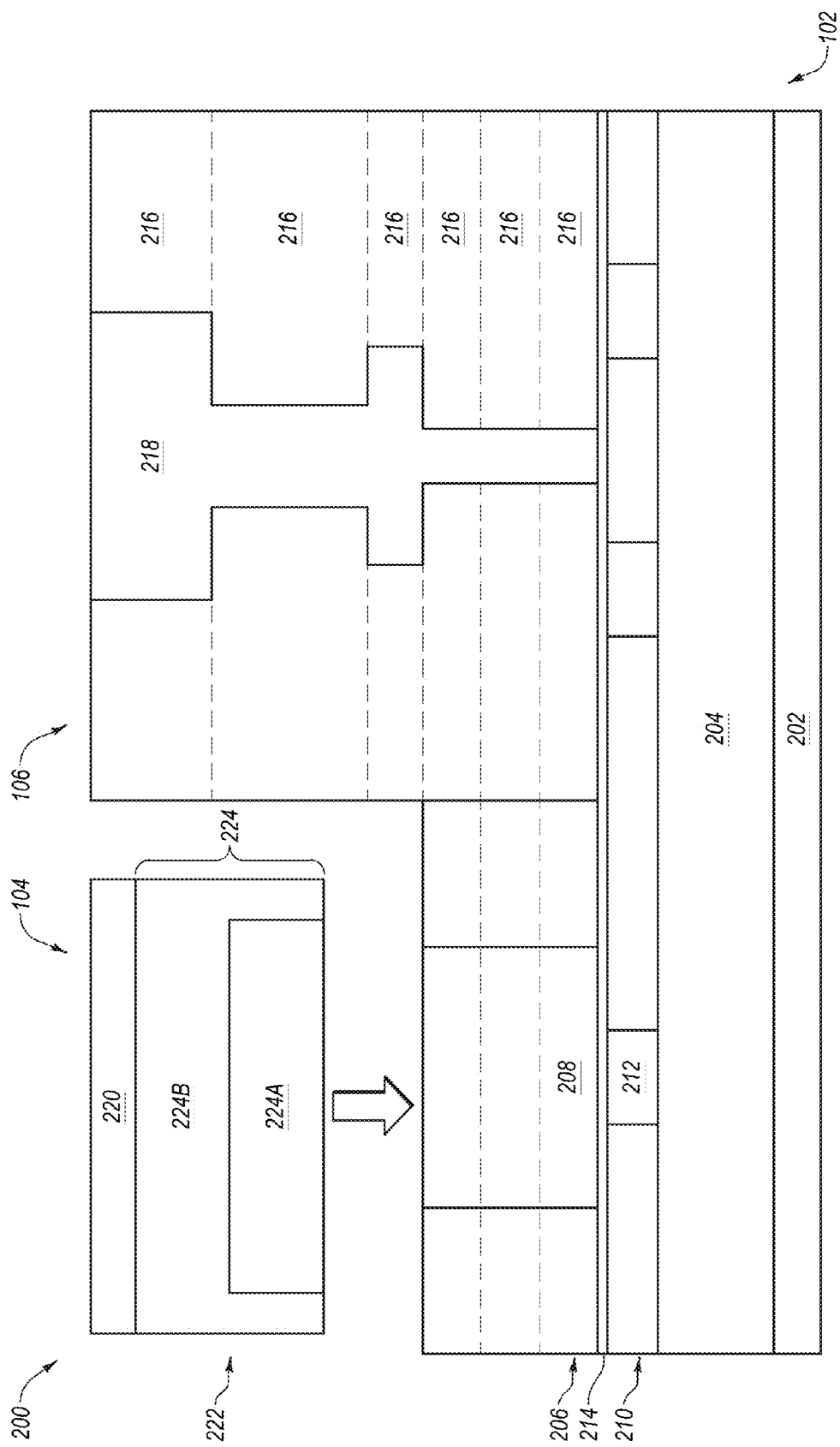
FIG. 2 is a side view of an example two-stage adiabatically coupled photonic system (hereinafter "photonic system") of FIG. 1.

FIG. 2 is a side view of the photonic system 200 of FIG. 1, arranged in accordance with at least one embodiment described herein. The photonic system 200 includes the Si PIC 102 and the interposer 104. FIG. 2 additionally illustrates the 3D stack region 106.

The Si PIC 102 includes a Si substrate 202, a $SiO_2$ box 204, a first layer 206 that includes one or more SiN waveguides 208, and a second layer 210 that includes one or more Si waveguides 212. In the illustrated embodiment, the first and second layer 206 and 210 are both formed above the $SiO_2$ box 204. In particular, the first layer 206 is formed on (or at least above) the second layer 210 and the second layer 210 is formed on (or at least above) the $SiO_2$ box 204. Alternatively or additionally, a slab 214 of SiN may be formed between the first layer 206 and the second layer 210 at least in a region where the Si waveguide 212 is optically coupled to the SiN waveguide 208. In an example embodiment, the SiN waveguide 208 includes $Si_3N_4$ as the waveguide core surrounded on at least two sides along its length by $SiO_2$ or other suitable waveguide cladding.

Although not illustrated in FIG. 2, the Si PIC 102 may further include one or more active optical components formed in the second layer 210. In these and other embodiments, the Si PIC 102 may further include one or more dielectric layers 216 formed on and/or above the second layer 210, and one or more metallized structures 218 formed in the dielectric layers 216. The metallized structures 218 may extend from a top of the Si PIC 102 through the dielectric layers 216 to electrical contact with the active optical components formed in the second layer 210 or elsewhere in the Si PIC 102. The dielectric layers 216 may include $SiO_2$ or other suitable dielectric material. The dielectric layers 216 and the metallized structures 218 are collectively an example of the 3D stack region 106.

With combined reference to FIGS. 1 and 2, the flip chip bonded IC 108 may be flip chip bonded to the 3D stack region 106. The flip chip bonded IC may include one or more active and/or passive electrical devices that may be communicatively coupled through the 3D stack region 123 to the one or more active optical components formed in the second layer 210 of the Si PIC 102.

The interposer 104 may include an interposer substrate 220 and a waveguide strip 222 formed on and/or coupled to the interposer substrate 220. The waveguide strip 222 includes one or more interposer waveguides 224. Each interposer waveguide 224 includes an interposer core 224A and an interposer cladding 224B of different indexes of refraction. A coupler portion of the interposer waveguide 224 may be disposed above a tapered end of the SiN waveguide 208 in the first layer 206 and is aligned with the tapered end of the SiN waveguide 208 as described in more detail below.

The Si waveguide 212 (or more particularly, the core of the Si waveguide 212) may have the first index of refraction m mentioned above. The SiN waveguide 208 (or more particularly, the core of the SiN waveguide 208) may have the second index of refraction m mentioned above. The interposer waveguide 224 (or more particularly, the interposer core 224A of the interposer waveguide 224) may have the third index of refraction m mentioned above, where n1>n2>n3.

Figure 3A:
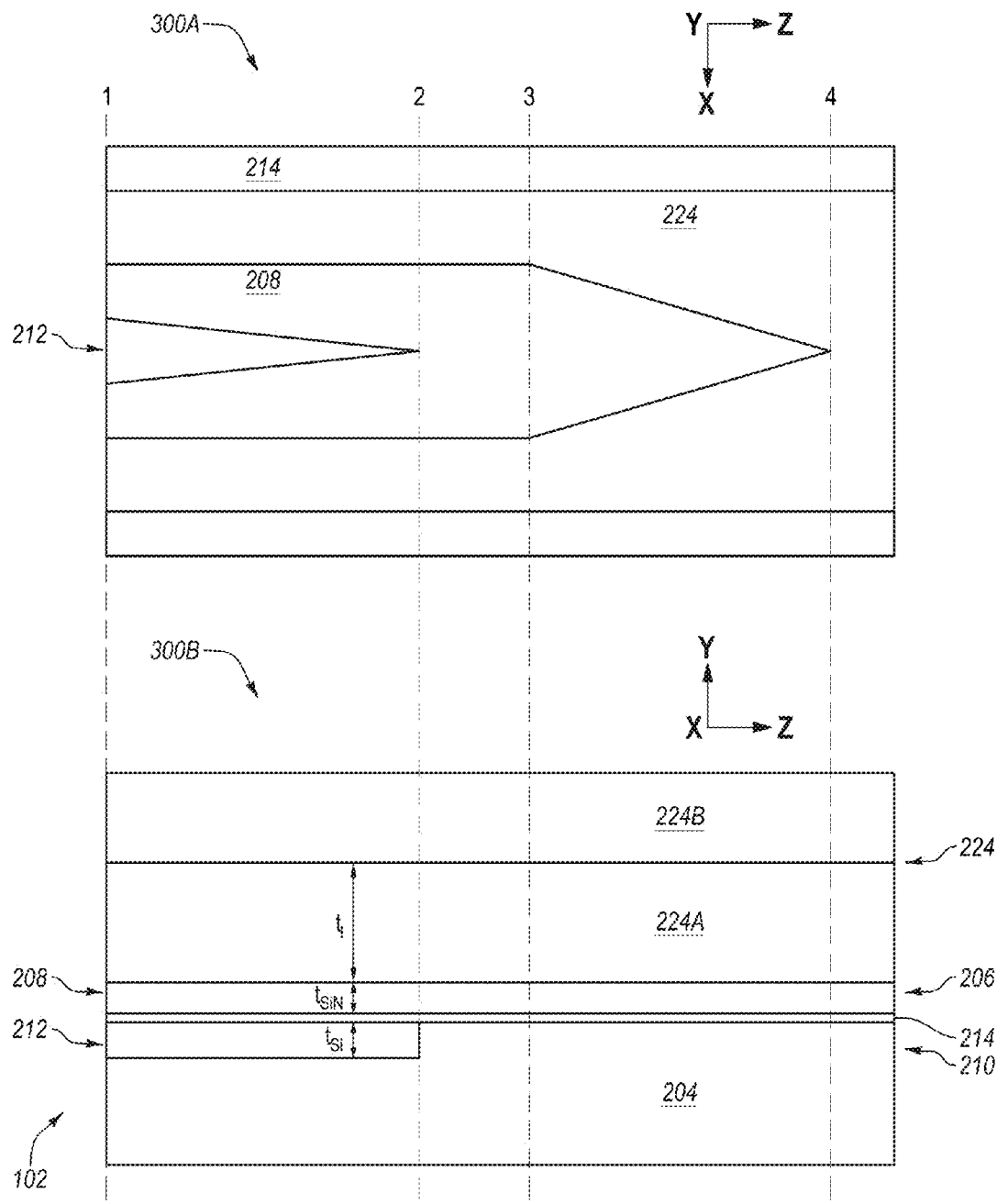
FIGS. 3A-3B include various views of portions of the photonic system of FIGS. 1 and 2.
Figure 3B:
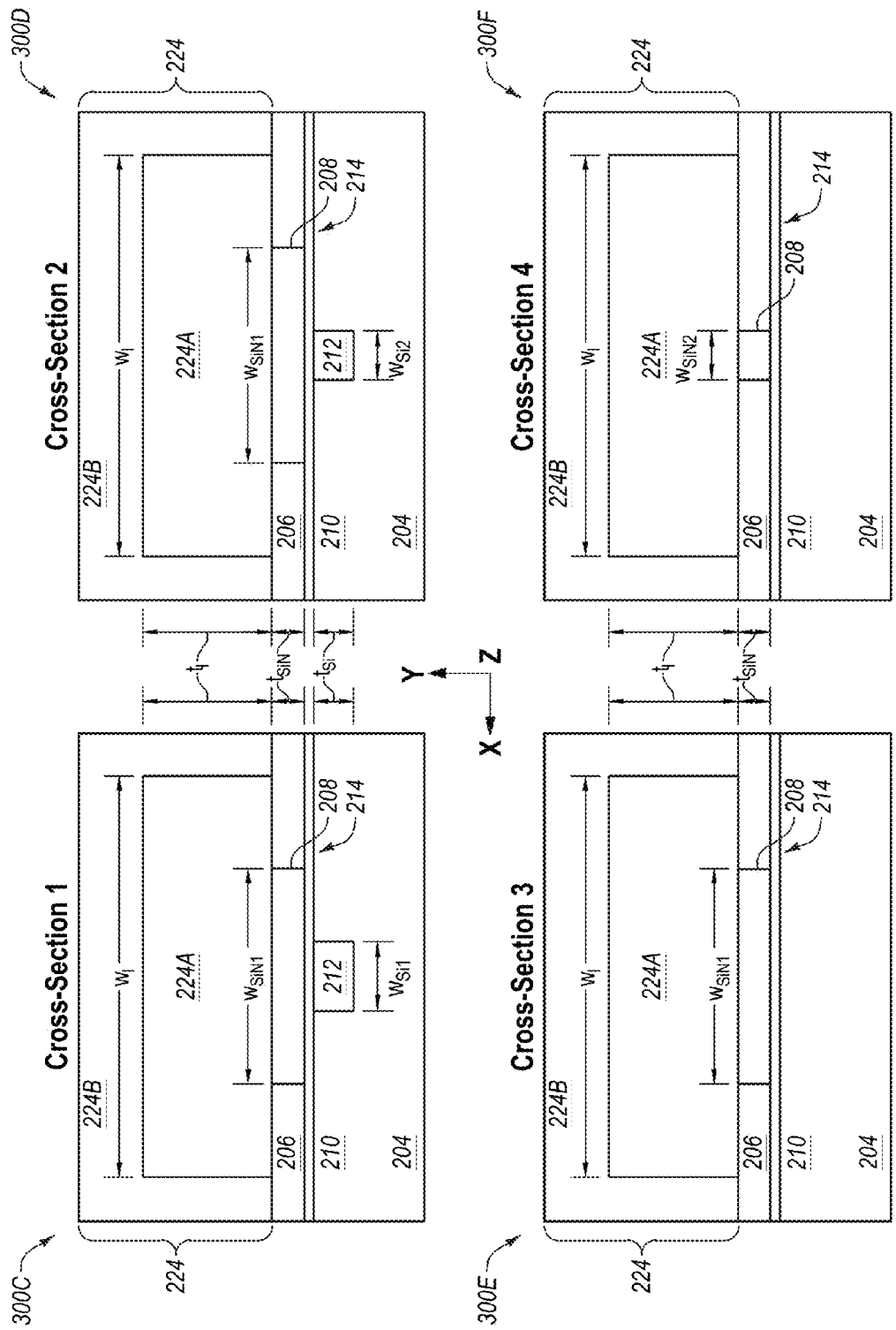

FIGS. 3A-3B include various views of portions of the photonic system 200 of FIG. 2, arranged in accordance with at least one embodiment described herein. In particular, FIG. 3A includes an overhead view 300A and a longitudinal cross-sectional view 300B and FIG. 3B includes transverse cross-sectional views 300C-300F at locations respectively denoted by reference lines 1-4 in FIG. 3A.

The overhead view 300A of FIG. 3A illustrates relative x-axis and z-axis alignment of various components with respect to each other according to an arbitrarily defined x-y-z coordinate axis provided within each of the views 300A-300B of FIG. 3A and provided in other FIGS. herein. A single instance of the x-y-z coordinate axis is provided for all four views 300C-300F of FIG. 3B since all four views 300C-300F have the same orientation. The x direction may sometimes be referred to as a lateral or transverse direction and terms such as width, lateral, transverse, side, sideways etc. may be used to refer to, e.g., dimensions, relative position, and/or movement in the x direction unless context dictates otherwise. The y direction may sometimes be referred to as a vertical direction and terms such as height, thickness, vertical, vertically, above, below, up, down, etc. may be used to refer to, e.g., dimensions, relative position, and/or movement in the y direction unless context dictates otherwise. The z direction may sometimes be referred to as a longitudinal or light-propagating direction and terms such as length, longitudinal, upstream, downstream, forward, backward, front, back, etc. may be used to refer to, e.g., dimensions, relative position, and/or movement in the z direction unless context dictates otherwise.

The longitudinal cross-sectional view 300B of FIG. 3A illustrates an example material stack up for the various components. The overhead view 300A of FIG. 3A includes outlines or footprints of the various components at different levels in the material stack up that may not necessarily be visible when viewed from above, but are shown as outlines or footprints to illustrate the x and z alignment of the various components with respect to each other.

The portion of the photonic system 200 illustrated in the view 300A of FIG. 3A includes a tapered end of the Si waveguide 212. The tapered end of the Si waveguide 212 is relatively wider at reference line 1 than at reference line 2. The tapered end of the Si waveguide 212 may be considered to have a taper or an inverse taper, which are structurally equivalent. As used herein, a waveguide such as the Si waveguide 212 of FIG. 3A may be considered to have a taper with respect to incoming optical signals, e.g., optical signals that enter the waveguide at a relatively narrower portion of the waveguide and propagate through the waveguide towards a relatively wider portion of the waveguide. In comparison, a waveguide such as the Si waveguide 212 of FIG. 3A may be considered to have an inverse taper with respect to outgoing optical signals, e.g., optical signals that propagate through the waveguide in the direction from wider to narrower to exit the waveguide. For simplicity in the discussion that follows, the term "taper" and its variants should be broadly construed as a variation of the waveguide width along the optical axis. In some embodiments, it may be advantageous to vary the width of the waveguide along the optical axis linearly or nonlinearly or in segments of linear and nonlinear variation. The width of the taper around the interaction region of the initial state and final state waveguides may be varied to optimize coupling or reduce the length of the coupling region to produce a physically smaller device.

The Si waveguide 212, including the tapered end, may be formed in the second layer 210 and positioned below the first layer 206 that includes the SiN waveguide 208. For example, the second layer 210 may be positioned below the SiN slab 214, which in turn is positioned below the first layer 206. Within the second layer 210, $SiO_2$ may generally be disposed adjacent to sides of the Si waveguide 212 (e.g., in the positive x and negative x directions), as illustrated in the views 300C and 300D of FIG. 3B, to form a cladding for the Si waveguide 212, which serves as the core. In some embodiments, the Si waveguide 212 and/or other Si waveguides of the Si PIC 102 may have a thickness $t_{Si}$ (e.g., in the y direction) of approximately 0.3 μm and an index of refraction of about 3.4. The specific values of indexes of refraction, thickness, width, length, and other values provided herein are provided by way of example only and values other than those explicitly stated may nevertheless fall within the scope of the described embodiments.

As illustrated in FIG. 3A, the SiN slab 214 may be formed or otherwise located on the second layer 210 that includes the Si waveguide 212. The SiN slab 214 may have a thickness (e.g., in the y direction) of approximately 0-50 nm in some embodiments.

The view 300B of FIG. 3A further illustrates the SiN waveguide 208. The SiN waveguide 208 includes both a coupler portion and a tapered end. The coupler portion of the SiN waveguide 208 generally includes the portion of the SiN waveguide 208 between reference lines 1 and 2 and the tapered end of the SiN waveguide 208 generally includes the portion of the SiN waveguide 208 between reference lines 3 and 4. The tapered end of the SiN waveguide 208 is relatively wider at reference line 3 than at reference line 4. Within the first layer 206, $SiO_2$ may generally be disposed adjacent to sides of the SiN waveguide 208 (e.g., in the positive x and negative x directions), to serve as a cladding layer for the SiN waveguide 208, as illustrated in the views 300C-300F of FIG. 3B. In some embodiments, the SiN waveguide 208 and/or other SiN waveguides of the first layer 206 may have a thickness (e.g., in the z direction) of approximately 0.5-1 μm and an index of refraction of about 1.99.

It can be seen from FIG. 3A that, although the SiN waveguide 208 is displaced in the y direction from the Si waveguide 212, the tapered end of the Si waveguide 212 is aligned in the x and z directions with the coupler portion of the SiN waveguide 208 such that the tapered end of the Si waveguide 212 overlaps the coupler portion of the SiN waveguide 208 (as seen in the view 300A) in the x and z directions and is parallel thereto (as seen in the view 300B).

FIG. 3A additionally illustrates the interposer waveguide 224. The interposer waveguide 224 includes the core 224A and cladding 224B. Additionally, the interposer waveguide 224 includes both a coupler portion and an end that extends from the coupler portion. The coupler portion of the interposer waveguide 224 generally includes the portion of the interposer waveguide 224 between reference lines 3 and 4 and the end extends away from the coupler portion (e.g., to the right in FIG. 3A). The interposer waveguide 224 may be coupled, along with potentially one or more other interposer waveguides, to the interposer substrate 220 of FIG. 2. In some embodiments, the interposer waveguide 224 and/or other interposer waveguides of the interposer 104 of FIG. 2 may have a thickness $t_I$ (e.g., in the y direction) of approximately 3 μm, a width $w_I$ (e.g., in the x direction) of about 4 μm, and an index of refraction of about 1.51 for the interposer core 224A and about 1.5 for the interposer cladding 224B. More generally, provided the index of refraction of the interposer core 224A is greater than that of the interposer cladding 224B, the interposer core 224A may have an index of refraction in a range from 1.509 to 1.52. Note that the low end of the range of refractive index for the interposer is determined by the minimum taper tip width afforded by the SiN fabrication process, which here is assumed to be on the order of 200 nm. For instance, the minimum taper tip width for SiN waveguides may be 180 nm. If the process allows for a smaller tip width for the SiN, a correspondingly lower refractive index for the interposer will be allowed. This is because adiabatic coupling transition occurs when the effective indices of the SiN waveguide and interposer waveguide are substantially the same. Decreasing the SiN tip width (by using a more sophisticated process, for example) reduces the effective index of the SiN waveguide allowing a lower material index for the interposer.

It can be seen from FIG. 3A that, although the interposer waveguide 224 is displaced in the y direction from the SiN waveguide 208, the coupler portion of the interposer waveguide 224 is nevertheless aligned in the x and z directions with the tapered end of the SiN waveguide 208 such that the coupler portion of the interposer waveguide 224 overlaps the tapered end of the SiN waveguide 208 (as seen in the view 300A) and is parallel thereto (as seen in the view 300B).

The views 300C-300F of FIG. 3B depict widths (e.g., in the x direction) of the tapered end of each of the Si waveguide 212 and the SiN waveguide 208 at, respectively, reference lines 1-4 of FIG. 3A. For instance, from the views 300C and 300D, it can be seen that a width of the Si waveguide 212 tapers from a width $w_{Si1}$ of about 0.32 μm at reference line 1 to a width $w_{Si2}$ of about 0.08 μm (or 80 nm) at reference line 2. Also, from the views 300E and 300F, it can be seen that a width of the SiN waveguide 208 tapers from width $w_{SiN1}$ of about 1.0 μm at reference line 3 to width $w_{SiN2}$ of about 0.20 μm (or 200 nm) at reference line 4. As another design example, the width $w_{SiN1}$ can be about 1.5 μm at reference line 3 tapered to the width $w_{SiN2}$ of about 0.08 μm at reference line 4.

The tapered ends of the Si waveguide 212 and the SiN waveguide 208 provide adiabatic transitions for optical signals from the Si waveguide 212 to the SiN waveguide 208 and from the SiN waveguide 208 to the interposer waveguide 224, or adiabatic transitions for optical signals traveling in the opposite direction. An adiabatic transition may be achieved by changing the structure and/or an effective index of the tapered ends of the Si and SiN waveguides 212 and 208 in a sufficiently slow manner so light is not scattered from its mode when it is incident on the tapered ends and continues propagating in this same mode when it exits the tapered ends and enters the coupler portion of the SiN waveguide 208 or the interposer waveguide 224. That is, the light may experience a gradual transition between the tapered end of the Si or SiN waveguide 212 or 208 and the y-axis displaced and adjacent coupler portion of the SiN or interposer waveguide 208 or 224 such that the mode does not change and no significant scattering of light takes place. Accordingly, the tapered end of the Si waveguide 212 combined with the coupler portion of the SiN waveguide 208 is an example of an adiabatic coupler region. The tapered end of the SiN waveguide 208 and the coupler portion of the interposer waveguide 224 is another example of an adiabatic coupler region.

In operation, the structure, refractive index, and/or other characteristics of an optical medium may determine an effective index of the optical medium. Effective index is somewhat analogous to energy levels in quantum mechanics. Higher effective index is analogous to lower energy level. Thus, for two adjacent optical media with different effective indexes, light tends to propagate through the medium with the higher effective index.

In the embodiments described herein, and with particular reference to FIGS. 3A and 3B, Si waveguides may generally have a higher effective index than SiN waveguides, and SiN waveguides may generally have a higher effective index than polymer waveguides. By tapering the end of a Si waveguide, the effective index may be reduced along the length of the tapered end until the effective index of the Si waveguide approximately matches or even becomes smaller than the effective index of a y-axis displaced SiN waveguide, such as illustrated in FIGS. 3A and 3B. Accordingly, light propagating through the Si waveguide 212 and exiting through its tapered end may exit the tapered end of the Si waveguide 212 and enter the SiN waveguide 208 about at a point where the effective index of the tapered end of the Si waveguide 212 matches an effective index of the SiN waveguide 208. Analogously, the SiN waveguide 208 may be tapered at its end until its effective index approximately matches or even becomes smaller than the effective index of a y-axis displaced polymer waveguide, such as illustrated in FIGS. 3A and 3B. Accordingly, light propagating through the SiN waveguide 208 and exiting through its tapered end may exit the tapered end of the SiN waveguide 208 and enter the interposer waveguide 224 about at a point where the effective index of the tapered end of the SiN waveguide 208 matches an effective index of the interposer waveguide 224.

Some other adiabatic coupling systems include a single adiabatic coupler region or stage in which a polymer or high index glass (or other interposer) waveguide receives light directly from a tapered end of a Si waveguide. Such systems generally require a Si waveguide that is very thin (e.g., 190-200 nm thick in the y direction of FIGS. 3A-3B) and/or tapering the Si waveguide to a very thin width (e.g., 40 nm wide in the x direction) to reach an effective index small enough to match the effective index of the polymer or high index glass waveguide. Such fine dimensions may not be achievable for some fabs/manufacturers and/or may be inconsistent with existing processes of these fabs/manufacturers. In addition, smaller Si waveguides generally have higher insertion loss than relatively larger Si waveguides, making them disadvantageous. The adiabatic coupling length between Si and Polymer waveguides may be on the order of 2 mm, over which such a narrow Si waveguide would introduce unwanted optical loss. In comparison, some embodiments described herein implement a two-stage adiabatic coupling where the SiN waveguide has an intermediate index of refraction between that of the Si waveguide and of the interposer waveguide, such that the effective index of the Si waveguide may be matched to the effective index of the SiN waveguide by fabricating the SiN waveguide and/or its tapered end with larger dimensions that are achievable by the fabs/manufactures and that allow the use of a larger, lower loss SiN waveguide. Here, the adiabatic coupling length from the Si waveguide to the SiN waveguide may be quite small, e.g., about 50-200 μm. In this case the higher loss of the small 80 nm wide Si waveguide does not introduce significant loss and the loss is significantly less than the narrower Si waveguide over 2 mm as described above. The adiabatic coupler region between the SiN waveguide and the interposer waveguide may be around 2 mm, where the lower loss of the SiN waveguide relative to the Si waveguide leads to less loss as compared with direct adiabatic coupling between Si and interposer waveguides.

Figure 4:
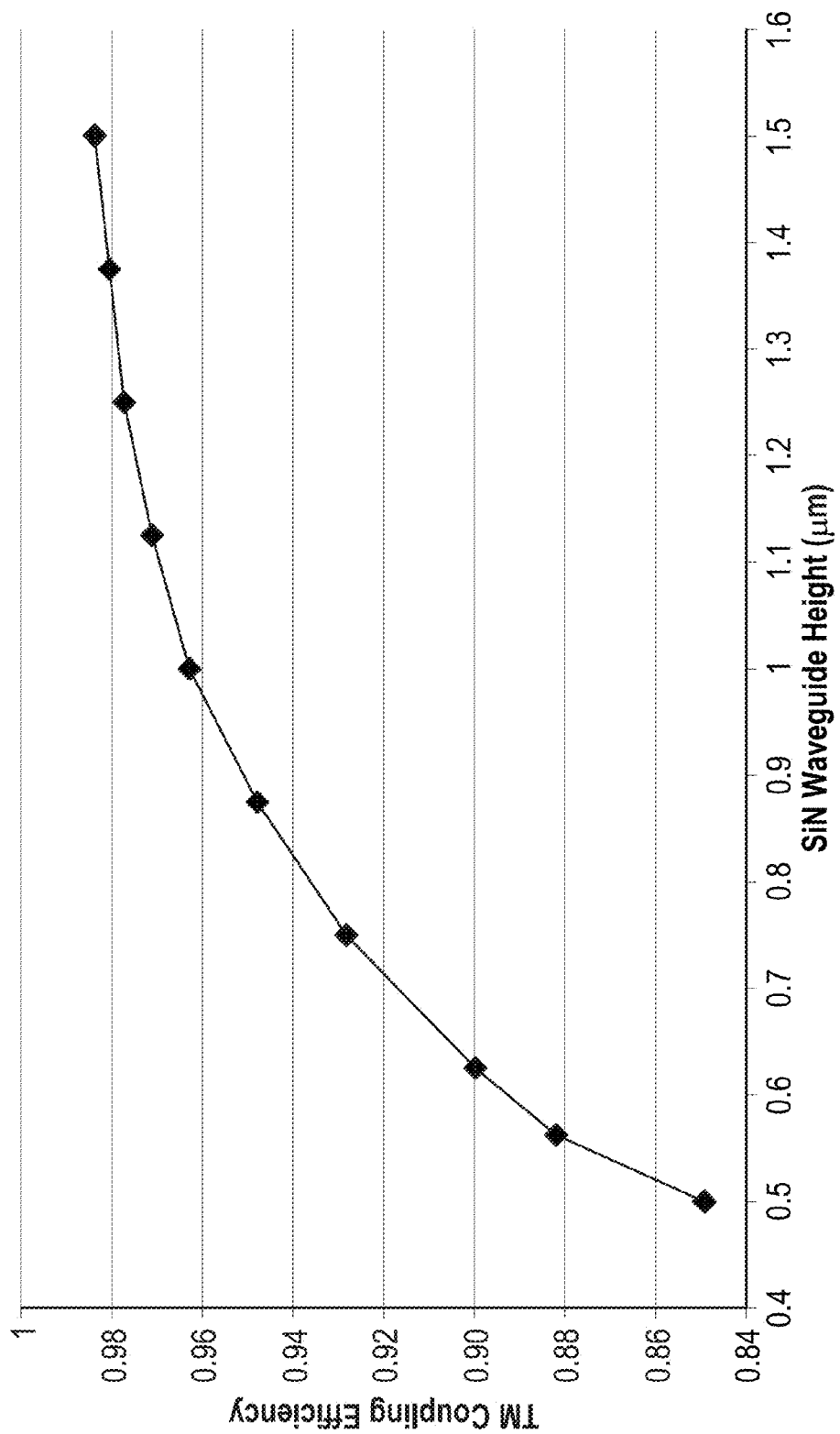
FIG. 4 includes a graphical representation of simulated coupling efficiency of TM polarized light from a Si waveguide to a SiN waveguide of FIGS. 3A-3B.

FIG. 4 includes a graphical representation of simulated coupling efficiency of TM polarized light from the Si waveguide 212 to the SiN waveguide 208 of FIGS. 3A-3B, arranged in accordance with at least one embodiment described herein. The horizontal axis of FIG. 4 is height or thickness $t_{SiN}$ (e.g., in the y direction of FIGS. 3A-3B) of the SiN waveguide 208 and the vertical axis is the coupling efficiency. It can be seen from FIG. 4 that the coupling efficiency increases with increasing height or thickness $t_{SiN}$ of the SiN waveguide 208. At a height or thickness $t_{SiN}$ of 1 µm, the coupling efficiency is approximately 96% for the TM polarized light.

Figure 5A:
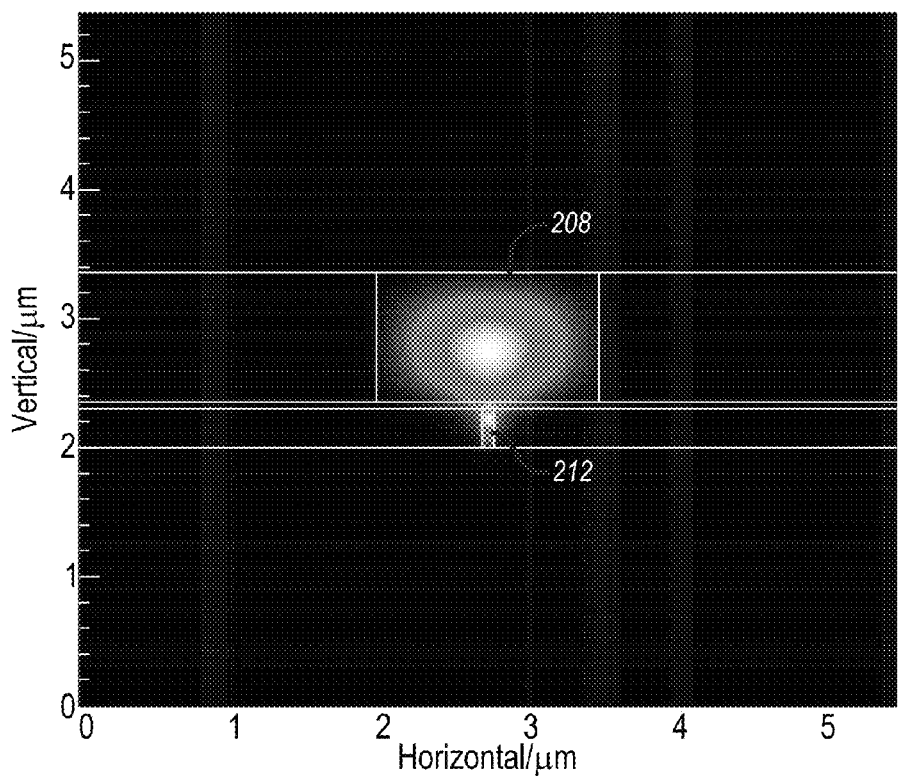
FIGS. 5A-5B include graphical representations of simulated light modes of TM and TE polarized light in the SiN waveguide of FIGS. 3A-3B at reference line 2.
Figure 5B:
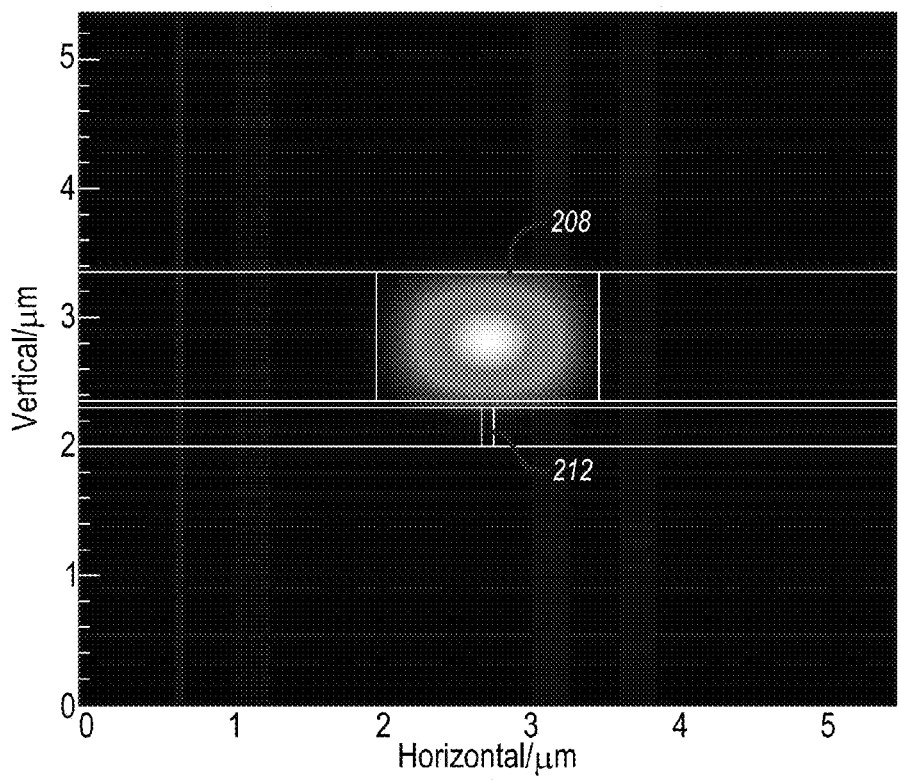

FIGS. 5A-5B include graphical representations of simulated light modes of TM and TE polarized light in the SiN waveguide 208 of FIGS. 3A-3B at reference line 2, arranged in accordance with at least one embodiment described herein. For the simulations of FIGS. 5A-5B, the SiN waveguide 208 is assumed to have a height or thickness $t_{SiN}$ (e.g., in the y direction) of about 1 µm and a width $w_{SiN1}$ (e.g., in the x direction) of about 1.5 µm.

As illustrated in FIGS. 5A, at reference line 2 in FIGS. 3A-3B, most of the TM polarized light has moved into the SiN waveguide 208, although some still remains in the tip of the tapered end of the Si waveguide 212. As illustrated in FIG. 5B, at reference line 2 in FIGS. 3A-3B, virtually all of the TE polarized light has moved out of the Si waveguide 212 and into the SiN waveguide 208.

FIGS. 5A-5B further illustrate the light as a single mode of light. However, SiN waveguides 208 may in some cases support multimode light. When single mode light is coupled adiabatically from the Si waveguide 212 to the SiN waveguide 208, only the single mode of the SiN waveguide 208 may be excited and the light may stay in the single mode in some embodiments. In other embodiments, a Si—SiN adiabatic coupler region may be configured to support transmission therebetween multimodes of light, as discussed below. In other embodiments, the SiN waveguide may be configured to support only the single mode.

Figure 6:
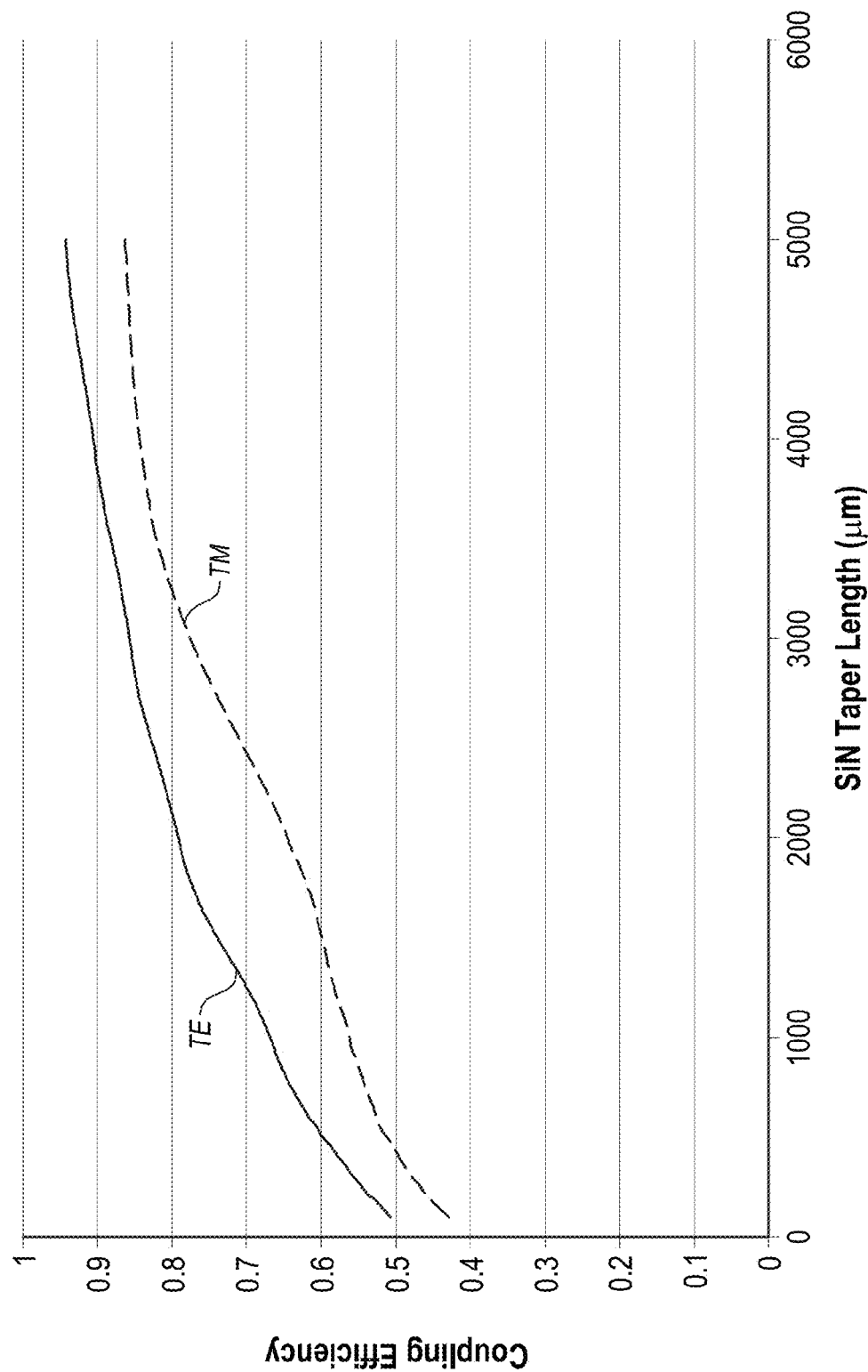
FIG. 6 includes a graphical representation of simulated coupling efficiency of TM polarized light and TE polarized light from the SiN waveguide to an interposer waveguide of FIGS. 3A-3B.

FIG. 6 includes a graphical representation of simulated coupling efficiency of TM polarized light and TE polarized light (respectively labeled "TM" and "TE" in FIG. 6) from the SiN waveguide 208 to the interposer waveguide 224 of FIGS. 3A-3B, arranged in accordance with at least one embodiment described herein. The horizontal axis of FIG. 6 is length (e.g., in the z direction of FIGS. 3A-3B) of the tapered end of the SiN waveguide 208 and the vertical axis is the coupling efficiency. It can be seen from FIG. 6 that the coupling efficiency is generally better for TE polarized light and increases for both TE and TM polarized light with increasing length of the tapered end of the SiN waveguide 208.

Figure 7:
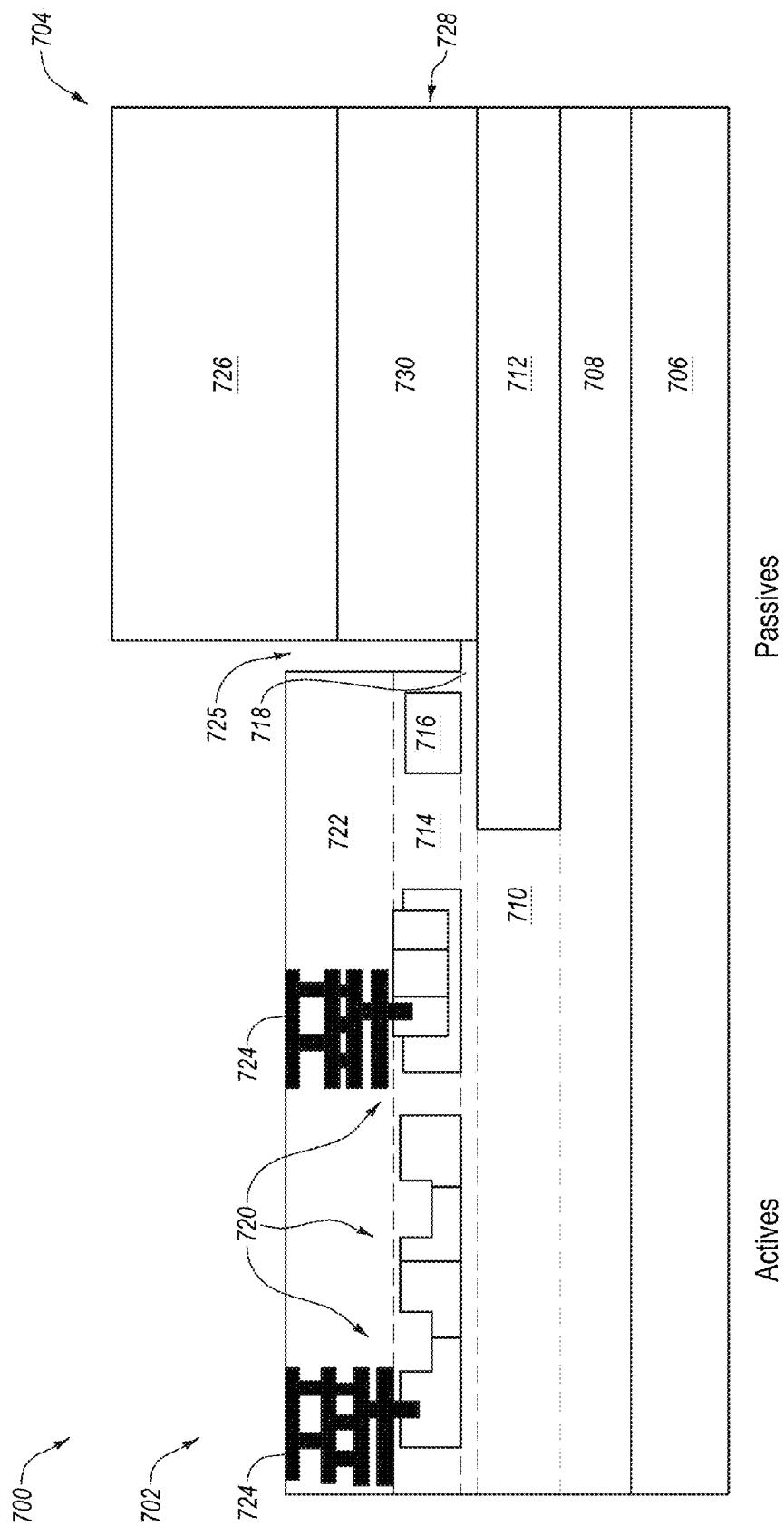
FIG. 7 is a side view of another example two-stage adiabatically coupled photonic system (hereinafter "photonic system")

FIG. 7 is a side view of another example two-stage adiabatically coupled photonic system 700 (hereinafter "photonic system 700"), arranged in accordance with at least one embodiment described herein. The photonic system 700 includes a Si PIC 702 and an interposer 704. Similar to the photonic system 200, the photonic system 700 may generally be configured to adiabatically couple light into and/or out of the photonic system 700.

The Si PIC 702 includes a Si substrate 706, a $SiO_2$ box 708, a first layer 710 that includes a SiN waveguide 712, and a second layer 714 that includes a Si waveguide 716. In the illustrated embodiment, the first layer 710 is formed on (or at least above) the $SiO_2$ box 708 and the second layer 714 is formed on (or at least above) the first layer 710. Alternatively or additionally, a slab 718 of SiN may be formed between the first layer 710 and the second layer 714 at least in a region where the Si waveguide 716 is optically coupled to the SiN waveguide 712. In an example embodiment, the SiN waveguide 712 includes $Si_3N_4$ as the waveguide core surrounded on at least two sides along its length by $SiO_2$ or other suitable waveguide cladding.

As illustrated in FIG. 7, the Si PIC 702 may further include one or more active optical components 720 formed in the second layer 714, one or more dielectric layers 722 formed on and/or above the second layer 714, and one or more metallized structures 724 formed in the dielectric layers 722. The metallized structures 724 may extend from a top of the Si PIC 702 through the dielectric layers 722 to electrical contact with the active optical components 720. The dielectric layers 722 may include $SiO_2$ or other suitable dielectric material. The dielectric layers 722 and the metallized structures 724 are collectively an example of a 3D stack region that may be included in Si PICs, such as the Si PIC 702 of FIG. 7. Alternatively or additionally, the region of the Si PIC 702 that includes the active optical components 720 may be referred to as an active region of the Si PIC 702 (labeled "Actives" in FIG. 7), whereas a region or regions of the Si PIC 702 that lack such active optical components 720 may be referred to as a passive region of the Si PIC 702 (labeled "Passives" in FIG. 7).

The Si PIC 702 may define an etched window 725 through the layers of the Si PIC 702 down to the first layer 710, including through the dielectric layers 722, the second layer 714, and the SiN slab 718 in the example of FIG. 7.

The interposer 704 may include an interposer substrate 726 and a waveguide strip 728 formed on and/or coupled to the polymer substrate. The waveguide strip 728 includes one or more interposer waveguides 730. Each of the interposer waveguides 730 includes an interposer core and interposer cladding of different indices of refraction. A coupler portion of each interposer waveguide 730 is disposed above a tapered end of each SiN waveguide 712 within the etched window 725 of the Si PIC 702 and is aligned with the tapered end of the corresponding SiN waveguide 712 as described in more detail below.

Each of the Si PIC 702, the interposer 704, the Si substrate 706, the $SiO_2$ box 708, the first layer 710, the SiN waveguide 712, the second layer 714, the Si waveguide 716, the SiN slab 718, the active optical components 720, the dielectric layers 722, the metallized structures 724, the interposer substrate 726, the waveguide strip 728, and the interposer waveguide 730 of FIG. 7 may generally be similar or identical to, respectively, any of the other Si PICs, interposers, Si substrates, $SiO_2$ boxes, first layers, SiN waveguides, second layers, Si waveguides, SiN slabs, active optical components, dielectric layers, metallized structures, interposer substrates, waveguide strips, and interposer waveguides disclosed herein, excepted as otherwise indicated herein.

Figure 8A:
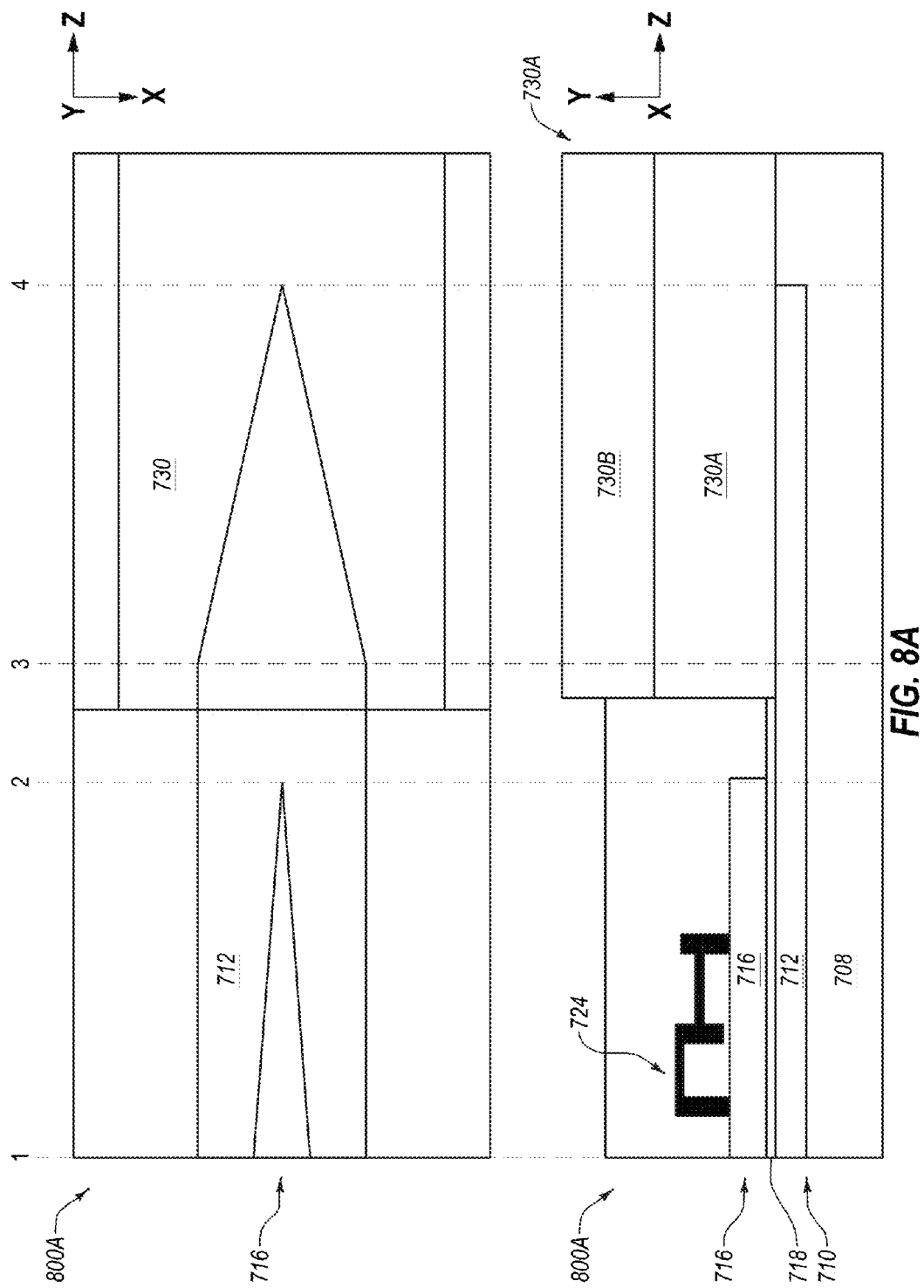
FIGS. 8A-8B include various views of portions of the photonic system of FIG. 7.
Figure 8B:
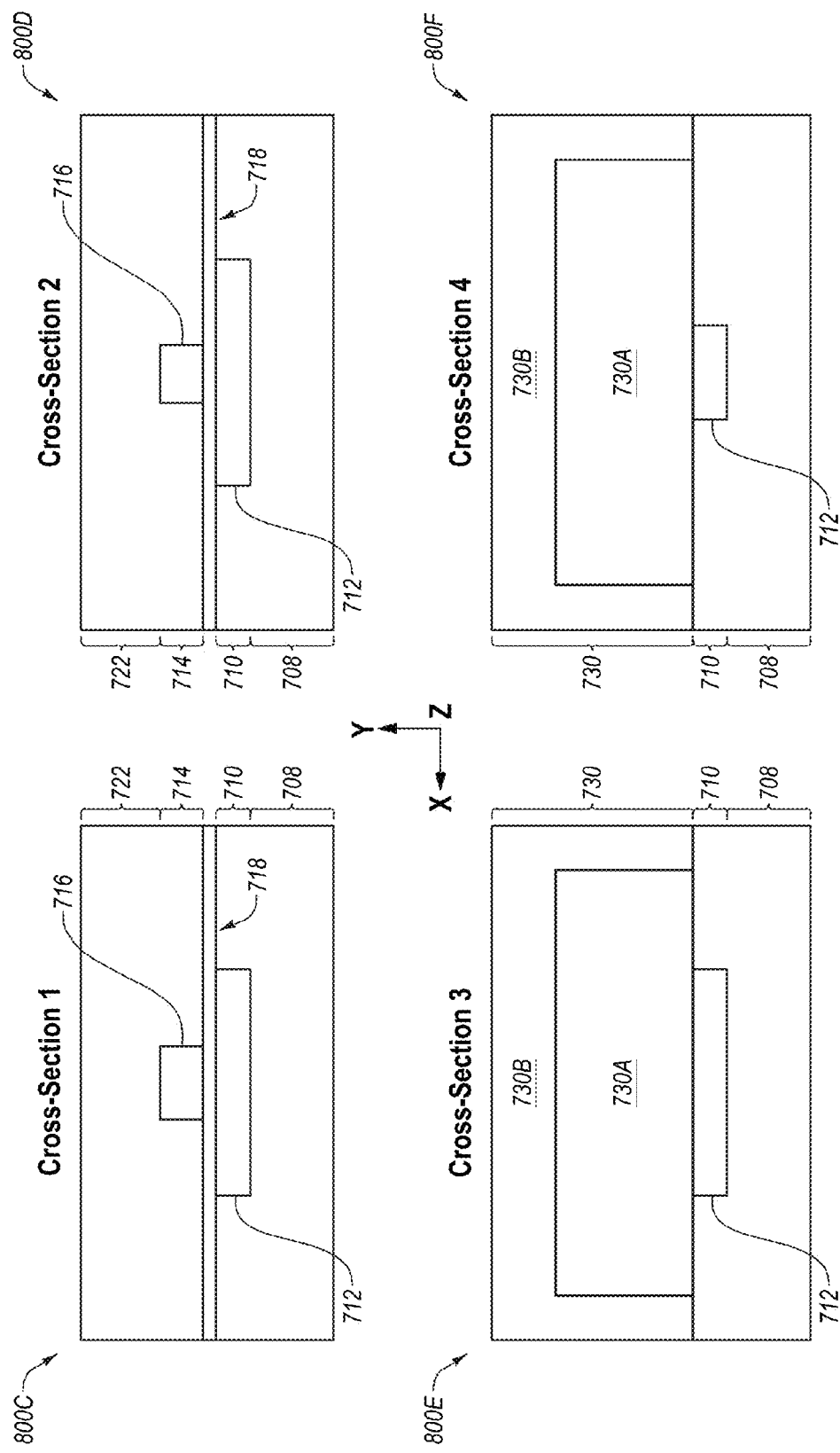

FIGS. 8A-8B include various views of portions of the photonic system 700 of FIG. 7, arranged in accordance with at least one embodiment described herein. In particular, FIG. 8A includes an overhead view 800A and a longitudinal cross-sectional view 800B and FIG. 8B includes transverse cross-sectional views 800C-800F at locations respectively denoted by reference lines 1-4 in FIG. 8A.

The overhead view 800A of FIG. 8A illustrates relative x-axis and z-axis alignment of various components with respect to each other. The longitudinal cross-sectional view 800B of FIG. 8A illustrates an example material stackup for the various components. The overhead view 800A of FIG. 8A includes outlines or footprints of the various components at different levels in the material stackup that may not necessarily be visible when viewed from above, but are shown as outlines or footprints to illustrate the x and z alignment of the various components with respect to each other.

The portion of the photonic system 700 illustrated in the view 800A of FIG. 8A includes a tapered end of the Si waveguide 716. The tapered end of the Si waveguide 716 is relatively wider at reference line 1 than at reference line 2. The Si waveguide 716, including the tapered end, may be formed in the second layer 714 (FIG. 7) on or above the first layer 710 (FIG. 7) that includes the SiN waveguide 712. For example, the second layer 714 may be formed on the SiN slab 718 above the first layer 710. Within the second layer 714, $SiO_2$ may generally be disposed adjacent to sides of the Si waveguide 716 (e.g., in the positive x and negative x directions), as illustrated in the views 800C and 800D of FIG. 8B, to form a cladding for the Si waveguide 716, which serves as the core. The thickness and/or index of refraction of the Si waveguide 716 may be the same as or different than the thickness and/or index of refraction of the Si waveguide 212 described above.

As illustrated in FIG. 8A, the SiN slab 718 may be formed or otherwise located on the first layer 710 (FIG. 7) that includes the SiN waveguide 712. The SiN slab 718 may have a thickness that is the same as or different than the thickness of the SiN slab 214 described above.

The view 800B of FIG. 8A further illustrates the SiN waveguide 712. The SiN waveguide 712 includes both a coupler portion and a tapered end. The coupler portion of the SiN waveguide 712 generally includes the portion of the SiN waveguide 712 between reference lines 1 and 2 and the tapered end of the SiN waveguide 712 generally includes the portion of the SiN waveguide 712 between reference lines 3 and 4. The tapered end of the SiN waveguide 712 is relatively wider at reference line 3 than at reference line 4. Within the first layer 710 (FIG. 7), $SiO_2$ may generally be disposed adjacent to sides of the SiN waveguide 712, to serve as a cladding layer for the SiN waveguide 712 (e.g., in the positive x and negative x directions), as illustrated in the views 800C-800F of FIG. 8B. The SiN waveguide 712 and/or other SiN waveguides of the first layer 710 may have a thickness (e.g., in the y direction) and/or index of refraction that is the same as or different than the thickness and/or index of refraction of the SiN waveguide 208 described above.

It can be seen from FIG. 8A that, although the SiN waveguide 712 is displaced in the y direction from the Si waveguide 716, the tapered end of the Si waveguide 716 is aligned in the x and z directions with the coupler portion of the SiN waveguide 712 such that the tapered end of the Si waveguide 716 overlaps the coupler portion of the SiN waveguide 712 (as seen in the view 800A) in the x and z directions and is parallel thereto (as seen in the view 800B).

FIG. 8A additionally illustrates the interposer waveguide 730. The interposer waveguide 730 includes an interposer core 730A and an interposer cladding 730B. Additionally, the interposer waveguide 730 includes both a coupler portion and an end that extends from the coupler portion. The coupler portion of the interposer waveguide 730 generally includes the portion of the interposer waveguide 730 between reference lines 3 and 4 and the end extends away from the coupler portion (e.g., to the right in FIG. 8A). The interposer waveguide 730 may be coupled, along with potentially one or more other interposer waveguides, to the interposer substrate 726 of FIG. 7. In some embodiments, the interposer waveguide 730 and/or other interposer waveguides of the interposer 704 of FIG. 7 may have a thickness (e.g., in the y direction), a width (e.g., in the x direction) and/or an index of refraction that is the same as or different than the thickness, width, and/or index of refraction of the interposer waveguide 224 described above.

It can be seen from FIG. 8A that, although the interposer waveguide 730 is displaced in the y direction from the SiN waveguide 712, the coupler portion of the interposer waveguide 730 is nevertheless aligned in the x and z directions with the tapered end of the SiN waveguide 712 such that the coupler portion of the interposer waveguide 730 overlaps the tapered end of the SiN waveguide 712 (as seen in the view 800A) and is parallel thereto (as seen in the view 800B).

The Si waveguide 716, the SiN waveguide 712, tapered ends thereof, and/or the interposer waveguide 730 may have widths (e.g., in the x direction) and/or lengths (e.g., in the z direction) that are the same as or different than the widths and/or lengths of the Si waveguide 212, the SiN waveguide 208, tapered ends thereof, and/or the interposer waveguide 224 described above. Alternatively or additionally, the tapered ends of the Si waveguide 716 and the SiN waveguide 712 may provide adiabatic transitions for optical signals from the Si waveguide 716 to the SiN waveguide 712 and from the SiN waveguide 712 to the interposer waveguide 730, as described above with respect to the Si waveguide 212, the SiN waveguide 208, and the interposer waveguide 224.

Figure 9:
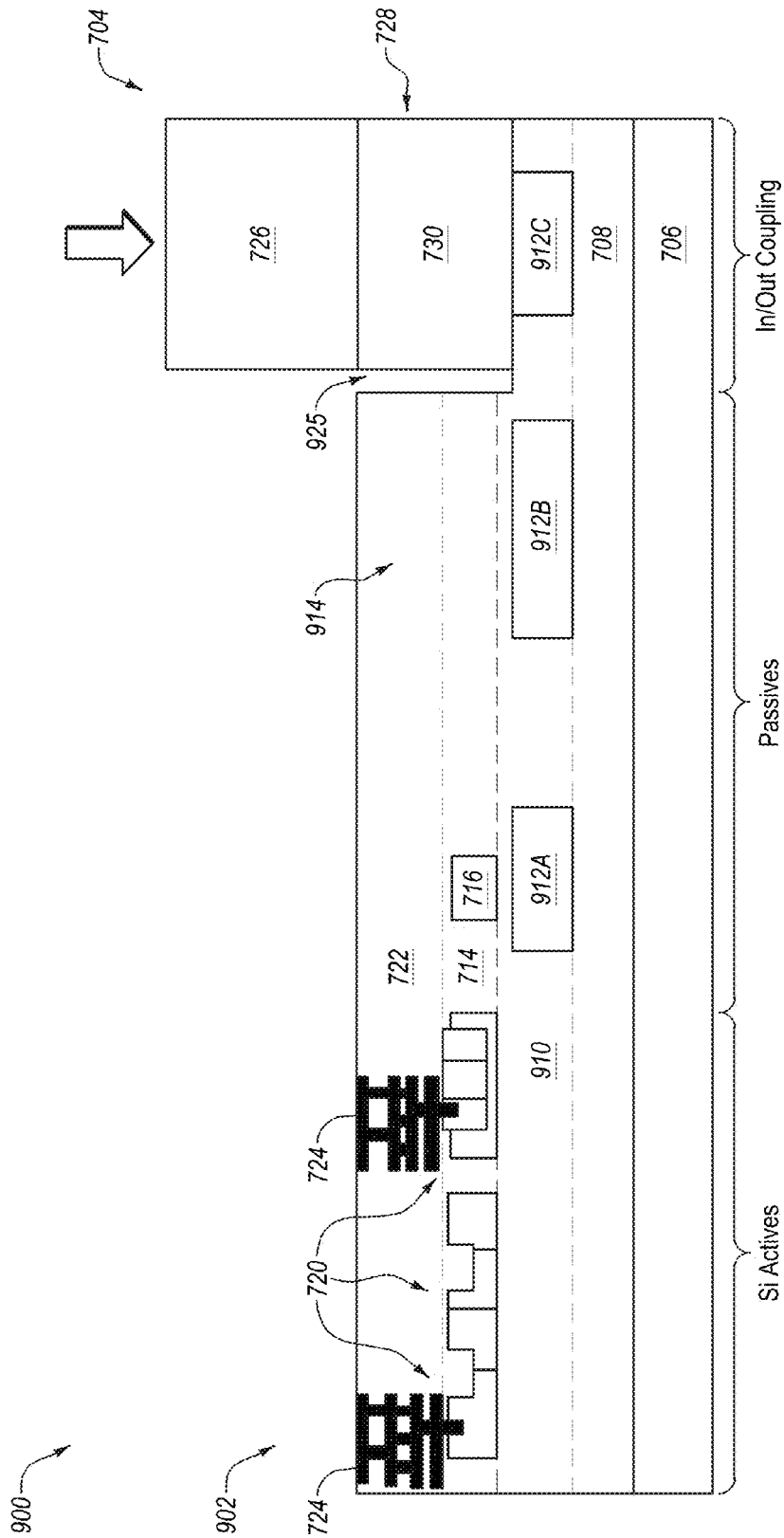
FIG. 9 is a side view of another example two-stage adiabatically coupled photonic system (hereinafter "photonic system")

FIG. 9 is a side view of another example two-stage adiabatically coupled photonic system 900 (hereinafter "photonic system 900"), arranged in accordance with at least one embodiment described herein. The photonic system 900 is similar in many respects to the photonic system 700 discussed above, and includes a Si PIC 902 and the interposer 704. The Si PIC 902 is similar in many respects to the Si PIC 702 discussed above, and includes, for example, the $SiO_2$ box 708, the second layer 714, the Si waveguide 716, the active optical components 720, the dielectric layers 722, and the metallized structures 724, and the Si PIC 902 additionally defines an etched window 925.

The Si PIC 902 additionally includes a first layer 910 that is similar to the first layer 710 of FIG. 7. In particular, the first layer 910 includes a first SiN waveguide 912A with a coupler portion that is similar to the SiN waveguide 712 with coupler portion discussed above. In particular, the tapered end of the Si waveguide 716 and the coupler portion of the first SiN waveguide 912A are aligned with each other as described with respect to the Si waveguide 716 and the SiN waveguide 712 so as to adiabatically couple light from the Si waveguide 716 to the first SiN waveguide 912A, or vice versa.

The first layer 910 of the Si PIC 902 additionally includes a WDM component, generally designated at 914. The WDM component 914 may function as a WDM mux or WDM demux, for instance. The WDM component 914 may include one or more cascaded Mach-Zehnders, Echelle gratings, or arrayed waveguide gratings (AWGs). The WDM component 914 optically couples the first SiN waveguide 912A to one or more second SiN waveguides 912B, 912C according to the wavelength of light. Alternatively or additionally, the WDM component 914 may optically couple one or each of the second SiN waveguides 912B, 912C that can be carrying optical signals having different wavelength to one or more first SiN waveguides 912A that are in turn coupled to one or more Si waveguides 716. The second SiN waveguide 912C may include a tapered end to adiabatically couple light into the interposer waveguide 730, as described with respect to the SiN waveguide 712 and the interposer waveguide 730 above.

To reduce and/or eliminate polarization dependence of the WDM component 914, one or more of the first and second SiN waveguides 912A-912C (generically hereafter "SiN waveguide 912" or "SiN waveguides 912") may have the same effective index and group index for TE and TM polarizations of light. To configure the SiN waveguide 912 with the same effective index and group index for TE and TM polarizations of light, the SiN waveguide 912 may be provided with a symmetric square cross-section and may generally be surrounded by $SiO_2$.

For example, in FIG. 9, at least the SiN waveguide 912B may have a square cross-section along its length, or along at least a portion thereof. The square cross-section along at least a portion of the length of the SiN waveguide 912B may be about 500 nm by about 500 nm. Laterally, the SiN waveguide 912B may have $SiO_2$ adjacent thereto. In the vertical direction (e.g., the y direction), the SiN waveguide 912B may have the $SiO_2$ box 708 or another layer of $SiO_2$ beneath and adjacent thereto, where the $SiO_2$ box 708 or other layer of $SiO_2$ has a thickness of at least 200 nm. Further, the SiN waveguide 912B may have one or more layers of $SiO_2$ above and adjacent thereto, such as the second layer 714 and/or the dielectric layers 722. The one or more layers of $SiO_2$ that are above and adjacent to the SiN waveguide 912B in FIG. 9 may have an aggregate thickness greater than 330 nm.

Figure 10:
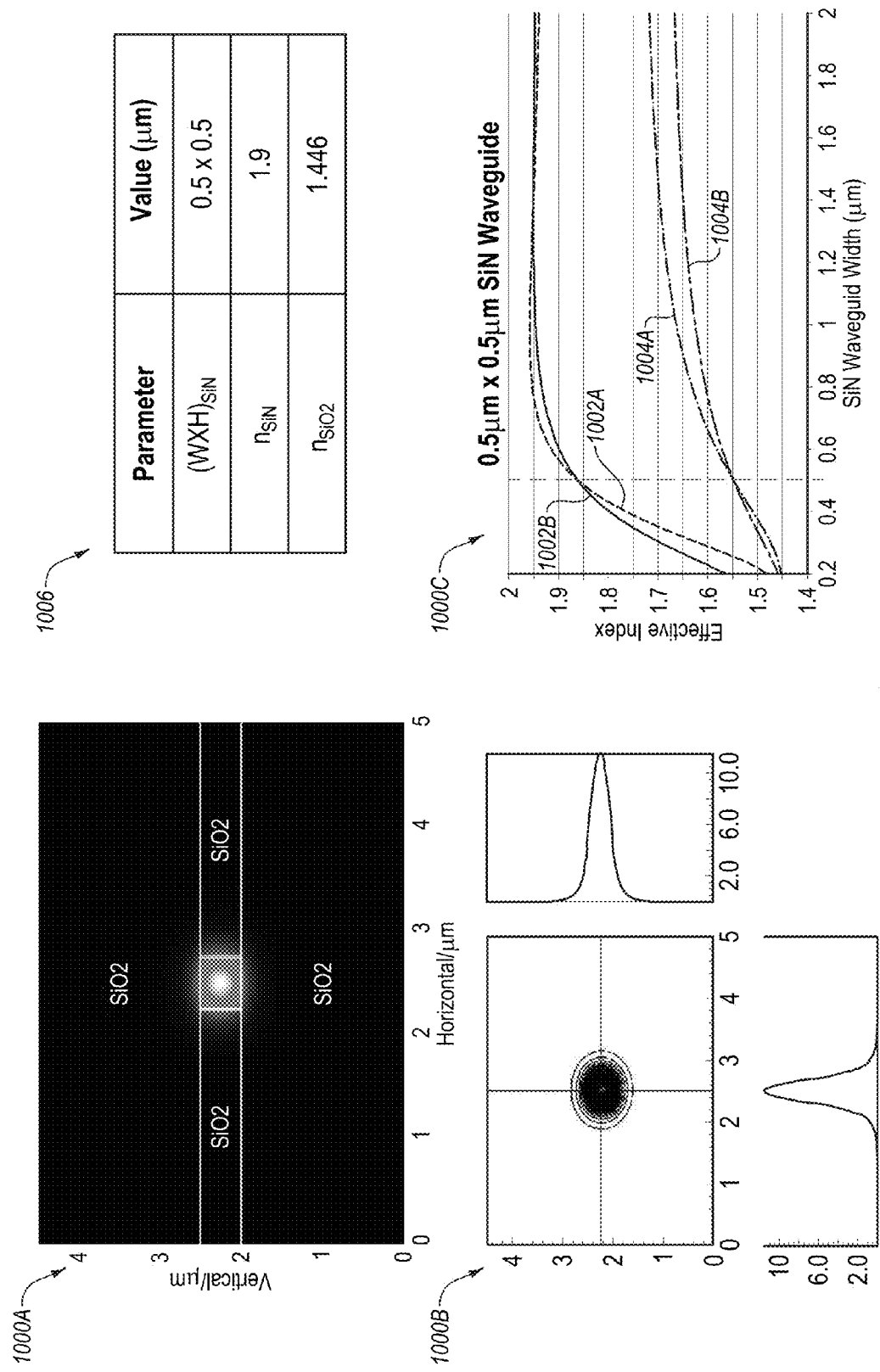
FIG. 10 includes various simulations associated with the photonic system of FIG. 9.

FIG. 10 includes various simulations 1000A-1000C associated with the embodiment of FIG. 9, arranged in accordance with at least one embodiment described herein. The simulation 1000C depicts effective index/group index of the SiN waveguide 912B of FIG. 9 as a function of width of the SiN waveguide 912B where it is assumed that the SiN waveguide 912B has a thickness of 500 nm. In the simulation 1000C, curves 1002A and 1002B represent the group index of the SiN waveguide 912B for, respectively, the TE and TM polarizations of light, while curves 1004A and 1004B represent the effective index of the SiN waveguide 912B for, respectively, the TE and TM polarizations of light. It can be seen from the simulation 1000C that the same group index and effective index for the TE and TM polarizations of light occurs at 500 nm, e.g., where the width of the SiN waveguide 912B is equal to the 500 nm thickness. This may result in zero birefringence operation.

FIG. 10 additionally includes a table 1006 that lists the 500 nm by 500 nm cross-sectional measurement of the SiN waveguide 912B determined from the simulation 1000C, as well as indexes of refraction of the SiN and $SiO_2$ used in the SiN waveguide.

The simulations 1000A and 1000B of FIG. 10 assume the parameters listed in the table 1004. It can be seen from the simulations 1000A and 1000B that zero birefringence operation occurs for the 500 nm by 500 nm SiN waveguide 912B surrounded by $SiO_2$ on all four sides along the length of the SiN waveguide 912B.

Figure 11:
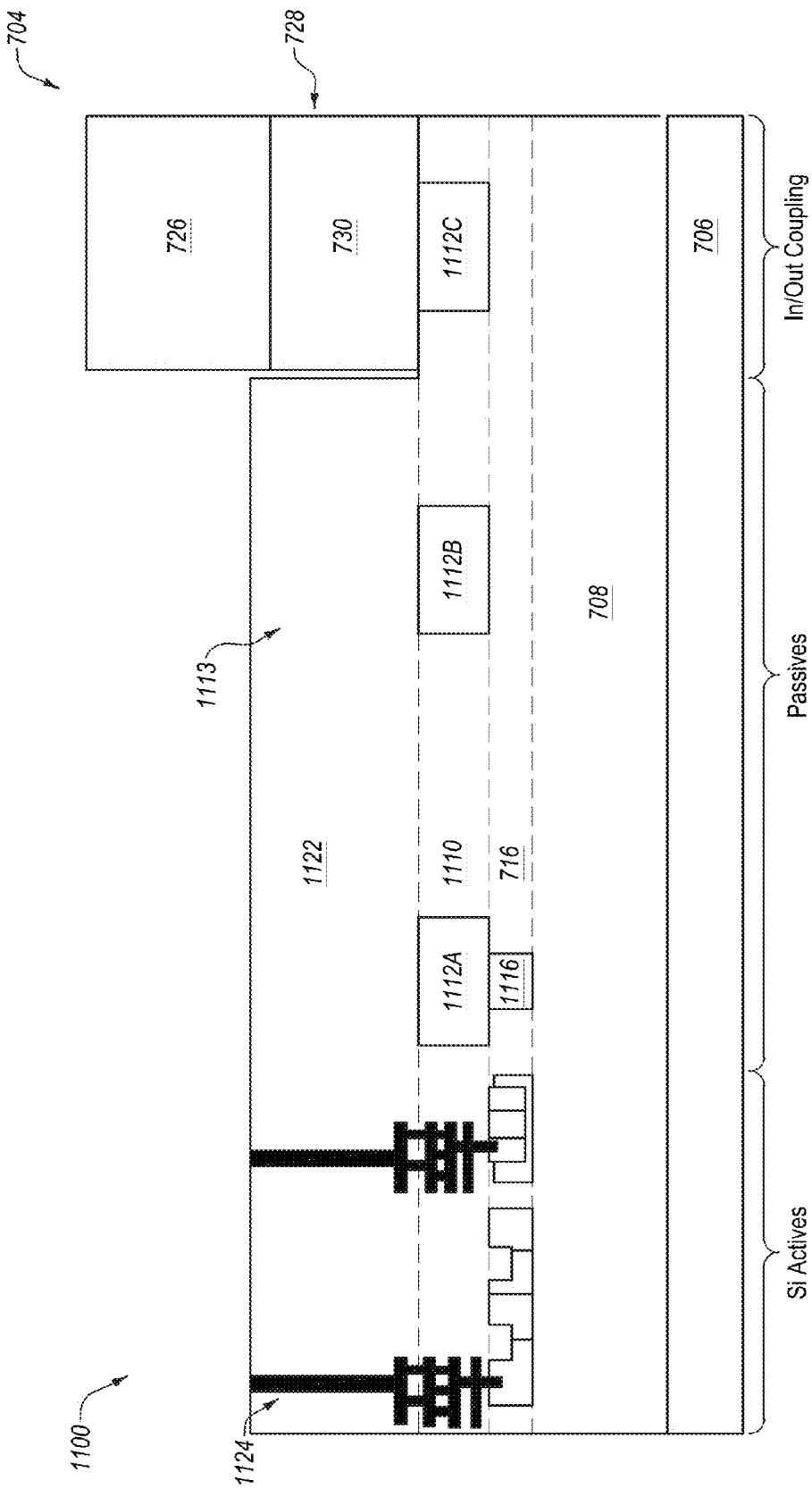
FIG. 11 is a side view of another example two-stage adiabatically coupled photonic system (hereinafter "photonic system")

FIG. 11 is a side view of another example two-stage adiabatically coupled photonic system 1100 (hereinafter "photonic system 1100"), arranged in accordance with at least one embodiment described herein. The photonic system 1100 is similar in many respects to the photonic system 900 discussed above and includes, inter alia, the interposer 704 and an Si PIC 1102 with the $SiO_2$ box 708, a first layer 1110 that includes one or more SiN waveguides 1112A-1112C (hereinafter "SiN waveguide 1112" or "SiN waveguides 1112") and a WDM component 1113, a second layer 1114 that includes one or more Si waveguides 1116, one or more dielectric layers 1122, and metallization structures 1124. The first layer 1110, SiN waveguide 1112, WDM component 1113, second layer 1114. Si waveguide 1116, dielectric layers 1122, and metallization structures 1124 may generally be similar or identical to, respectively, any of the other first layers, SiN waveguides, WDM components, second layers. Si waveguides, dielectric layers, and metallization structures disclosed herein except as otherwise indicated herein.

One difference between the photonic system 1100 and, e.g., the photonic system 900 is that the first and second layers 1110 and 1114 of the Si PIC 1102 of FIG. 11 are switched compared to the first and second layers 910 and 714 of the Si PIC 902 of FIG. 9. In particular, in FIG. 11, the second layer 1114 that includes the Si waveguide 1116 is below the first layer 1110 that includes the SiN waveguides 1112. The dielectric layers 1122 may be disposed above and in contact with the first layer 1110 and may have a thickness greater than 800 nm. The second layer 1114 may be disposed beneath and in contact with the first layer 1110 and may have a thickness greater than 330 nm.

The Si PIC 1102 may otherwise generally be similar to the Si PIC 902 of FIG. 9. For example, light may be adiabatically coupled from the Si waveguide 1116 to the SiN waveguide 1112A, or vice versa, and from the SiN waveguide 1112C to the interposer waveguide 730, or vice versa, in a similar manner as described above. Additionally, the SiN waveguide 1112B may have the same effective index and group index for TE and TM polarizations of light.

FIGS. 12A and 12B include an overhead view and a longitudinal cross-sectional view of another example optoelectronic system 1200 (hereinafter "system 1200") that includes two adiabatic coupler regions made up of the Si waveguide 212, the SiN waveguide 208, and the interposer waveguide 224 of FIGS. 3A-3B, arranged in accordance with at least one embodiment described herein.

The system 1200 further includes a distributed feedback (DFB) laser 1202 or other semiconductor laser, a first lens 1204, an optical isolator 1206, and a second lens 1208, all mounted to a laser sub-mount 1210. The first lens 1204 may be positioned in an optical path of an optical signal output from the DFB laser 1202. The optical isolator 1206 may be positioned in the optical path after the first lens 1204. The second lens 1208 may be positioned in the optical path after the optical isolator 1206. As illustrated, an end of the interposer waveguide 224 may be positioned in the optical path after the second lens 1208.

Figure 13:
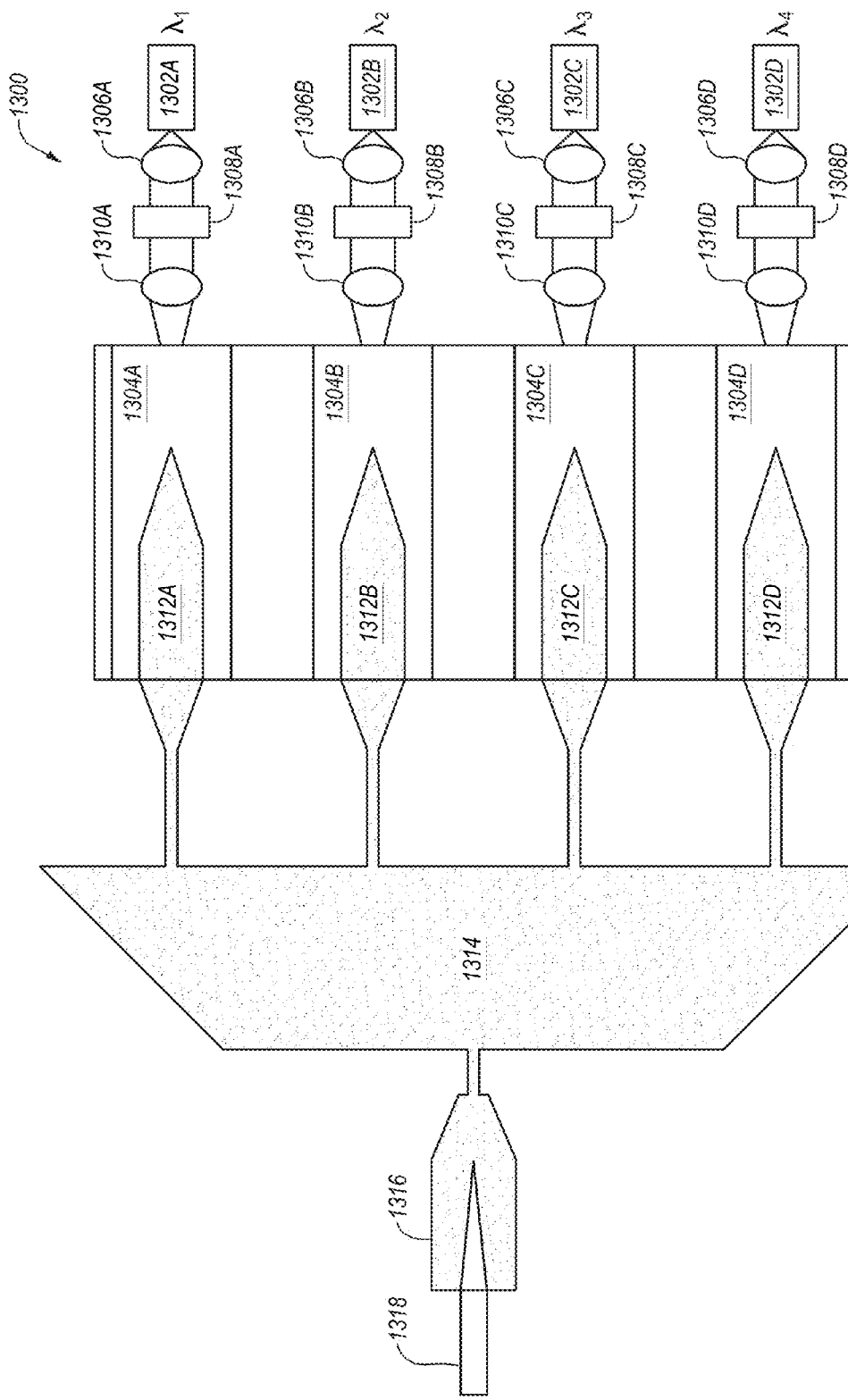
FIG. 13 is an overhead view of another example optoelectronic system (hereinafter "system")

FIG. 13 is an overhead view of another example optoelectronic system 1300 (hereinafter "system 1300"), arranged in accordance with at least some embodiments described herein. The system 1300 includes N (N>=2) DFB lasers 1302A-1302D configured to emit optical signals of different wavelengths λ1-λN, where N is 4 in the example of FIG. 13. Each of the DFB lasers 1302A-1302D is optically coupled to a corresponding interposer waveguide 1304A-1304D through a corresponding first lens 1306A-1306D, a corresponding optical isolator 1308A-1308D, and a corresponding second lens 1310A-1310D as described with respect to FIGS. 12A-12B.

The output of each of the DFB lasers 1302A-1302D is received by a corresponding one of the interposer waveguides 1304A-1304D (each made up of an interposer core and interposer cladding and formed on an interposer substrate) and is adiabatically coupled from the corresponding interposer waveguide 1304A-1304D into a corresponding SiN waveguide 1312A-1312D included in a first layer of a Si PIC included in the system 1300 of FIG. 13. The Si PIC of the system 1300 may be similar or identical to one or more of the other Si PICs described herein. The adiabatic coupling is accomplished as described above, e.g., by providing the SiN waveguides 1312A-1312D with tapered ends that are aligned in two orthogonal dimensions with a corresponding coupler portion of the corresponding interposer waveguides 1304A-1304D. Rather than each of the SiN waveguides 1312A-1312D adiabatically coupling a corresponding one of N optical signals output by the N DFB lasers 1302A-1302D immediately into a corresponding Si waveguide in a second layer of the Si PIC that is vertically displaced above or below the first layer, the SiN waveguides 1312A-1312D are optically coupled within the first layer of the Si PIC to a passive optical device 1314 included in the first layer of the Si PIC of FIG. 13.

In the example of FIG. 13, the passive optical device 1314 includes a WDM component such as a WDM mux. The WDM mux may include a cascade of Mach-Zehnder (MZ) interferometers, an arrayed waveguide grating (AWG), an Echelle grating, or other suitable WDM mux. More generally, the passive optical device 1314 may include any passive optical device suitable for formation in SiN.

The N optical signals output by the N DFB lasers 1302A-1302D are directed by the SiN waveguides 1312A-1312D into the passive optical device 1314. The passive optical device 1314 multiplexes the N optical signals into a multiplexed optical signal output to a common SiN output waveguide 1316 included in the first layer of the Si PIC of FIG. 13. The common SiN output waveguide 1316 may be configured similar or identical to other SiN waveguides described herein. The multiplexed optical signal is adiabatically coupled from the common SiN output waveguide 1316 into a Si waveguide 1318 formed in the second layer of the Si PIC. The adiabatic coupling is accomplished as described above, e.g., by providing the Si waveguide 1318 with a tapered end that is aligned in the two orthogonal dimensions with a coupler portion of the common SiN output waveguide 1316.

Figure 14:
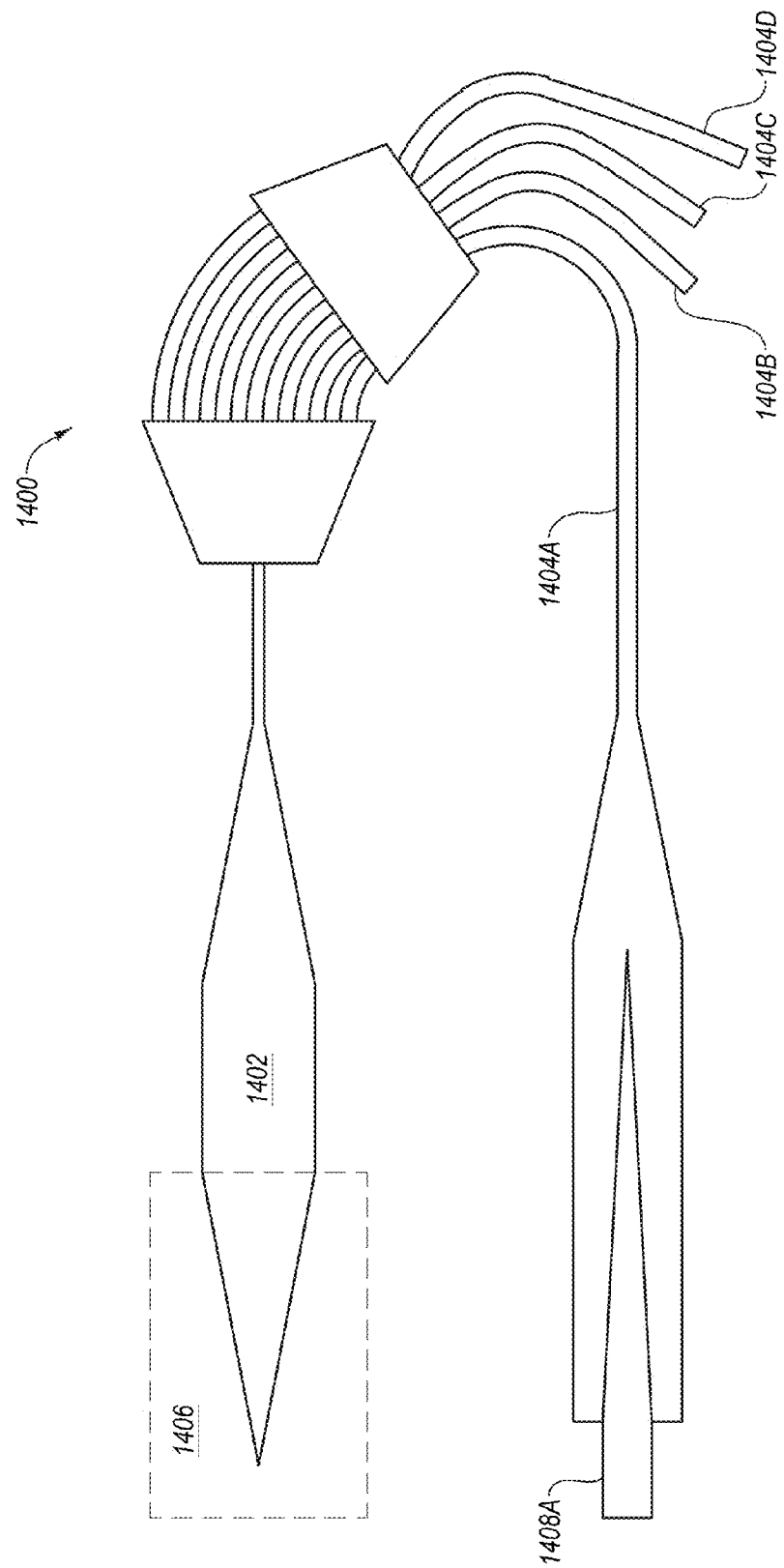
FIG. 14 is an overhead view of an example arrayed waveguide grating (AWG) that may be formed as a passive optical device such as a WDM component using SiN.

FIG. 14 is an overhead view of an example AWG 1400 that may be formed as a passive optical device such as a WDM component (e.g., a WDM mux or WDM demux) using SiN in, e.g., the first layers 206, 710, 910, 1110 of the Si PICs 102, 702, 902, 1102, arranged in accordance with at least one embodiment described herein. The first layer of the Si PIC may include a SiN waveguide 1402, the AWG 1400, and SiN waveguides 1404A-1404D. An interposer waveguide 1406 of an interposer forms an adiabatic coupler region with the SiN waveguide 1402. A Si waveguide 1408A formed in a second layer of the Si PIC forms an adiabatic coupler region with the SiN waveguide 1404A. Although not illustrated in FIG. 14, other Si waveguides formed in the second layer of the Si PIC may form adiabatic coupler regions with the other SiN waveguides 1404B-1404D.

In some embodiments, the AWG 1400 is a WDM demux, in which case a multiplexed optical signal is adiabatically coupled from the interposer waveguide 1406 into the SiN waveguide 1402 and provided to the AWG 1400, which demultiplexes the multiplexed optical signal into multiple output signals (e.g., separate wavelength channels) separately output to the SiN waveguides 1404A-1404D. Each of the output signals may then be adiabatically coupled from the corresponding SiN waveguide 1404A-1404D into a corresponding Si waveguide, such as the Si waveguide 1408A in the case of the SiN waveguide 1404A.

In some embodiments, the AWG 1400 is a WDM mux, in which case a different one of multiple input signals (e.g., separate wavelength channels) is adiabatically coupled from a corresponding Si waveguide, such as the Si waveguide 1408A or other Si waveguides of the Si PIC), into a corresponding SiN waveguide 1404A-1404D. The SiN waveguides 1404A-1404D provide their respective input signal to the AWG 1400, which multiplexes the various input signals into a multiplexed optical signal output to the SiN waveguide 1402. The multiplexed optical signal may then be adiabatically coupled from the SiN waveguide 1402 to the interposer waveguide 1406.

In FIG. 14 (and in FIG. 13), each of the SiN waveguides 1402 and 1404A-1404D may taper down from a relatively wide SiN waveguide to a relatively narrow SiN waveguide whose effective indexes for TE and TM are the same. Accordingly, the SiN-based AWG 1400 of FIG. 14 may be based on a zero-birefringent SiN waveguide.

Figure 15:
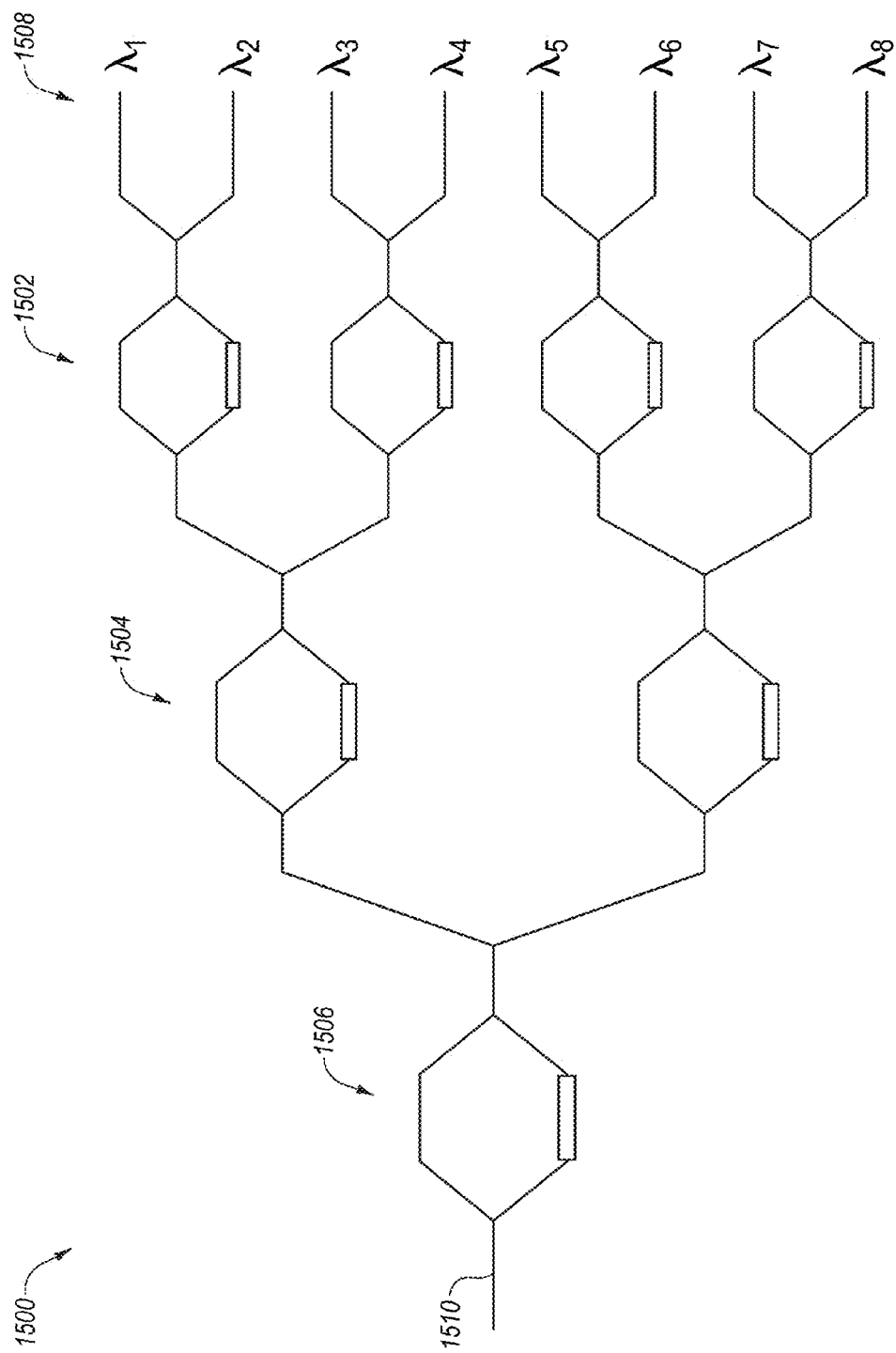
FIG. 15 is an overhead view of an example cascade of MZ interferometers that may be formed as a passive optical device such as a WDM component using SiN.

FIG. 15 is an overhead view of an example cascade of MZ interferometers 1500 that may be formed as a passive optical device such as a WDM component (e.g., a WDM mux) using SiN in, e.g., the first layers 206, 710, 910, 1110 of the Si PICs 102, 702, 902, 1102, arranged in accordance with at least one embodiment described herein. The cascade of MZ interferometers 1500 may include or correspond to the passive optical device 1314 of FIG. 13. Although the cascade MZ interferometer 1500 of FIG. 15 is illustrated as a WDM mux that accepts N (N>=2) input optical signals and outputs one multiplexed optical signal, the cascade MZ interferometer 1500 may instead be implemented as a WDM demux that accepts one multiplexed optical signal and outputs N individual optical signals.

The cascade of MZ interferometers 1500 may include a first stage 1502 of MZ interferometers with a delay in one arm of each of the MZ interferometers of the first stage 1502 of $\Delta L$, a second stage 1504 of MZ interferometers with a delay in one arm of each of the MZ interferometers of the second stage 1504 of $2 \cdot \Delta L$, and a third stage 1506 with one MZ interferometer with a delay in one arm of the MZ interferometer of the third stage 1506 of $4 \cdot \Delta L$. An input to each MZ interferometer of each stage may include a 2×2 multimode interference (MMI) coupler and an output from each MZ interferometer of each stage may include a 1×2 MMI coupler. The input of each MZ interferometer of each stage may alternatively include a 50/50 directional coupler.

The first stage 1502 of MZ interferometers may have inputs coupled to SiN waveguides 1508. Similar to the SiN waveguides 1312A of FIG. 13, the SiN waveguides 1508 of FIG. 15 may form adiabatic coupler regions with corresponding interposer waveguides to adiabatically couple different wavelength channels from a corresponding optical signal source, such as a corresponding one of the DFBs 1302A-1302D of FIG. 13, into the cascade of MZ interferometers 1500.

The third stage 1506 of MZ interferometers may have an output coupled to an SiN waveguide 1510. Similar to the SiN waveguide 1316 of FIG. 13, the SiN waveguide 1510 of FIG. 15 may form an adiabatic coupler region with a Si waveguide to adiabatically couple a multiplexed output signal from the cascade of MZ interferometers 1500 into the Si waveguide.

Figure 16:
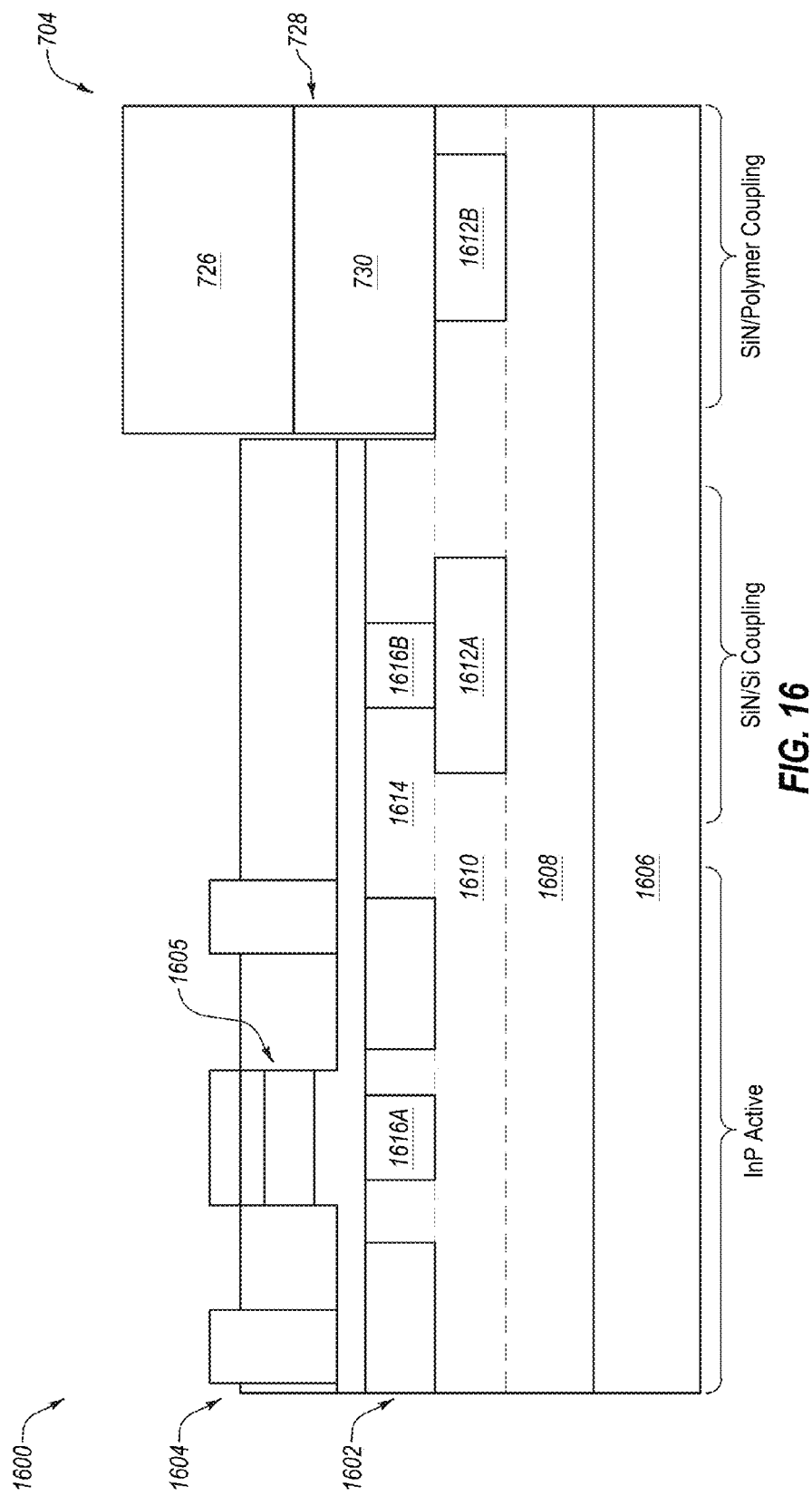
FIG. 16 is a side view of another example two-stage adiabatically coupled photonic system (hereinafter "photonic system")

FIG. 16 is a side view of another example two-stage adiabatically coupled photonic system 1600 (hereinafter "photonic system 1600"), arranged in accordance with at least one embodiment described herein. The photonic system 1600 includes a Si PIC 1602, the interposer 704, and a semiconductor chip 1604.

The Si PIC 1602 includes a Si substrate 1606, a SiO$_2$ box 1608, a first layer 1610 with one or more SiN waveguides 1612A, 1612B, and a second layer 1614 with one or more Si waveguides 1616A, 1616B. The Si substrate 1606, the SiO$_2$ box 1608, the first layer 1610, the SiN waveguides 1612A, 1612B, the second layer 1614, and the Si waveguides 1616A, 1616B may generally be similar or identical to, respectively, any of the other Si substrates, SiO$_2$ boxes, first layers, SiN waveguides, second layers, and Si waveguides disclosed herein except as otherwise indicated herein. For instance, the Si waveguide 1616B may be adiabatically coupled to the SiN waveguide 1612A and the SiN waveguide 1612B may be adiabatically coupled to the interposer waveguide 730, in a similar manner as generally described above. In some embodiments, the first layer 110 may include a WDM component and/or other features as described elsewhere herein.

The semiconductor chip 1604 may be wafer bonded to the Si PIC 1602 above the second layer 1614 of the Si PIC 1602. The semiconductor chip 1604 may include an active optical device 1605, such as an InP-based gain element or gain region needed to form a laser or an InP-based pin detector. The active optical device 1605 of the semiconductor chip 1604 may be optically coupled to one or both of the Si waveguide 1616A or the Si waveguide 1616B. Alternatively, the Si waveguides 1616A and 1616B may include opposite ends of the same Si waveguide. Accordingly, light may be exchanged between the active optical device 1605 and one or both of the Si waveguides 1616A or 1616B. In an example implementation, the Si waveguide 1616B includes a tapered end to adiabatically couple light into (or out of) the SiN waveguide 1612A, and an end of the Si waveguide 1616B opposite its tapered end may include the Si waveguide 1616A which may be optically coupled to the active optical device 1605 of the semiconductor chip 1604. A so-called hybrid laser structure can be formed by the InP gain element and Si by adding reflective distributed Bragg reflectors (DBRs) in Si on either side of the InP gain region. The Si DBRs in either side of the InP gain region form an optical cavity with gain which hence produces a laser.

In some Si PICs described herein, the Si PIC may include metal layers and/or metallized structures for electrical contact to active optical components of the Si PIC. Such active optical components may be fabricated at the so-called Back End of Line (BEOL) process. Further, to couple light between the Si PIC and an interposer as described herein, an etched window through one or more upper layers down to a layer that includes a SiN waveguide may be formed to expose the SiN waveguide for coupling to an interposer waveguide included in the interposer. In these and other implementations, a top layer of the Si PIC may include metal dummies to maintain flatness after CMP. The metal dummies may have to maintain a certain fill factor. The area of the etched window may be determined by the metal dummy fill factor and may be limited to a few square millimeters (mm$^2$).

Figure 17:
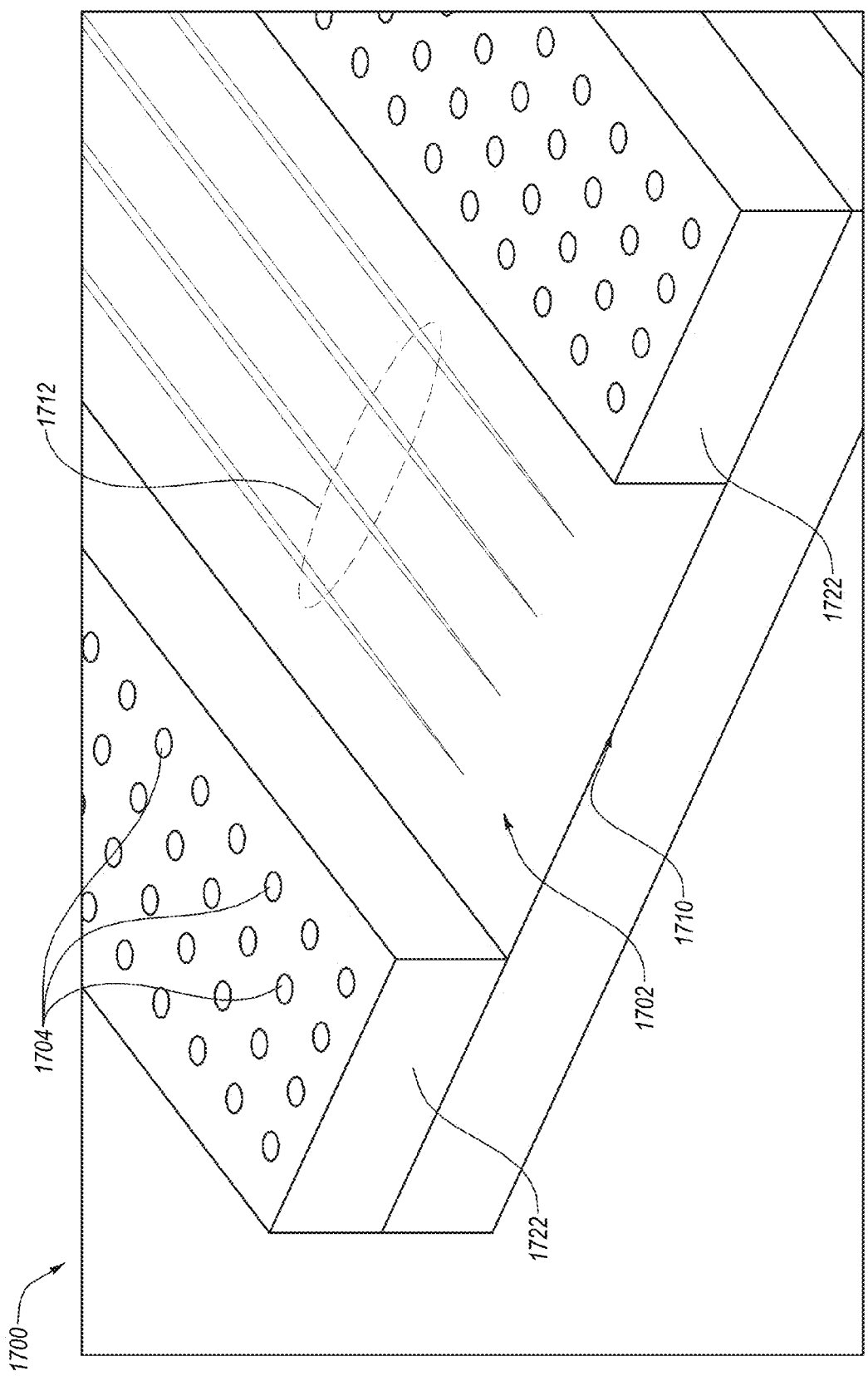
FIG. 17 is a perspective view of an example Si PIC that defines an etched window.

FIG. 17 is a perspective view of an example Si PIC 1700 that defines an etched window 1702, arranged in accordance with at least one embodiment described herein. The Si PIC 1700 includes a first layer 1710 with various SiN waveguides 1712, tapered ends of which are visible in the etched window 1702. The Si PIC 1700, the etched window 1702, the first layer 1710, and the SiN waveguides 1712 may generally be similar or identical to other Si PICs, etched windows, first layers, and SiN waveguides disclosed herein except as otherwise indicated herein. The Si PIC 1700 may additionally include one or more other components or elements similar to those described with respect to one or more of the other Si PICs disclosed herein.

The Si PIC 1700 additionally includes one or more dielectric layers 1722 above the first layer 1710, which dielectric layers may be similar or identical to other dielectric layers disclosed herein. The etched window 1702 may be formed by etching through the dielectric layers 1722 to the first layer 1710. Accordingly, the etched window 1702 may be bounded on three sides (two of which are visible in FIG. 17) by the dielectric layers 1722. At least a topmost one of the dielectric layers 1722 includes metal dummies 1704 at least in a region that bounds the etched window 1702 on the three sides. Alternatively, the metal dummies 1704 may extend from the topmost one of the dielectric layers 1722 downward through up to all of the dielectric layers 1722 or some portion thereof.

In an example embodiment, each of the tapered ends of the SiN waveguides 1712 may be about 2.2 millimeters (mm) long such that the etched window 1702 is also at least that long, the dielectric layers 1722 may be about 5-6 µm thick such that the etched window 1702 is etched through the dielectric layers 1722 at least that deep, the SiN waveguides 1712 may have a pitch of about 50 µm, and the etched window 1702 may have a width of 400 µm. Other particular values are possible depending on the desired implementation.

Figure 18:
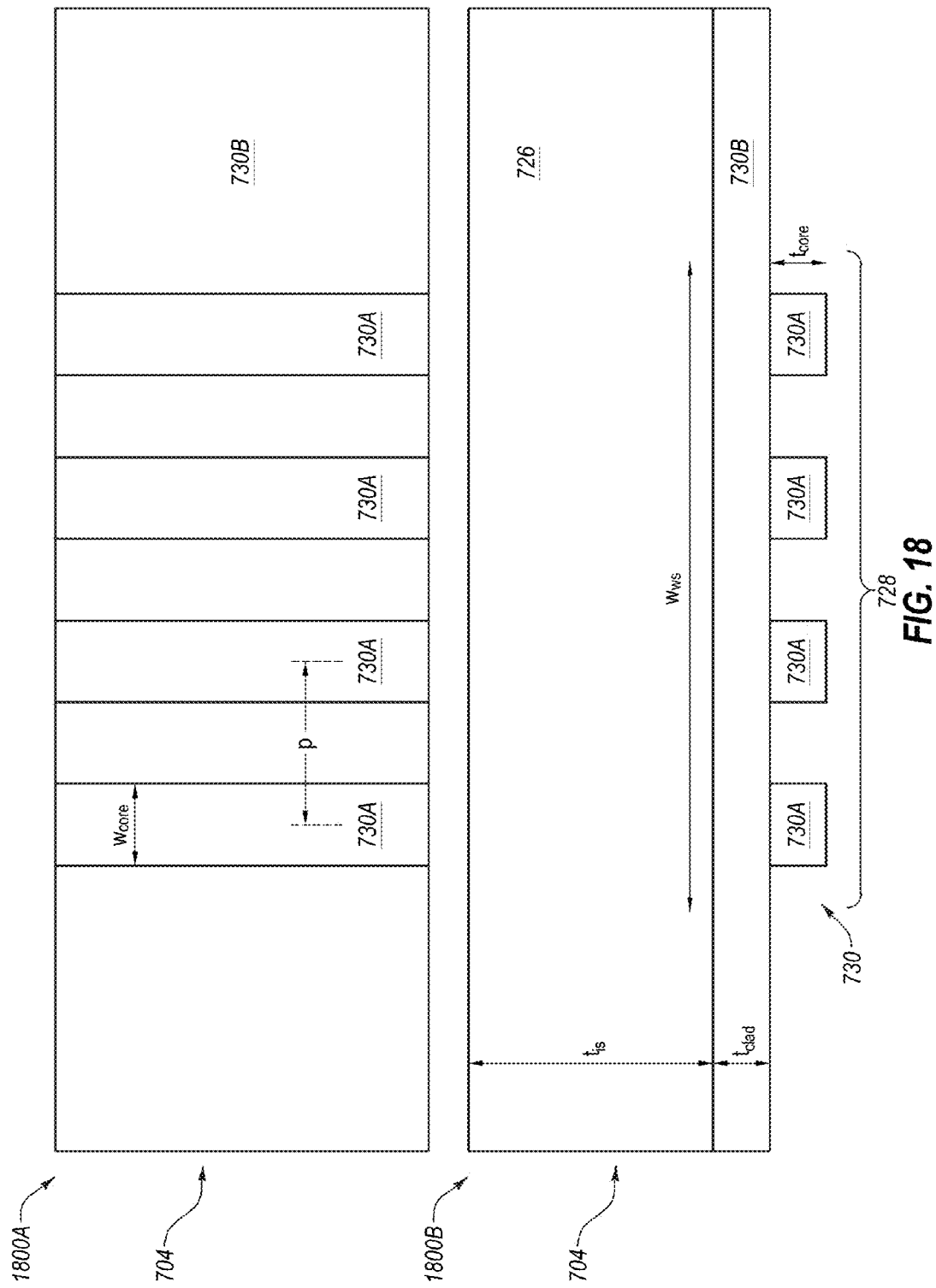
FIG. 18 includes a bottom view and a side view of an implementation of a portion of an interposer that may be coupled to the Si PIC of FIG. 17 within the etched window of FIG. 17.

FIG. 18 includes a bottom view 1800A and a side view 1800B of an implementation of a portion of the interposer 704 that may be coupled to the Si PIC 1700 of FIG. 17 within the etched window 1702, arranged in accordance with at least one embodiment described herein. In the embodiment of FIG. 18, the interposer 704 includes the interposer substrate 726 and the waveguide strip 728 coupled thereto. The waveguide strip 728 includes multiple interposer waveguides 730, each of which includes interposer core 730A and interposer cladding 730B. In the example of FIG. 18, the interposer 704 may include a polymer interposer such that the interposer substrate 726, the interposer cores 730A, and the interposer cladding 730B respectively include a polymer substrate, polymer cores, and polymer cladding.

A thickness $t_{is}$ of the interposer substrate 726 may be greater than or equal to about 100 µm. A thickness $t_{clad}$ of the interposer cladding 730B may be about 14 µm. A pitch p of the interposer cores 730A, e.g., a nominal core center-to-core center spacing of the interposer cores 730A, may be about 50 µm, or more generally X µm. A width $w_{core}$ of each of the interposer cores 730A may be about 8 µm. A thickness $t_{core}$ of each of the interposer cores 730A may be less than or equal to a depth of a corresponding etched window of a corresponding Si PIC to which the interposer 704 is to be coupled. A width $w_{ws}$ of the waveguide strip 728 may be about N times X, where N is a number of the interposer cores 730A and X is the pitch p or nominal core center-to-core center spacing. A minimum width of the corresponding etched window may also be N times X. Other particular values are possible depending on the desired implementation.

In the views 1800A and 1800B of FIG. 18, the interposer cores 730A include coupler portions of the polymer waveguides 730. The coupler portions visible in FIG. 18 may be aligned as described above with tapered ends of corresponding SiN waveguides accessible through the corresponding etched window. The coupler portions are exposed on three of four sides along their length with the interposer cladding 730B being disposed adjacent to the remaining one of the four sides along the length of the coupler portions. Alternatively, the coupler portions may be exposed only on a bottom side, or along the bottom side and only partially on one or both vertical sides. In these and other embodiments, tor a portion (not shown) of the interposer 704 that is not to be disposed inside a corresponding etched window, however, the interposer cores 730A may generally be surrounded on all four sides along their length by the interposer cladding 730B.

Figure 19A:
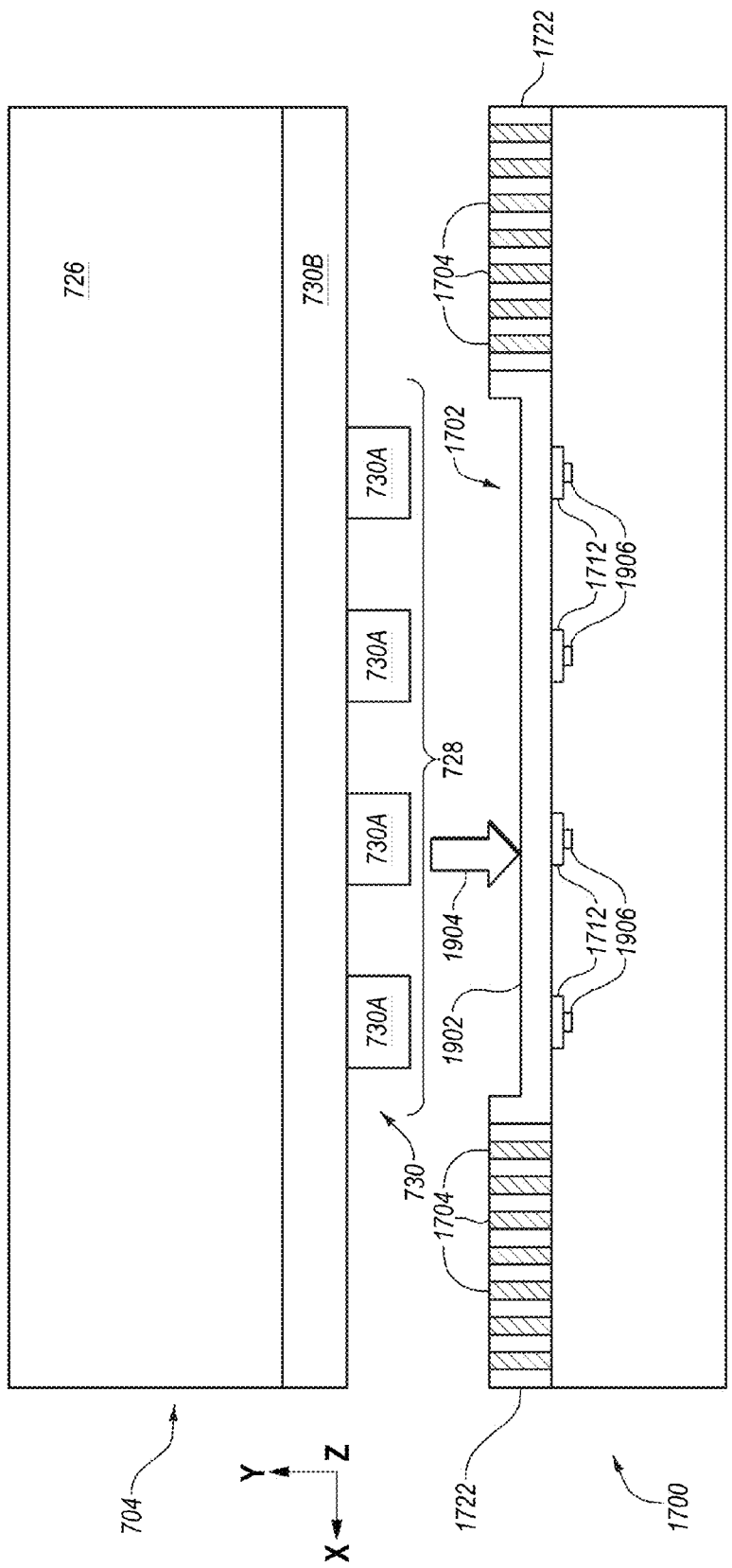
FIGS. 19A and 19B are side views that depict alignment and attachment of the interposer of FIG. 18 and the Si PIC of FIG. 17.
Figure 19B:
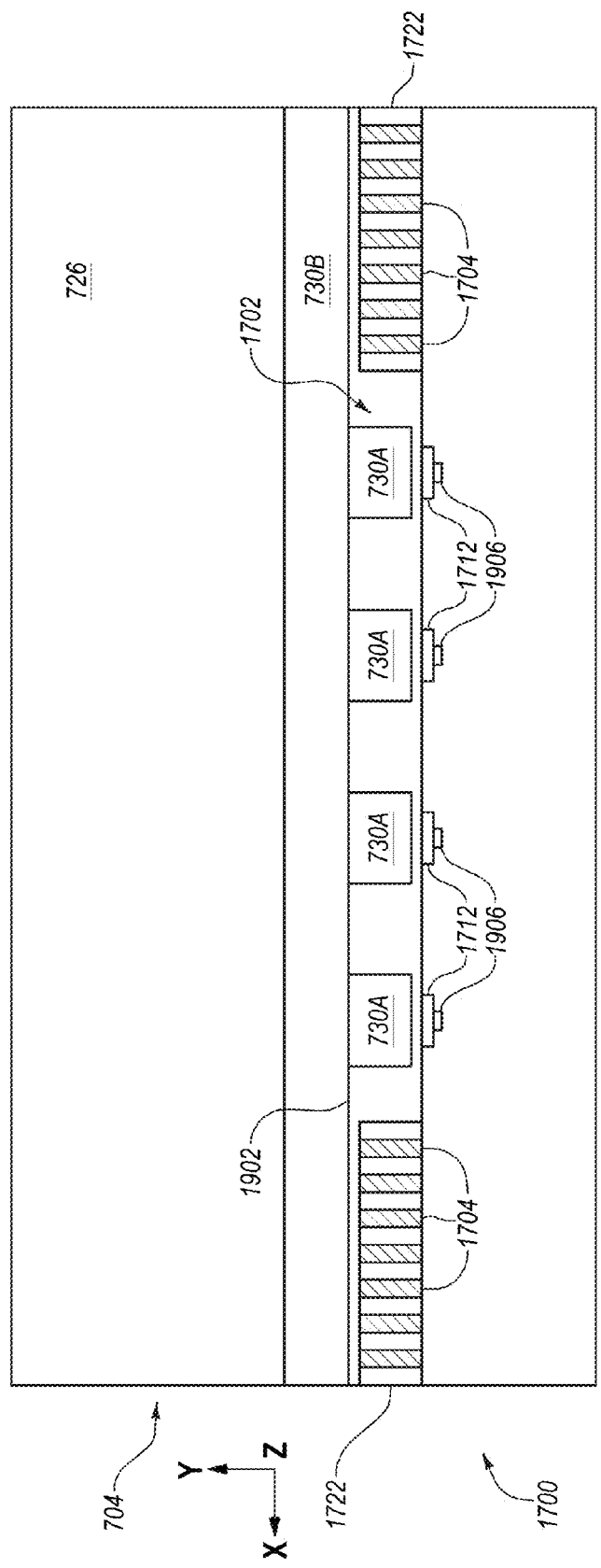

FIGS. 19A and 19B are side views that depict alignment and attachment of the interposer 704 of FIG. 18 and the Si PIC 1700 of FIG. 17, arranged in accordance with at least one embodiment described herein. As illustrated in FIG.

19A, the waveguide strip 728 of the interposer 704 is aligned to the etched window 1702 with the interposer cores 730A generally aligned in the x and z directions with the SiN waveguides 1712 to form adiabatic coupler regions as described elsewhere herein. The etched window 1702 may be at least partially filled with an epoxy underfill 1902. The interposer 704 may then be moved towards the Si PIC 1700 (or vice versa) as indicated by the arrow 1904 in FIG. 19A until the interposer cores 730A are in direct or at least close contact with the SiN waveguides 1712, as illustrated in FIG. 19B. As used herein, direct contact between two components or elements means the two components are actually touching each other. Close contact as used herein means the two components are sufficiently close for light to be optically coupled from one component to the other. Such components in close contact may optionally include between the two components an epoxy or other adhesive. Any descriptions herein referring to direct contact can also include close contact which may include a thin layer of, e.g., adhesive. As illustrated in FIG. 19B, there may be sufficient underfill epoxy 1902 to overflow the etched window 1902 so as to epoxy the top of the dielectric layers 1722 to the interposer cladding 730B of the interposer 704.

FIGS. 19A and 19B additionally illustrate Si waveguides 1906 included in the Si PIC 1700 that may generally be aligned in the x and z directions with the SiN waveguides 1712 to form adiabatic coupler regions as described elsewhere herein.

Figure 20:
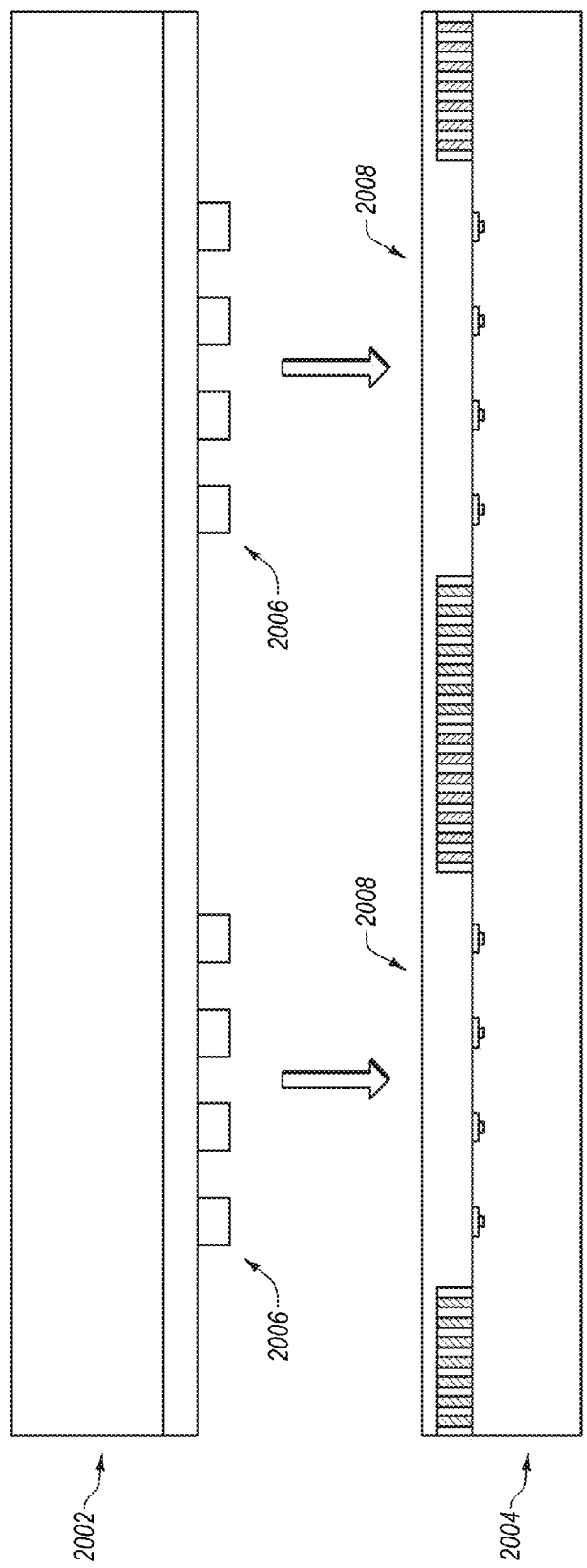
FIG. 20 is a side view that depicts alignment of another interposer and Si PIC.

FIG. 20 is a side view that depicts alignment of another interposer 2002 and Si PIC 2004, arranged in accordance with at least one embodiment described herein. The example of FIG. 20 implements a multiple window geometry to satisfy maximum window size and metal dummy fill factor constraints and may otherwise be similarly configured to other embodiments discussed above, including implementation of two-stage adiabatic coupling as discussed herein. In this and other embodiments, the interposer 2002 may include multiple waveguide strips 2006 and the Si PIC 2004 may include multiple etched windows 2008. Each of the waveguide strips 2006 and etched windows 2008 may generally be similar or identical to any of the other waveguide strips and etched windows disclosed herein. In general, a lower surface of the interposer 2002, at least in a region where the interposer 2002 couples to the Si PIC 2004, may be complementary to an upper surface of the Si PIC 2004, at least in a region where the Si PIC 2004 couples to the polymer interposer 2002.

Figure 21:
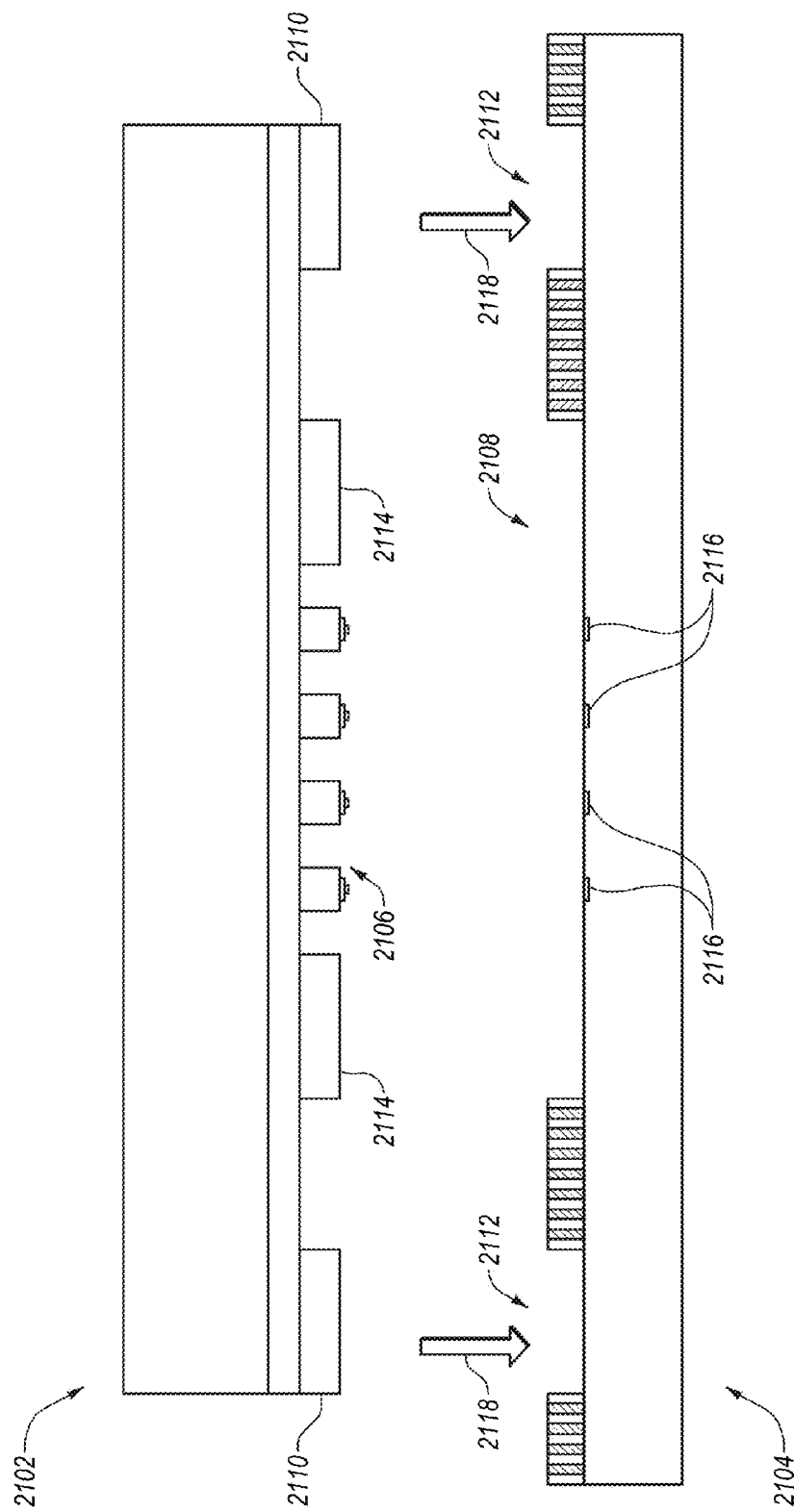
FIG. 21 is a side view that depicts alignment of another interposer and Si PIC.

FIG. 21 is a side view that depicts alignment of another interposer 2102 and Si PIC 2104, arranged in accordance with at least one embodiment described herein. The interposer 2102 includes one or more waveguide strips 2106 while the Si PIC 2104 includes one or more etched windows 2108. In addition, the example of FIG. 21 implements one or more interposer alignment ridges 2110 and corresponding Si PIC anchor windows 2112 and/or one or more dummy interposer islands 2114 and is otherwise similarly configured to other embodiments discussed above, including implementation of two-stage adiabatic coupling as discussed herein.

The interposer alignment ridges 2110 in some embodiments may be formed from the same material as the interposer cores, interposer cladding, or interposer substrate of the interposer 2102. Alternately or additionally, each of the interposer alignment ridges 2110 may be about 100 to 200 μm wide and the same or a different thickness as the interposer cores.

The anchor windows 2112 may be etched through one or more dielectric layers of the Si PIC 2104 that are above a corresponding first layer of the Si PIC 2104 that includes SiN waveguides 2116 that are to be optically coupled to interposer waveguides included in the waveguide strip 2106. The shapes and locations of the anchor windows 2112 may be complementary to the shapes and locations of the interposer alignment ridges 2110. When attaching the polymer interposer 2102 to the Si PIC 2104, the interposer alignment ridges 2110 may be aligned to the anchor windows 2104, which may in turn align exposed coupler portions of the interposer waveguides of the waveguide strip 2106 to the SiN waveguides 2116. The interposer 2102 may then be moved towards the Si PIC 2104 (or vice versa) as indicated by the arrows 2118 in FIG. 21 until the interposer cores are in direct or at least close contact with the SiN waveguides 2116 to form corresponding adiabatic coupler regions.

The dummy interposer islands 2114 in some embodiments may be formed from the same material as the interposer cores, interposer cladding, or interposer substrate of the interposer 2102. Alternately or additionally, each of the dummy interposer islands 2114 may be the same or a different width as the interposer alignment ridges 2110 and the same or a different thickness as the interposer cores. A width of the etched window 2108 may be sufficient to accommodate therein the dummy interposer islands 2114 and the waveguide strip 2106 (or more particularly the coupler portions of the interposer waveguides included therein). The dummy interposer islands 2114 may be separated from the nearest interposer waveguides by a sufficient distance to not perturb the optical mode in the nearest interposer waveguides. For example, each of the dummy interposer islands 2114 may be separated from a corresponding nearest interposer waveguide of the waveguide strip 2106 by at least 30 μm. In general, the dummy interposer islands 2114 may provide a relatively large and flat surface to facilitate mechanical attachment process between the interposer 2102 and the Si PIC 2104.

Figure 22:
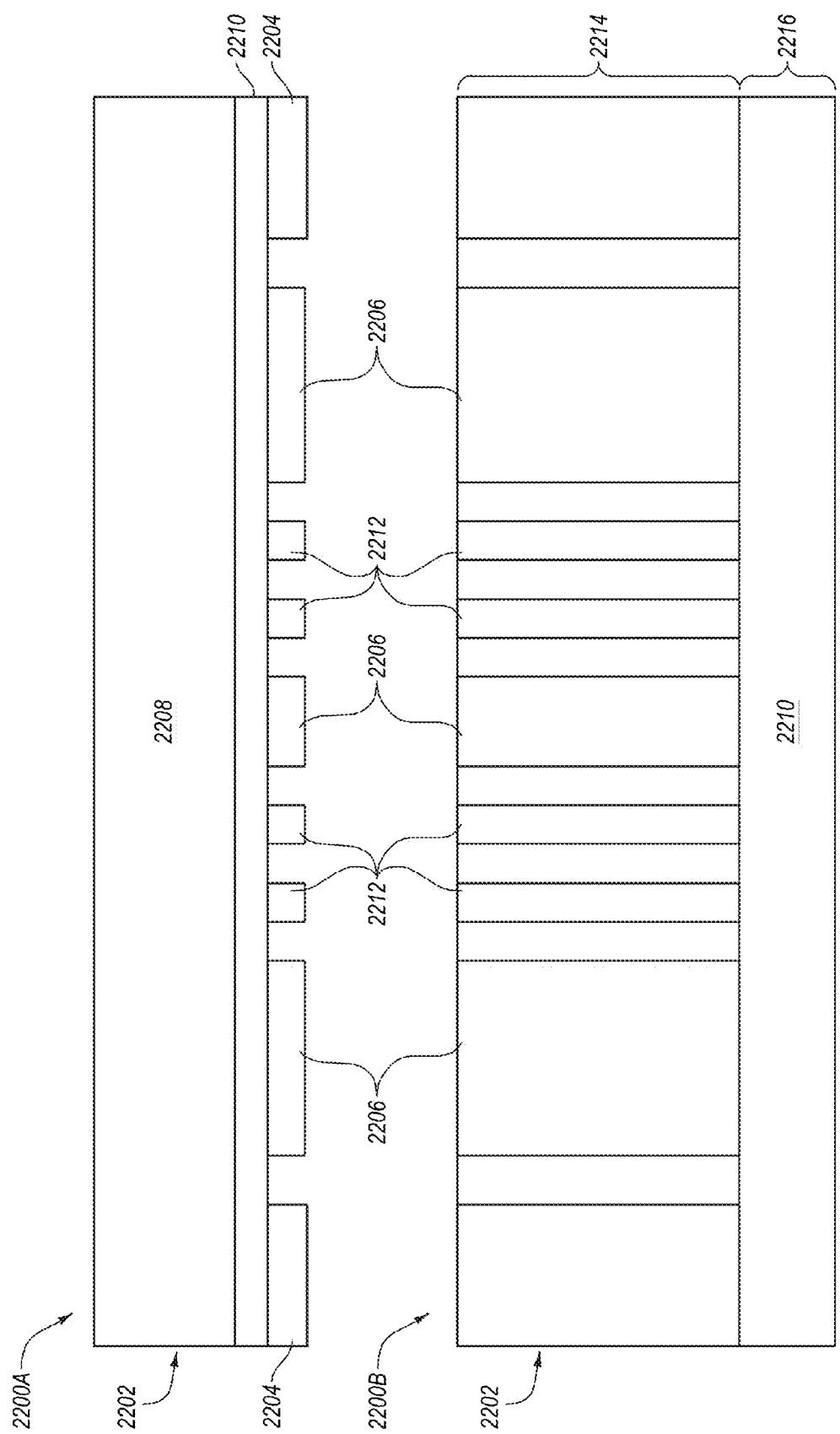
FIG. 22 includes a side view and a bottom view of another arrangement of an interposer with interposer alignment ridges and dummy interposer islands.

FIG. 22 includes a side view 2200A and a bottom view 2200B of another arrangement of an interposer 2202 with interposer alignment ridges 2204 and dummy interposer islands 2206, arranged in accordance with at least one embodiment described herein. Similar to other interposers disclosed herein, the interposer 2202 may include an interposer substrate 2208, an interposer cladding 2210, and interposer cores 2212. In some embodiments, the interposer 2202 includes a polymer interposer in which each of the interposer substrate 2208, the interposer cladding 2210, and the interposer cores 2212 include polymer. As illustrated in the bottom view 2200B, the interposer cladding 2210 may be removed from a bottom and/or sides of the interposer waveguides 2212 at least in a region 2214 of the interposer 2202 to be received in an etched window of an Si PIC. In a region 2216 of the interposer 2202 that is not received in the etched window, the interposer cladding 2210 may surround all sides of the interposer waveguides 2212 along their length.

Figure 23A:
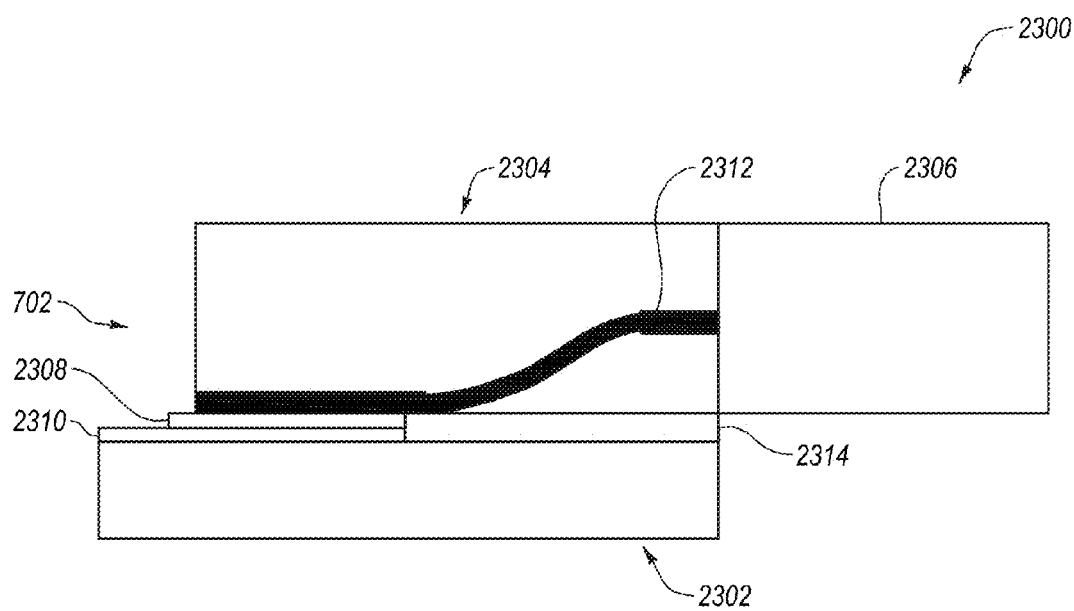
FIG. 23A is a side view of another example two-stage adiabatically coupled photonic system (hereinafter "photonic system") that includes a Si PIC, an interposer, and an optical fiber end connector 2306 (hereinafter "connector")

FIG. 23A is a side view of another example two-stage adiabatically coupled photonic system 2300 (hereinafter "photonic system 2300") that includes a Si PIC 2302, an interposer 2304, and an optical fiber end connector 2306 (hereinafter "connector 2306"), arranged in accordance with at least one embodiment described herein. The Si PIC 2302 and the interposer 2304 may be similar or identical to, respectively, any of the other Si PICs and interposers disclosed herein except as otherwise indicated herein.

For example, the Si PIC 2302 may include one or more SiN waveguides 2308 formed in a first layer of the Si PIC and one or more Si waveguides 2310 formed in a second layer of the Si PIC that is below (or above in other embodiments) the first layer. Each of the Si waveguides 2310 may include a tapered end aligned in two orthogonal directions with a coupler portion of a corresponding one of the SiN waveguide 2308 to form an adiabatic coupler region. Analogously, each of the SiN waveguides 2308 may include a tapered end aligned in the two orthogonal directions with a coupler portion of a corresponding one of one or more interposer waveguides 2312 included in the interposer 2304 to form another adiabatic coupler region.

The interposer 2304 may include a high index glass waveguide block or high index glass waveguide interposer. Accordingly, in this example, the interposer waveguides 2312 may include high index glass waveguides that may be written into the high index glass waveguide block, e.g., by ion exchange method, ultraviolet (UV) radiation laser writing, or other suitable index altering radiation or process.

Each of the interposer waveguides 2312 may generally be aligned relative to a corresponding one of the SiN waveguides 2308 actively or passively to form adiabatic coupler regions. The alignment of each of the SiN waveguides 2308 to the corresponding Si waveguide 2310 may be achieved in the fabrication process to form adiabatic coupler regions.

An epoxy underfill 2314 may be provided between the interposer 2304 and the Si PIC 2302 to form a mechanical attachment therebetween.

The connector 2306 may include a multi-fiber push on (MPO) connector or other suitable optical fiber end connector.

The interposer 2304 may be coupled to the connector 2306, which in turn may be coupled to one or more optical fibers (not shown). Light may be coupled from the optical fibers into the interposer waveguides 2312 of the interposer 2304, and/or from the interposer waveguides 2312 of the interposer 2304 into the optical fibers.

Figure 23B:
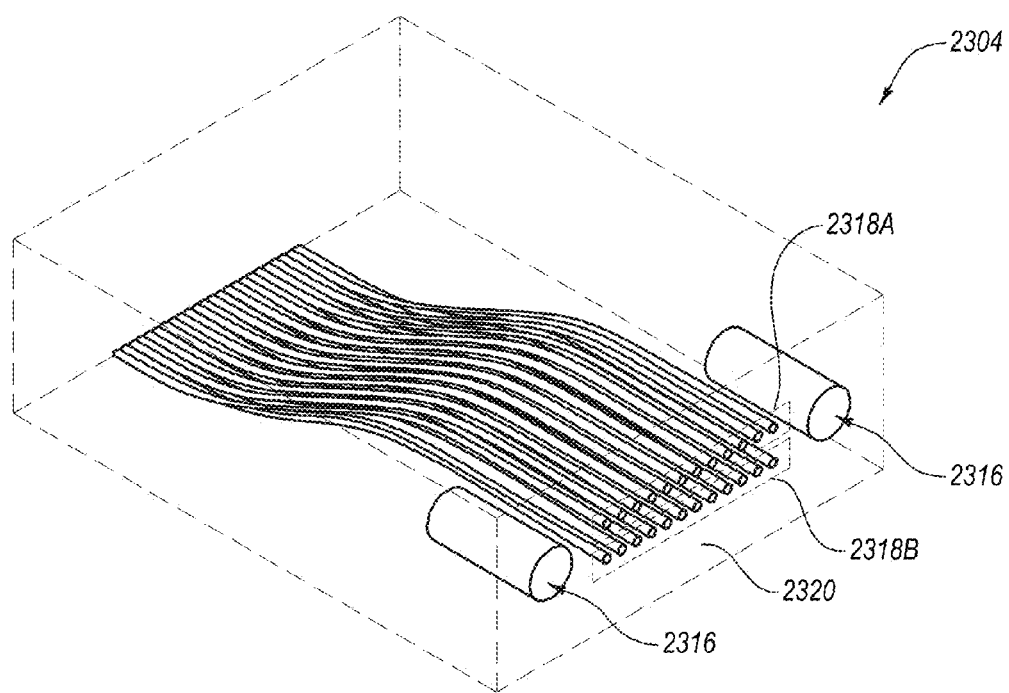
FIG. 23B is a perspective view of the interposer of FIG. 23A.

FIG. 23B is a perspective view of the interposer 2304 of FIG. 23A, arranged in accordance with at least one embodiment described herein. In these and other implementations, the interposer 2304 may include one or more alignment guides or threaded openings 2316 to receive protrusions or threaded fasteners of the connector 2306 to couple the connector 2306 to the interposer 2304 and/or to optically align the interposer waveguides 2312 of the interposer 2304 with the optical fibers.

In some implementations, the interposer waveguides 2312 may be divided into two or more subsets or groups. In the example of FIG. 23B, the interposer waveguides 2312 are divided into a first subset 2318A of interposer waveguides 2312 and a second subset 2318B of interposer waveguides 2312. The interposer waveguides 2312 may be divided according to their intended function. For instance, the first subset 2318A of interposer waveguides 2312 may be used to carry incoming light from the optical fibers through the connector 2306 to the Si PIC 2302, and thus may be referred to as receive (RX) interposer waveguides 2312. Analogously, the second set 2318B of interposer waveguides 2312 may be used to carry outgoing light from the Si PIC 2302 to the optical fibers through the connector 2306, and thus may be referred to as transmit (TX) interposer waveguides 2312. Si waveguides in the second layer of the Si PIC 2302 and/or SiN waveguides in the first layer of the Si PIC 2302 may also be described as being RX or TX waveguides depending on the function they serve.

As illustrated in FIG. 23B, at an input/output surface 2320 of the interposer 2304, ends of the RX interposer waveguides 2312 in the first set 2318A may generally be arranged parallel to each other and coplanar, while ends of the TX interposer waveguides 2312 in the second set 2318B may also generally be arranged parallel to each other and coplanar. Alternately or additionally, at the input/output surface 2320, the ends of the RX interposer waveguides 2312 of the first set 2318A may be displaced from and parallel to the ends of the TX interposer waveguides 2312 of the second set 2318B in a double-decker arrangement, as illustrated in FIG. 23B.

The input/output surface 2320 of the interposer 2304 may be coupled to the connector 2306 of FIG. 23A. The double-decker arrangement of the RX interposer waveguides 2312 of the first set 2318A and the TX interposer waveguides 2312 of the second set 2318B at the input/output surface 2320 may match an arrangement of RX optical fibers and TX optical fibers to which the connector 2306 of FIG. 23A may be coupled. Other arrangements of the RX and TX interposer waveguides 2312 may be implemented to match other arrangements of the RX and TX optical fibers through the connector 2306.

Figure 24:
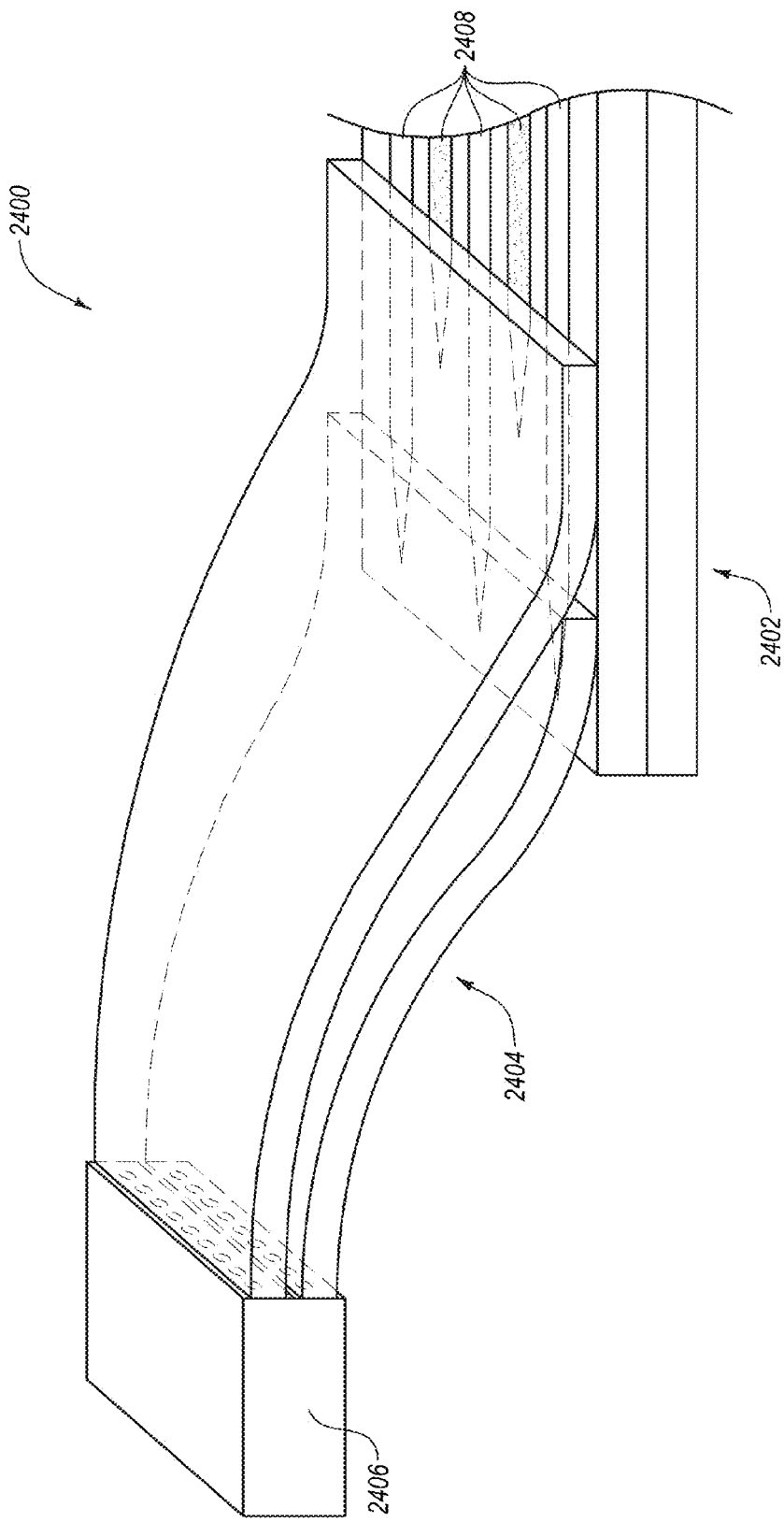
FIG. 24 is a perspective view of another example photonic system (hereinafter "photonic system")

FIG. 24 is a perspective view of another example photonic system 2400 (hereinafter "photonic system 2400") that includes a Si PIC 2402, an interposer 2404, and an optical fiber end connector 2406, arranged in accordance with at least one embodiment described herein. The photonic system 2400 additionally includes a Si PIC 2402 and an optical fiber end connector 2406. The Si PIC 2402, the interposer 2404, and the connector 2406 may be similar or identical to, respectively, any of the other Si PICs, interposers, and connectors disclosed herein except as otherwise indicated herein.

For example, the Si PIC 2402 may include one or more SiN waveguides 2408 formed in a first layer of the Si PIC and one or more Si waveguides (not shown) formed in a second layer of the Si PIC that is below (or above in other embodiments) the first layer. Each of the Si waveguides may include a tapered end aligned in two orthogonal directions with a coupler portion of a corresponding one of the SiN waveguide 2408 to form an adiabatic coupler region. Analogously, each of the SiN waveguides 2408 may include a tapered end aligned in the two orthogonal directions with a coupler portion of a corresponding one of one or more interposer waveguides included in the interposer 2404 to form another adiabatic coupler region.

The interposer 2404 may include a polymer interposer with a flexible polymer substrate and one or more polymer waveguides formed thereon. The polymer waveguides of the interposer 2404 may be divided into a first subset of RX polymer waveguides and a second subset of TX polymer waveguides, with the ends of the polymer waveguides arranged in a double decker arrangement where they connect to the connector 2406, similar to the double decker arrangement described with respect to FIG. 23B.

In general, light may be coupled out of or coupled into the Si PIC 2402 at a planar interface of the Si PIC 2402, e.g., a SiN/SiO$_2$ layer of the Si PIC 2402 that includes the SiN waveguides 2408 of the Si PIC 2402. Positions of the tapered ends of the SiN waveguides 2408 in the Si PIC 2402, and thus of tapered ends of the Si waveguides of the Si PIC 2402 may be offset for RX Si waveguides as compared to TX Si waveguides in the light propagation direction to better isolate incoming and outgoing light from each other.

Figure 25A:
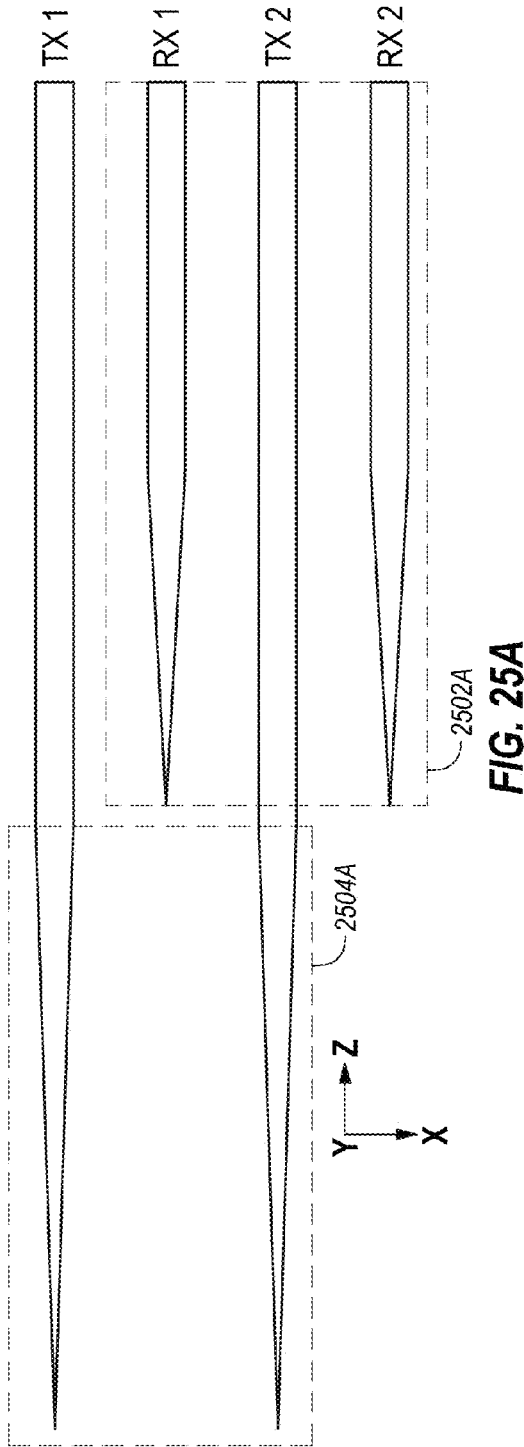
FIGS. 25A and 25B illustrate two different offset configurations for RX vs. TX SiN waveguides.
Figure 25B:
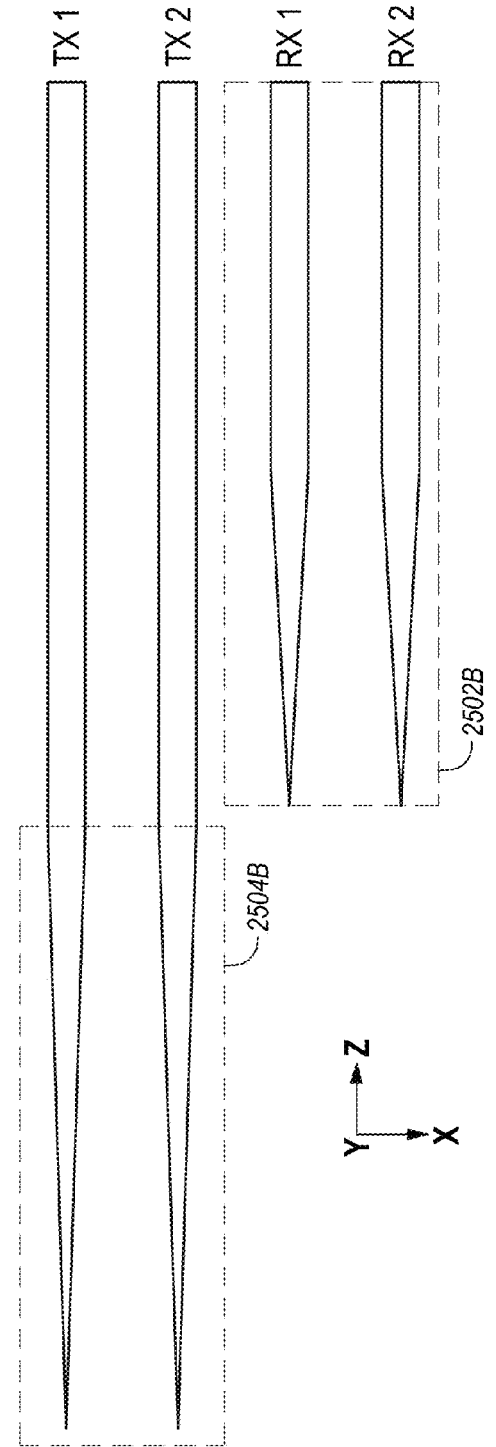

For example, FIGS. 25A and 25B illustrate two different offset configurations for RX vs. TX SiN waveguides, arranged in accordance with at least one embodiment described herein. In each of FIGS. 25A and 25B, tapered ends of RX SiN waveguides RX1 and RX2 terminate at a common z location (hereinafter "first z location") and tapered ends of TX SiN waveguides TX1 and TX2 terminate at a different common z location (hereinafter second z location) than for RX1 and RX2. In FIG. 25A, the tapered ends of the RX Si waveguides alternate with the tapered ends of the TX Si waveguides. In comparison, in FIG. 25B, the tapered ends of the RX SiN waveguides as a group are located next to the tapered ends of the TX SiN waveguides as a group.

Due to the z offset in FIGS. 25A and 25B between the RX and TX SiN waveguides, RX and TX portions of an interposer to couple light into or out of a Si PIC that includes the RX and TX SiN waveguides of FIGS. 25A-25B may be separated from each other. For instance, RX interposer waveguides of the interposer may be coupled to the Si PIC in a region generally denoted at 2502A in FIG. 25A and 2502B in FIG. 25B, while TX interposer waveguides of the interposer may be coupled to the Si PIC in a region generally denoted at 2504A in FIG. 25A and 2504B in FIG. 25B. Although FIGS. 25A and 25B are discussed in the context of SiN waveguide/interposer waveguide adiabatic coupler regions, the same principles may be applied for Si waveguide/interposer waveguide adiabatic coupler regions.

Some interposers discussed herein have been described as including polymer or high index glass. Other materials for the interposer are possible. For example FIG. 26 includes a side view 2600A and a bottom view 2600B of a silicon oxynitride (SiON) interposer 2602, arranged in accordance with at least one embodiment described herein.

The SiON interposer 2602 includes a SiON waveguide strip 2604 with multiple SiON waveguides 2606, each including a SiON core 2608 and a SiON cladding 2610. The SiON cores 2608 may be exposed (e.g., not surrounded by SiON cladding 2610) on at least one surface within a coupling region of the SiON interposer 2602 to be received in an etched window of a corresponding Si PIC so as to be aligned and brought into direct or at least close contact with corresponding SiN waveguides of the Si PIC.

In the illustrated embodiment, the SiON interposer 2602 includes SiON on $SiO_2$ substrate 2612 or other substrate. SiON has a refractive index that can vary between that of $SiO_2$ around 1.46 and that of SiN around 1.99 by changing the growth conditions of the fraction of O and N in the SiON portions of the SiON interposer 2602. A refractive index of around 1.51 can be achieved to form the SiON cladding 2610 and a slightly higher index of 1.516, for example, can be achieved to form the SiON cores 2608 of the SiON waveguides 2606.

A width ws of the $SiO_2$ substrate 2612 may be in a range from 2 mm to 7 mm. A pitch p of the SiON cores 2608 may be in a range from 50 µm to 250 µm. A width $w_{ws}$ of the waveguide strip 2604 may be in a range from 400 µm to 1.5 mm depending on number of SiON cores 2608 and the pitch p. A thickness $t_{clad}$ of the SiON cladding 2610 may be greater than or equal to 15 µm. A thickness $t_{core}$ and a width $w_{core}$ of the SiON cores 2608 may each be in a range from 6 µm to 8 µm. Other particular values are possible depending on the desired implementation.

Figure 26:
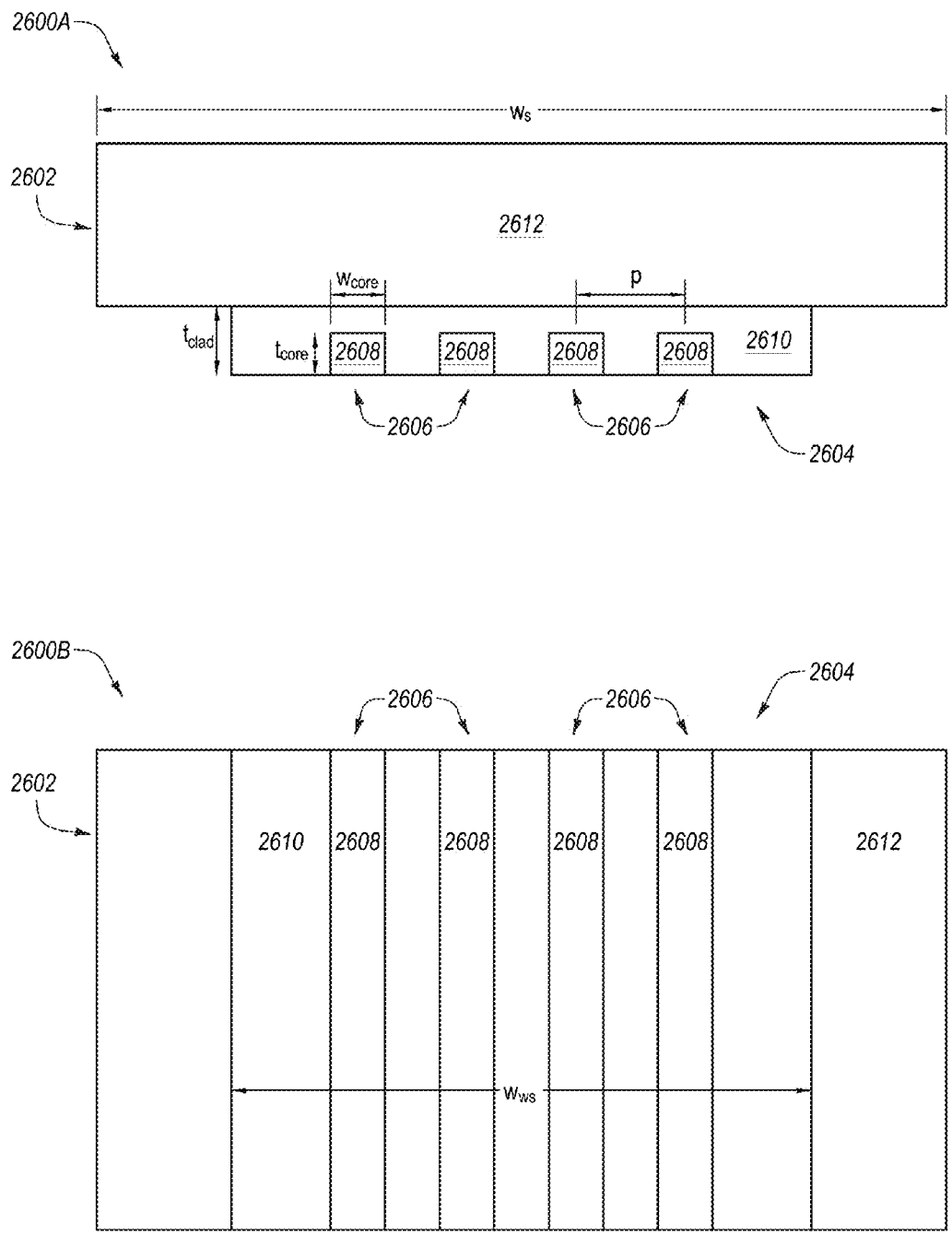
FIG. 26 includes a side view and a bottom view of a silicon oxynitride (SiON) interposer.

In the example of FIG. 26, the SiON cladding 2610 can be flush with a top surface (in a growth direction) of the SiON cores 2608 (which is the bottom surface in the orientation of the view 2600A of FIG. 26. The SiON waveguides 2606 may be aligned in two orthogonal directions with corresponding SiN waveguides of a Si PIC to form adiabatic coupler regions. The SiON of the SiON interposer 2602 can be etched to form a plug to fit a corresponding etched window in a Si PIC, such as is illustrated in FIG. 27.

Figure 27:
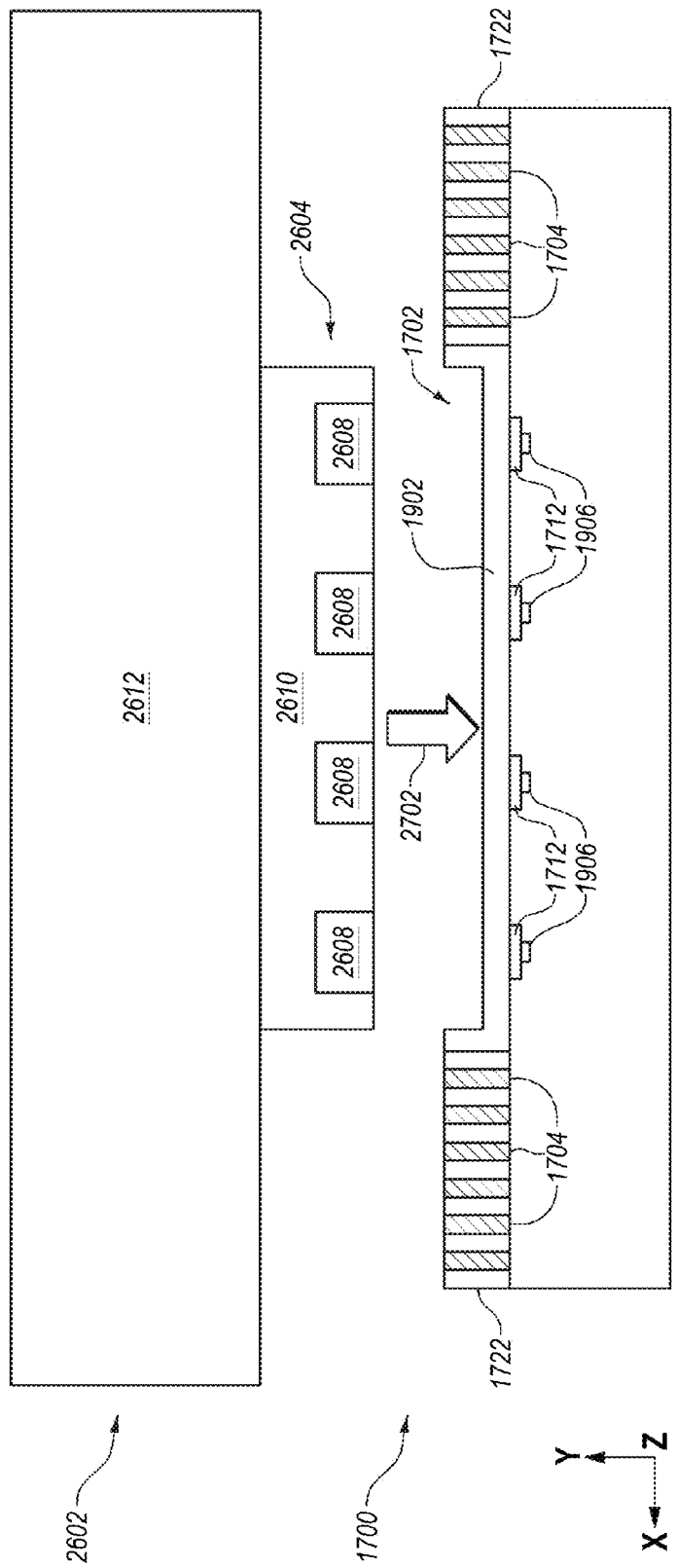
FIG. 27 is a side view that depicts alignment of the SiON interposer of FIG. 26 and the Si PIC of FIG. 17.

FIG. 27 is a side view that depicts alignment of the SiON interposer 2602 of FIG. 26 and the Si PIC 1700 of FIG. 17, arranged in accordance with at least one embodiment described herein. As illustrated in FIG. 27, the SiON waveguide strip 2604 of the SiON interposer 2602 is aligned to the etched window 1702 of the Si PIC 1700 with the SiON cores 1608 generally aligned in the x and z directions with the SiN waveguides 1712 of the Si PIC 1700 in the manner described above to form adiabatic coupler regions. The etched window 1702 may be at least partially filled with the epoxy underfill 1902. The SiON interposer 2602 may then be moved towards the Si PIC 1700 (or vice versa) as indicated by the arrow 2702 until the SiON cores 2608 are in direct or at least close contact with the SiN waveguides 1712 of the Si PIC 1700.

Figure 28:
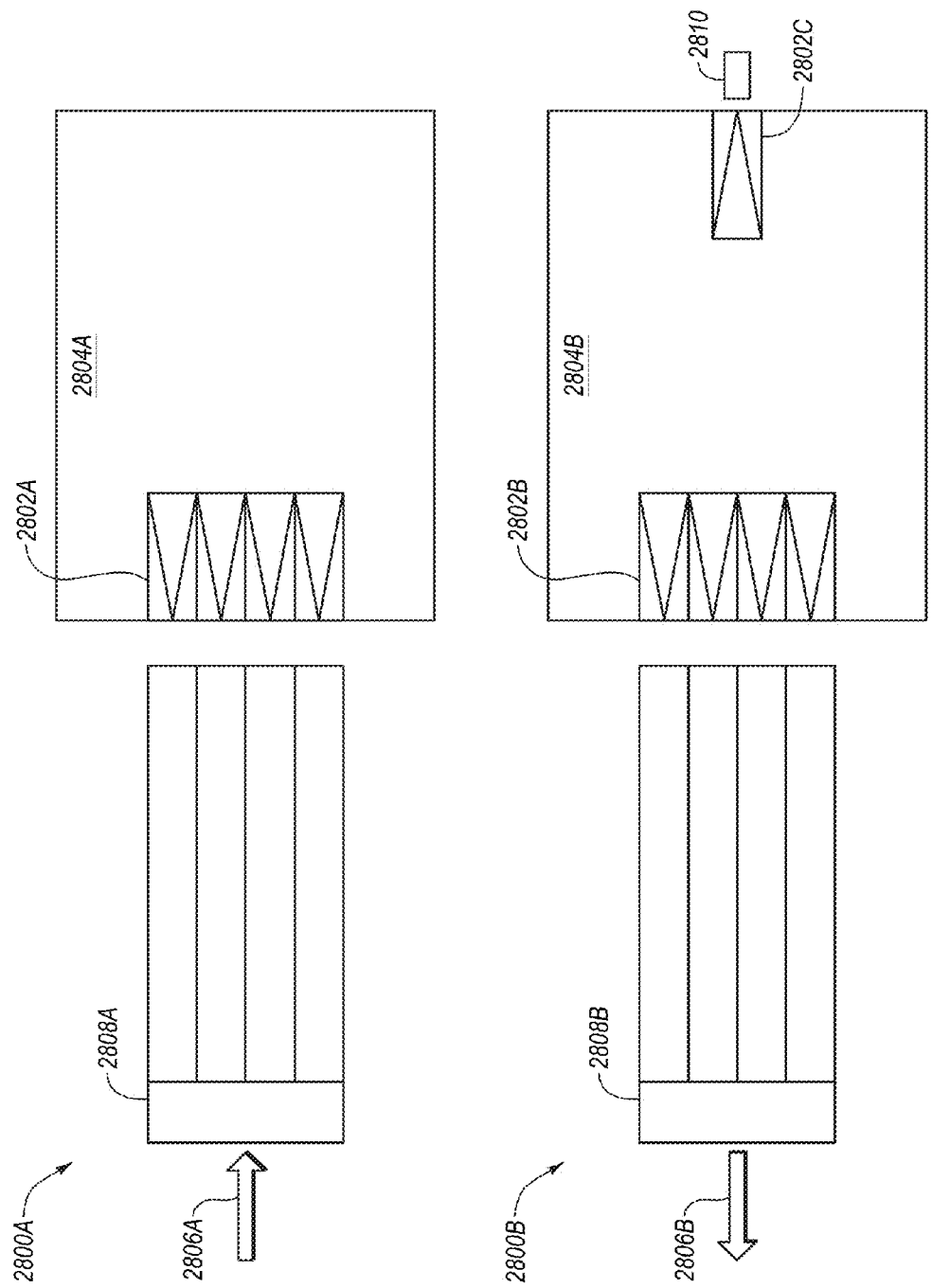
FIG. 28 illustrates two example optoelectronic systems (hereinafter "systems") that each include at least one polymer on glass interposer.

FIG. 28 illustrates two example optoelectronic systems 2800A and 2800B (hereinafter "systems 2800") that each include at least one polymer on glass interposer 2802A, 2802B, 2802C (collectively "polymer on glass interposers 2802"), arranged in accordance with at one embodiment described herein. The polymer on glass interposers 2802 may generally be similar or identical to any of the other interposers disclosed herein except as otherwise indicated herein. Each of the systems 2800 includes a multi-channel optoelectronic module (hereinafter "module") 2804A or 2804B, such as a 4-channel parallel single mode 4 (PSM4) transceiver. Each of the modules 2804A and 2804B includes a Si PIC with one or more Si waveguides and one or more SiN waveguides that together form one or more adiabatic coupler regions.

In the photonic system 2800A, the module 2804A is configured to receive multiple optical signals 2806A from an optical network through an input connector 2808A. The optical signals 2806A may be adiabatically coupled into the Si PIC of the module 2804A through the polymer on glass interposer 2802A and one or more SiN waveguides and Si waveguides of the Si PIC of the module 2804A, in the manner generally described above.

In the photonic system 2800B, the module 2804B is configured to transmit multiple optical signals 2806B to the optical network through an output connector 2808B. One or more of the optical signals 2806B may be adiabatically coupled from an optical transmitter 2810 of the module 2804B and into the Si PIC of the module 2804A through the polymer on glass interposer 2802C (labeled "Polymer on glass plug") and one or more SiN waveguides and Si waveguides of the Si PIC of the module 2804B, in the manner generally described above. The optical signals may also be adiabatically coupled out of the Si PIC and into the output connector 2806B through one or more Si waveguides and SiN waveguides of the Si PIC of the module 2804B and the polymer on glass interposer 2802B, in the manner generally described above.

Figure 29A:
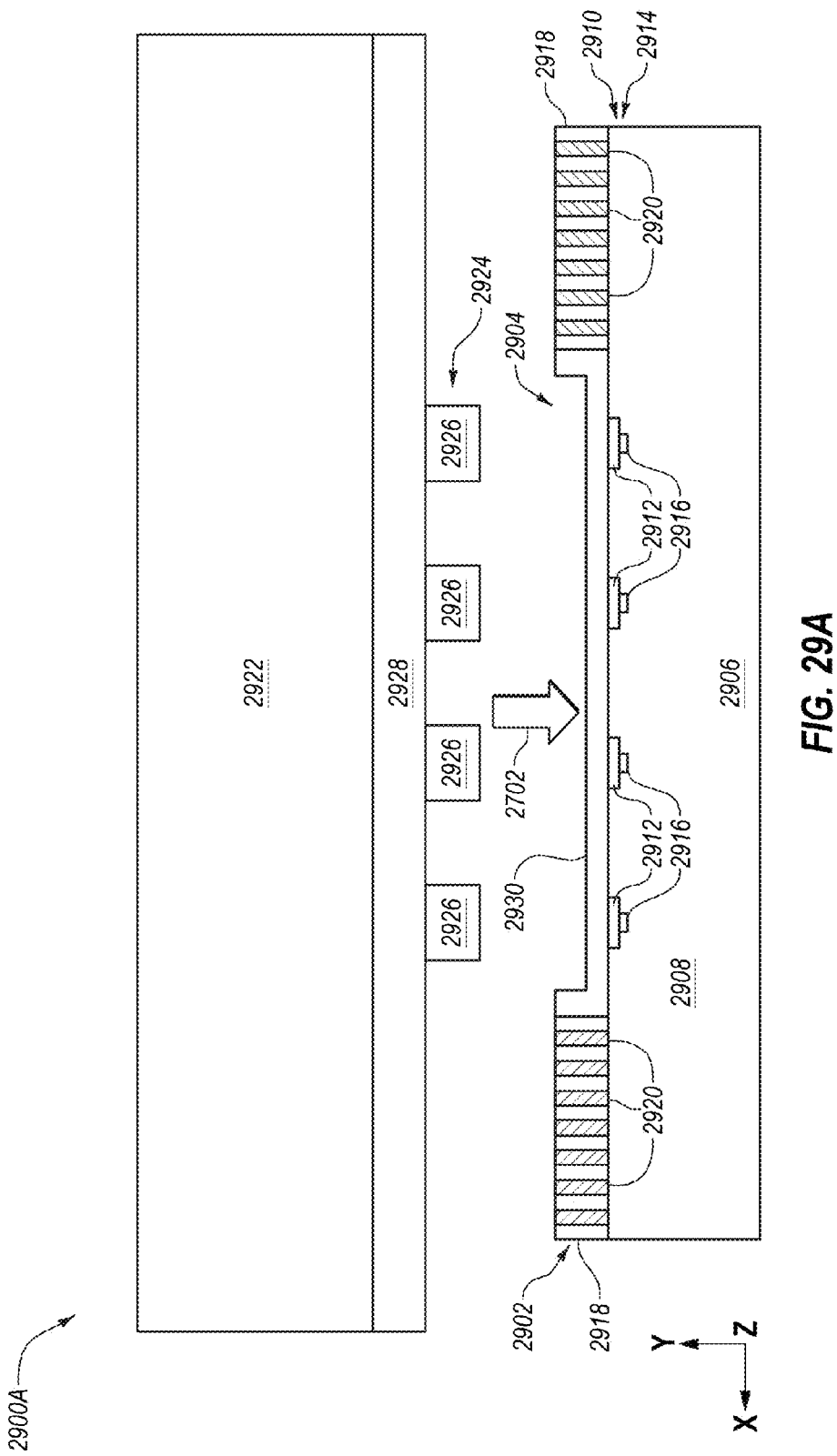
FIG. 29A illustrates an example polymer on glass interposer and Si PIC.

FIG. 29A illustrates an example polymer on glass interposer 2900A and Si PIC 2902, arranged in accordance with at least one embodiment described herein. The polymer on glass interposer 2900A may be implemented in, e.g., either or both of the systems 2800 of FIG. 28 as one or more of the polymer on glass interposers 2802A-2802C.

In the illustrated embodiment, the Si PIC 2902 defines an etched window 2904. The Si PIC 2902 additionally includes a Si substrate 2906, a $SiO_2$ box 2908, a first layer 2910 with various SiN waveguides 2912, a second layer 2914 with various Si waveguides 2916, and one or more dielectric layers 2918 above the first layer 2910 that includes the SiN waveguides 2912. The Si PIC 2902, the etched window 2904, the Si substrate 2906, the $SiO_2$ box 2908, the first layer 2910, the SiN waveguides 2912, the second layer 2914, the various Si waveguides 2916, and the dielectric layers 2918 may generally be similar or identical to, respectively, any of the other Si PICs, etched windows, Si substrates, SiO$_2$ boxes, first layers, SiN waveguides, second layers, Si waveguides, and dielectric layers disclosed herein excepted as otherwise indicated herein. For example, the SiN waveguides 2912 and the Si waveguides 2916 may be arranged relative to each other to adiabatically couple light from the Si waveguides 2916 to the SiN waveguides 2912, or vice versa, as described elsewhere herein. The Si PIC 2902 may additionally include one or more other components, layers, features, or aspects as described elsewhere herein.

The etched window 2904 may be formed by etching through the dielectric layers 2918 to the second layer 2914. In some embodiments, the etched window 2904 is bounded on three sides (two of which are visible in FIG. 29A) by the dielectric layers 2918. At least a topmost one of the dielectric layers 2918 includes metal dummies 2920 at least in a region that bounds the etched window 2904 on the three sides.

The polymer on glass interposer 2900A includes a glass substrate 2922 and a polymer waveguide strip coupled thereto. The glass substrate 2922 may include UV transparent glass and is a specific example of an interposer substrate. The polymer waveguide strip is a specific example of a waveguide strip and includes multiple polymer waveguides 2924, each of which includes a polymer core 2926 and polymer cladding 2928. The polymer cladding layer 2928 is coupled to the glass substrate 2922. The polymer cores 2926 are coupled to the polymer cladding 2928. The polymer waveguides 2924 include coupler portions as described above that are configured to be aligned in two orthogonal directions (e.g., x and z directions) with tapered ends of the SiN waveguides 2912 such that the coupler portions of the polymer waveguides 2924 overlap in the two orthogonal directions and are parallel to the tapered ends of the SiN waveguides 2912. In this arrangement, light may be adiabatically coupled from the SiN waveguides 2912 to the polymer waveguides 2924, or vice versa.

As illustrated, the polymer cores 2926 are parallel to each other. The polymer cores 2926 may have a pitch of 250 micrometers. Alternatively, the pitch of the polymer cores 2926 may be in a range from 290-500 micrometers, or some other value. A length of the polymer cores 2926 and/or of the polymer on glass interposer 2900A in the z direction may be in a range from 1 millimeter to 4 millimeters, at least for a portion of the length of the polymer cores 2926 that is received within the etched window 2904. A height or thickness in the y direction of each of the polymer cores 2926 may be less than or equal to a depth in the y direction of the etched window 2904. In other embodiments, the height or thickness in the y direction of each of the polymer cores 2926 may be greater than the depth in the y direction of the etched window 2904. In an example embodiment, the height of the polymer cores 2926 is in a range from 4 μm to 7 μm. A width in the x direction of the polymer on glass interposer 2900A may be in a range from 1 mm to 2 mm.

In some embodiments, the etched window 2904 may be at least partially filled with an epoxy underfill 2930. To assemble the polymer on glass interposer 2900A and the Si PIC 2902 together, the polymer on glass interposer 2900A may be moved toward the Si PIC 2902 as indicated by arrow 2932 until the polymer cores 2926 are in direct or at least close contact with the SiN waveguides 2912. In some embodiments, there may be sufficient epoxy underfill 2930 to overflow the etched window 2904 so as to epoxy the top of the dielectric layers 2918 to the polymer cladding 2928 of the polymer on glass interposer 2900A.

Figure 29B:
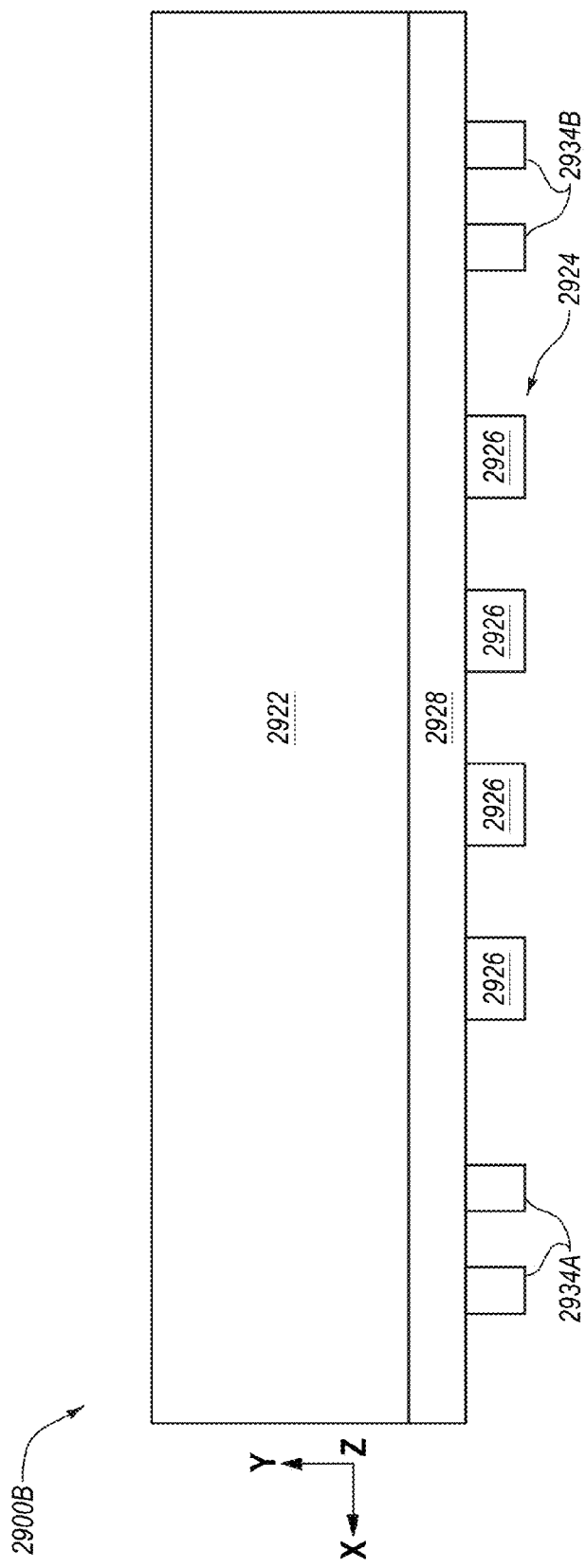
FIG. 29B illustrates another example polymer on glass interposer.

FIG. 29B illustrates another example polymer on glass interposer 2900B, arranged in accordance with at least one embodiment described herein. The polymer on glass interposer 2900A may be implemented in, e.g., either or both of the systems 2800 of FIG. 28 as one or more of the polymer on glass interposers 2802A-2802C.

The polymer on glass interposer 2900B includes the glass substrate 2922 and the polymer waveguides 2924, including the polymer cores 2926 and the polymer cladding 2928. The polymer on glass interposer 2900B additionally includes one or more first polymer alignment ridges 2934A disposed to a first side of the polymer waveguides 2924 and one or more second polymer alignment ridges 2934B disposed to a second side of the polymer waveguides 2924 that is opposite the first side. The polymer alignment ridges 2934A and 2934B (collectively "polymer alignment ridges 2934") may be received in one or more corresponding etched channels, windows, recesses, or other features of a corresponding Si PIC to align the polymer on glass substrate 2900B (and more particularly, the polymer waveguides 2924) to the Si PIC (and more particularly, SiN waveguides of the Si PIC).

The polymer on glass interposers 2900A and 2900B of FIGS. 29A and 29B and the Si PIC 2902 of FIG. 29A may include one or more other components, layers, features, or aspects as described elsewhere herein.

For example, the polymer on glass substrate 2900B may further include one or more dummy polymer islands, such as a first dummy polymer island between the polymer cores 2926 and the first polymer alignment ridges 2934A, and a second dummy polymer island between the polymer cores 2926 and the second polymer alignment ridges 2934B. In these and other embodiments, a width of the etched window of the Si PIC 2902 may be sufficient to accommodate therein the first dummy polymer island, the coupler portion of each of the polymer waveguides 2924, and the second dummy polymer island.

Referring again to FIGS. 3A and 3B, and as already described, light may be coupled from the Si waveguide 212 to the SiN waveguide 208 and then from the SiN waveguide 208 to the interposer waveguide 224. The Si substrate (not shown) on which the SiO$_2$ box 204 is formed is some distance d (e.g., in the y direction) away from the SiN waveguide 208. Here, the distance d is about equal to the thickness of the SiO$_2$ box 204 plus the thickness of the second layer 210. In an example embodiment, the thickness of the SiO$_2$ box 204 is 0.72 micrometers and the thickness of the second layer 210 is about 0.3 micrometers such that the distance d may be about 1.02 micrometers. For these values, some light propagating in the SiN waveguide 208 may couple into the Si substrate and be lost. This loss may be referred to as substrate leakage. The substrate leakage may be significant since an optical mode in the SiN waveguide 208 may be much less confined than in the Si waveguide 212.

Some embodiments described herein reduce the substrate leakage by increasing the distance d between the SiN waveguide 208 and the Si substrate. For example, the thickness of the SiO$_2$ box 204 may be increased to a thickness greater than 0.72 micrometers, such as 2 micrometers, or a thickness in a range of 2 micrometers plus or minus 10%. However, increasing the thickness of the SiO$_2$ box 204 to such an extent may be incompatible with some fabs/manufacturers.

Alternatively, one or more other modifications may be made. For instance, the thickness of the SiN waveguide 208 in the y direction may be increased to better confine a vertical E-field of propagating light and therefore reduce substrate leakage. Alternatively or additionally, an $SiO_2$ layer may be provided between the first layer 206 and the second layer 210 and/or the thickness of such a layer may be increased to increase the distance d between the SiN waveguide 208 and the Si substrate. As the distance d increases, Si—SiN TE coupling may decrease to decrease substrate leakage. The foregoing will be described with respect to FIG. 30. Alternatively or additionally, a two-layer SiN structure may be implemented as described with respect to FIGS. 31A and 31B.

Figure 30:
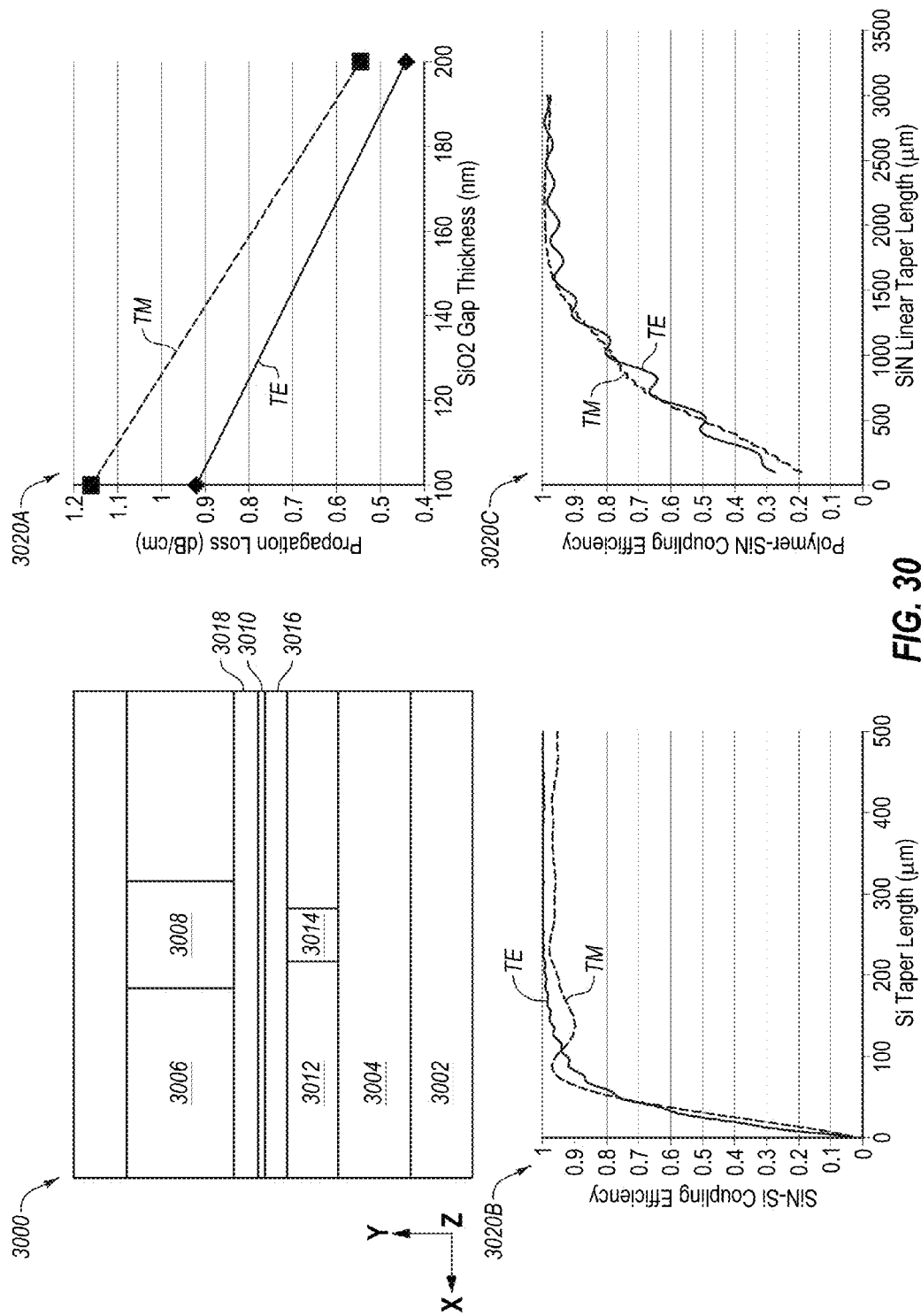
FIG. 30 illustrates a cross-sectional view of an example Si PIC.

FIG. 30 illustrates a cross-sectional view of an example Si PIC 3000, arranged in accordance with at least one embodiment described herein. The Si PIC 3000 may generally be similar or identical to any of the other Si PICs disclosed herein except as otherwise indicated herein. The cross-sectional view of FIG. 30 is taken from a similar perspective as the cross-sectional view 300C of FIG. 3B and illustrates an example layer stackup of the Si PIC 3000. The Si PIC 3000, as compared to the example of FIGS. 3A and 3B, increases a thickness of a SiN waveguide and increases a distance between the SiN waveguide and a corresponding Si substrate to reduce substrate leakage.

As illustrated, the Si PIC 3000 includes a Si substrate 3002, a $SiO_2$ box 3004, a first layer 3006 that includes a SiN waveguide 3008, a SiN slab 3010, and a second layer 3012 that includes a Si waveguide 3014. The Si PIC 3000 may additionally include a first $SiO_2$ layer 3016 between the second layer 3012 and the SiN slab 3010 and a second $SiO_2$ layer 3018 between the SiN slab 3010 and the first layer 3006. The Si waveguide 3014 and the SiN waveguide 3008 may be arranged to form an adiabatic coupler region as described elsewhere herein.

In some embodiments, a total thickness of all layers of the Si PIC 3000 between a top of the Si substrate 3002 and a bottom of the first layer 3006 that includes the SiN waveguide 3008 may be at least 1.2 μm. For example, the $SiO_2$ box 3004 may have a thickness of 0.72 μm, or a thickness in a range of 0.72 μm plus or minus 10%, or some other thickness. The SiN waveguide 3008, and thus the first layer 3006, may have a thickness of 0.7 μm, or a thickness in a range of 0.7 μm plus or minus 10%, or some other thickness. The second $SiO_2$ layer 3018 immediately beneath the SiN waveguide 3008 may have a thickness of at least 0.1 μm, or a thickness in a range of 0.1 μm to 0.2 μm or more, or some other thickness. The Si waveguide 3014, and thus the second layer 3012, may have a thickness of 0.3 μm, or a thickness in a range of 0.3 μm plus or minus 10%), or some other thickness. The first $SiO_2$ layer 3016 may be omitted altogether, or may have a thickness in a range from 10 nm-290 nm. The SiN slab 3010 may be omitted altogether or may have a thickness in a range of 0.04 μm to 0.07 μm, or some other thickness. Accordingly, in some embodiments, all the layers between the Si substrate 3002 and the first layer 3006 may have a total thickness of at least 1.2 ηm (e.g., 0.72+0.2+0.3=1.22 μm) in the example of FIG. 30, as compared to about 1 μm in the example of FIGS. 3A and 3B.

As compared to the example of FIGS. 3A and 3B, the optical mode may be more confined in the relatively larger SiN waveguide 3008. Additionally, the increased distance between the Si substrate 3002 and the SiN waveguide 3008 as compared to FIGS. 3A and 3B may further optically isolate the Si substrate 3002 from the SiN waveguide 3008 to reduce substrate leakage.

FIG. 30 additionally illustrates first-third simulations 3020A-3020C for the Si PIC 3000 of FIG. 30 in which SiN propagation loss through the SiN waveguide 3008 has been ignored. The first simulation 3020A includes a graph of propagation loss or substrate leakage along the vertical axis in units of decibels (dB) per centimeter (cm) as a function of $SiO_2$ gap thickness along the horizontal axis in units of nanometers. The $SiO_2$ gap thickness in the first simulation 3020A refers to the thickness of the second $SiO_2$ layer 3018 in the Si PIC 3000. As illustrated in the first simulation 3020A, propagation loss of TM and TE optical modes (labeled "TM" and "TE" throughout FIG. 30) decreases with increasing $SiO_2$ gap thickness. For instance, from a $SiO_2$ gap thickness of 0.1 μm to 0.2 μm, the propagation loss for the TM optical mode decreases from about 1.16 dB/cm to about 0.55 dB/cm and the propagation loss for the TE optical mode decreases from about 0.91 dB/cm to about 0.45 dB/cm.

The second simulation 3020B includes a graph of SiN-to-Si coupling efficiency along the vertical axis as a function of Si taper length along the horizontal axis in units of μm. The Si taper length refers to a length of a tapered end of the Si waveguide 3014. As illustrated in the second simulation 3020B, the SiN-to-Si coupling efficiency generally increases with increasing Si taper length and is about 97% or higher for both TE and TM optical modes at a Si taper length of about 250 μm.

The third simulation 3020C includes a graph of polymer-to-SiN coupling efficiency along the vertical axis as a function of SiN linear taper length along the horizontal axis in units of μm. The SiN linear taper length refers to a length of the tapered end of the SiN waveguide 3008. As illustrated in the third simulation 3020C, the polymer-to-SiN coupling efficiency generally increases with increasing SiN linear taper length and is about 95% or higher for both TE and TM optical modes at a SiN linear taper length of about 2 millimeters (or 2000 μm).

The Si PIC 3000 may include one or more other components, layers, features, or aspects as described elsewhere herein.

FIG. 31A illustrates another example Si PIC 3100, arranged in accordance with at least one embodiment described herein. The Si PIC 3100 may generally be similar or identical to any of the other Si PICs disclosed herein except as otherwise indicated herein. FIG. 31A includes a cross-sectional view 3101A and an overhead view 3101B of the Si PIC 3100. The cross-sectional view of FIG. 31A is taken from a similar perspective as the cross-sectional view 300C of FIG. 3B and illustrates an example layer stackup of the Si PIC 3100. The Si PIC 3100 implements a two-layer SiN structure to reduce substrate leakage.

As illustrated, the Si PIC 3100 includes a Si substrate 3102, a $SiO_2$ box 3104, a first layer 3106 that includes a SiN waveguide 3108, a SiN slab 3110, a second layer 3112 that includes a Si waveguide 3114, and a third layer 3116 that includes a SiN transition waveguide 3118. The Si PIC 3100 may additionally include one or more $SiO_2$ layers 3120 between the second layer 3112 and the SiN slab 3110, between the SiN slab 3110 and the third layer 3116, and/or between the third layer 3116 and the first layer 3106.

In some embodiments, a total thickness of all layers of the Si PIC 3100 between a top of the Si substrate 3102 and a bottom of the first layer 3106 that includes the SiN waveguide 3108 may be at least 1.2 μm, such as 1.6 μm or 1.6 μm plus or minus 10%. In more detail, the $SiO_2$ box 3104 may have a thickness of 0.72 μm, or a thickness in a range of 0.72 μm plus or minus 10%, or some other thickness. The Si waveguide 3114, and thus the second layer 3112, may have a thickness of 0.3 μm, or a thickness in a range of 0.3 μm plus or minus 10%, or some other thickness. The $SiO_2$ layer 3120 immediately above the second layer 3112 may be omitted altogether, or may have a thickness in a range from 10-290 nm, or some other thickness. The SiN slab 3110 may have a thickness in a range from 0.04 to 0.07 µm, or some other thickness. The SiN transition waveguide 3118, and thus the third layer 3116, may have a thickness of 0.5 µm, or a thickness in a range of 0.5 µm plus or minus 10%, or some other thickness. The SiN transition waveguide 3118 may have a width in the x direction other than at one or more tapered ends thereof in a range from 1-2 µm, or some other width. The $SiO_2$ layer 3120 immediately beneath the SiN transition waveguide 3118 may have a thickness in a range from 0.04-0.07 µm, or some other thickness. The SiN waveguide 3108, and thus the first layer 3106, may have a thickness in a range from 0.04-0.07 µm, or some other thickness. The SiN waveguide 3108 may have a width in the x direction other than at one or more tapered ends thereof of 0.6-1 µm, or some other width. The $SiO_2$ layer 3120 immediately beneath the SiN waveguide 3108 may have a thickness in a range from 0.05-0.2 µm, or some other thickness.

The overhead view 3101B illustrates relative x-axis and z-axis alignment of various components of the Si PIC 3100 with respect to each other and includes reference lines 1, 2, 3, and 4. The relative x-axis and z-axis alignment between the Si waveguide 3114, the SiN transition waveguide 3118, and the SiN waveguide 3108 and aspects of each of the foregoing waveguides will now be described. As illustrated, the SiN waveguide 3108 includes a tapered end between reference lines 3 and 4. Although not illustrated in FIG. 31A, the SiN waveguide 3108 may include another tapered end opposite the tapered end illustrated in FIG. 31A to adiabatically couple light into a corresponding interposer waveguide or to adiabatically receive light from the interposer waveguide.

The SiN transition waveguide 3118 includes a coupler portion between reference lines 1 and 3 at a first end of the SiN transition waveguide 3118. The SiN transition waveguide 3118 also includes a tapered end between reference lines 3 and 4 opposite the first end. The tapered end of the SiN transition waveguide 3118 is aligned in two orthogonal directions (e.g., in the x and z directions) with the tapered end of the SiN waveguide 3108 such that the tapered end of the SiN transition waveguide 3118 overlaps in the two orthogonal directions and is parallel to the tapered end of the SiN waveguide 3108.

The Si waveguide 3114 includes a tapered end between reference lines 2 and 3. The tapered end of the Si waveguide 3114 is aligned in the two orthogonal direction (e.g., in the x and z directions) with the coupler portion of the SiN transition waveguide 3118 such that the tapered end of the Si waveguide 3114 overlaps in the two orthogonal directions and is parallel to the coupler portion of the SiN transition waveguide 3118.

As illustrated in the overhead view 3101B, the tapered end of the Si waveguide 3114 may terminate where the tapered end of the SiN waveguide 3108 begins, e.g., at reference line 3. Alternately or additionally, a region in which the tapered ends of the SiN waveguide 3108 and the SiN transition waveguide 3118 overlap may be referred to as a dual taper region 3122. The dual taper region 3121 may have a length in the z direction of at least 20 µm, or at least 30 µm, or some other length.

The Si PIC 3100 may include one or more other components, layers, features, or aspects as described elsewhere herein.

Figure 31B:
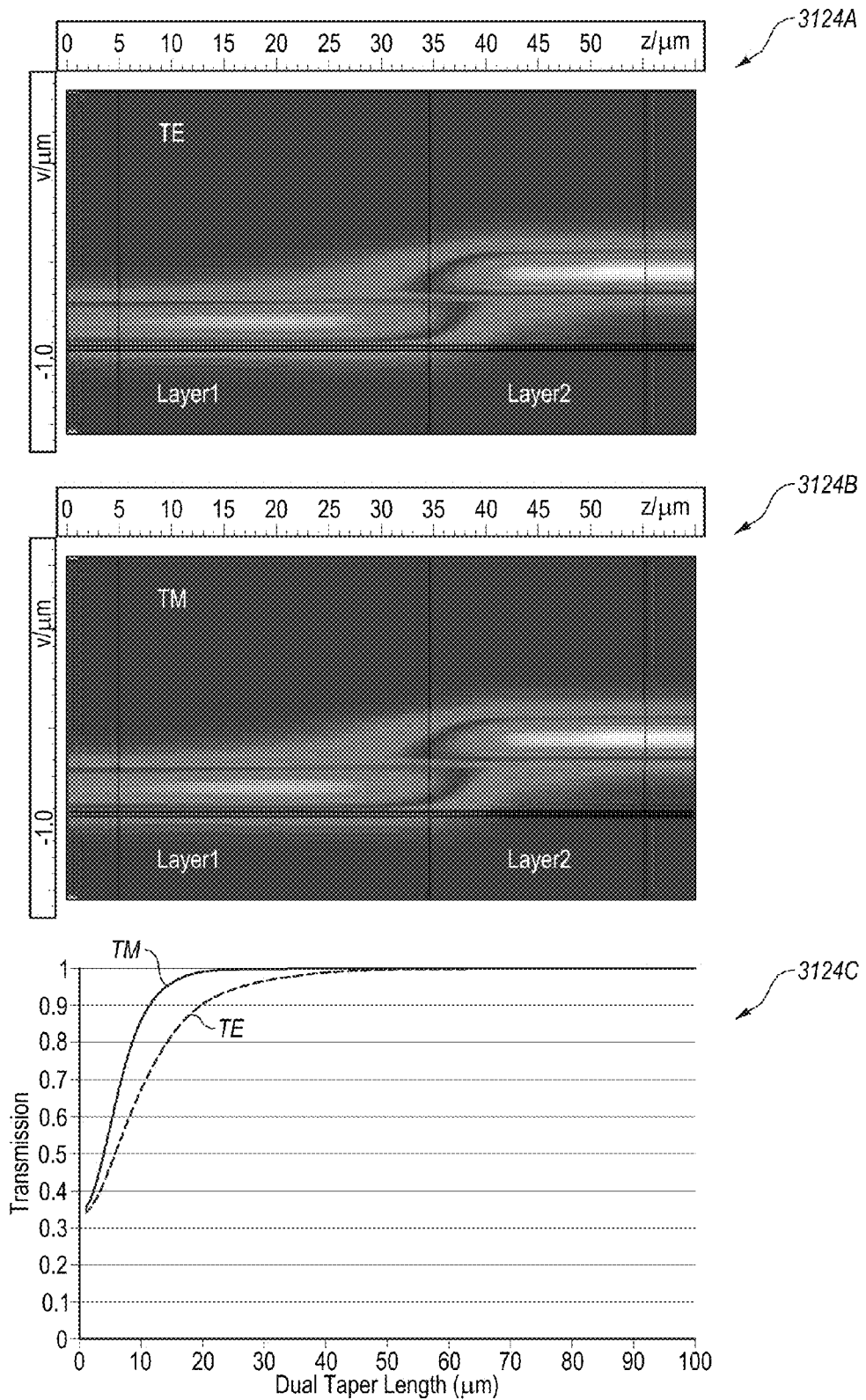
FIG. 31B illustrates first-third simulations for the Si PIC of FIG. 31A.

FIG. 31B illustrates first-fourth simulations 3124A-3124C for the Si PIC 3100 of FIG. 31A, arranged in accordance with at least one embodiment described herein. Due to the SiN transition waveguide 3118 being separated from the Si substrate 3102 by about 1.1 µm in the example of FIG. 31A, some substrate leakage may occur for light propagating through the SiN transition waveguide 3118. However, a total length of the SiN transition waveguide 3118 in the z direction may be relatively short, such as about 100 µm or less, such that the substrate leakage may be relatively low. On the other hand, the SiN waveguide 3108 may be separated from the Si substrate 3102 by 1.2 µm or more, or even 1.6 µm or more, such that light propagating through the SiN waveguide 3108 may experience little or no substrate leakage, such as about 0.1 dB/cm for the TE optical mode and about 0.35 dB/cm for the TM optical mode.

The first and second simulations 3124A and 3124B illustrate propagation of the TE and TM optical modes, respectively, from the SiN transition waveguide 3118 in the area generally labeled "Layer 1" to the Si waveguide 3118 in the area generally labeled "Layer 2.

The third simulation 3124C includes a graph of transmission efficiency from the SiN transition waveguide 3118 to the SiN waveguide 3108 along the vertical axis as a function of dual taper length along the horizontal axis in units of µm. The dual taper length refers to the length of the dual taper region 3122. As illustrated in the third simulation 3124C, the transmission efficiency increases with increasing dual taper length and is about 90% or higher for both TE and TM optical modes at a dual taper length of about 20 µm and is about 96% or higher for both TE and TM optical modes at a dual taper length of about 30 µm.

Some Si PICs may include a WDM mux or WDM demux as described elsewhere herein, such as an Echelle grating in a SiN layer of the Si PIC. As used herein, a SiN layer of a Si PIC refers to a layer of the Si PIC that includes SiN, which layer may additionally include other materials such as $SiO_2$ in various locations within the SiN layer. In a WDM demux configuration, incoming light received from the WDM demux may be coupled from a SiN waveguide through a Si waveguide in a Si layer of the Si PIC to a Si/germanium (Ge) based pin detector included in the Si layer of the Si PIC. As used herein, a Si layer of a Si PIC refers to a layer of the Si PIC that includes Si, which layer may additionally include other materials such as $SiO_2$ in various locations within the Si layer. Some WDM demuxes have to have a multimode output to allow a flat top shape for a filter function associated with the WDM demuxes. For example, a SiN-based WDM demux may utilize $TE_{00}$, $TE_{01}$, $TM_{00}$, and $TM_{01}$ optical modes. Some of the SiN-to-Si adiabatic coupler regions described above may accommodate single mode light. Such single mode adiabatic coupler regions may reduce effective bandwidth of a WDM demux with a multimode output, since only a single mode may be coupled from the SiN waveguide to the Si waveguide.

Figure 32:
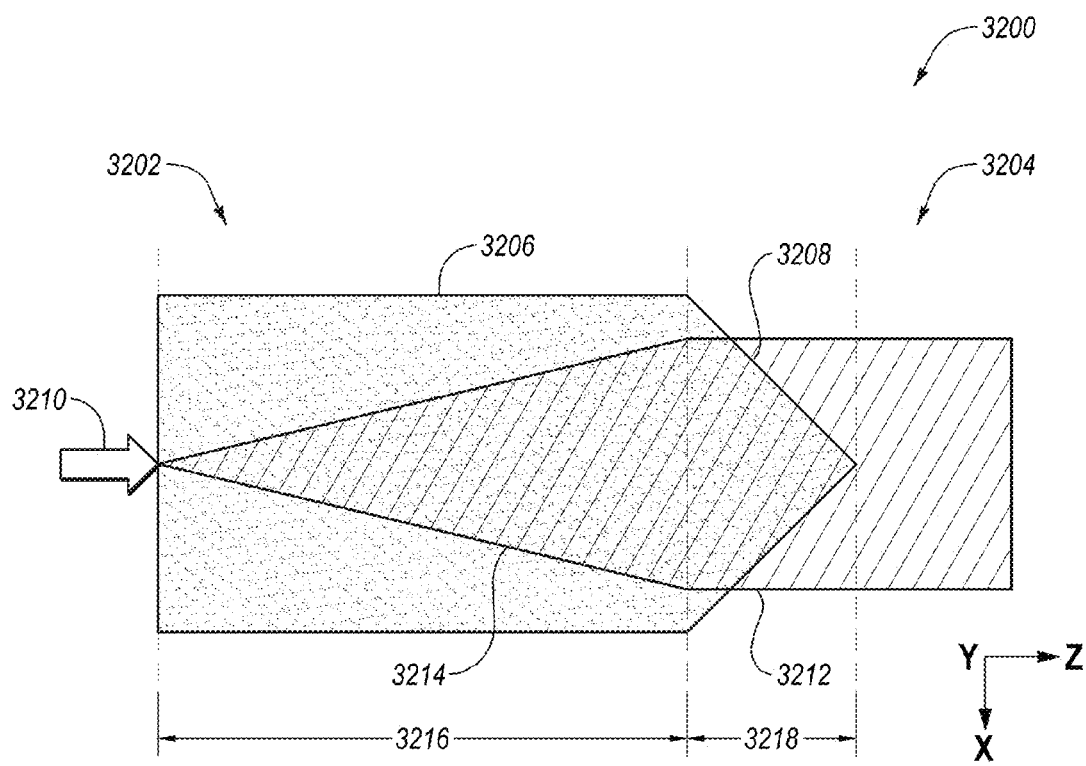
FIG. 32 illustrates a multimode SiN-to-Si adiabatic coupler region (hereinafter "coupler")

Some embodiments described herein may include a multimode SiN-to-Si adiabatic coupler region to accept demultiplexed and/or multimode output of a WDM demux without reducing effective bandwidth of the WDM demux. In particular, FIG. 32 illustrates a multimode SiN-to-Si adiabatic coupler region 3200 (hereinafter "coupler 3200"), arranged in accordance with at least one embodiment described herein. The coupler 3200 may be implemented in any of the Si PICs described herein. Such Si PICs may generally include a $SiO_2$ box, a first layer formed above the $SiO_2$ box that includes a SiN waveguide 3202, and a second layer formed above the $SiO_2$ box and above or below the first layer and that includes a Si waveguide 3204.

The SiN waveguide 3202 includes an untapered end portion 3206 and a tapered end 3208 that begins where the untapered end portion 3206 begins, the untapered end portion 3206 and the tapered end 3208 extending in opposite directions. Although not illustrated in FIG. 32, the SiN waveguide 3202 may extend to the left of the untapered end portion 3206. The untapered end portion 3206 may receive a multimode input optical signal 3210 such as may be output by a SiN-based WDM demux.

The Si waveguide 3204 includes an untapered end portion 3212 and a tapered end 3214 that begins where the untapered end portion 3212 begins, the untapered end portion 3212 and the tapered end 3214 extending in opposite directions. The Si waveguide 3204 may extend to the right of the untapered end portion 3212. The Si waveguide 3204 may be configured to accept the multimode input optical signal 3210 from the SiN waveguide 3202.

In some embodiments, the untapered end portion 3206 of the SiN waveguide 3202 is aligned in two orthogonal directions (e.g., the x and z directions) with the tapered end 3214 of the Si waveguide 3204 such that the untapered end portion 3206 of the SiN waveguide 3202 overlaps in the two orthogonal directions and is parallel to the tapered end 3214 of the Si waveguide 3204. Additionally, the tapered end 3208 of the SiN waveguide 3202 is aligned in the two orthogonal directions with the untapered end portion 3212 of the Si waveguide 3204 such that the tapered end 3208 of the SiN waveguide 3202 overlaps in the two orthogonal directions and is parallel to the untapered end portion 3212 of the Si waveguide 3204.

A region in which the untapered end portion 3206 of the SiN waveguide 3202 and the tapered end 3214 of the Si waveguide 3204 overlap may be referred to as a first region 3216. A region in which the tapered end 3208 of the SiN waveguide 3202 and the untapered end portion 3212 of the Si waveguide 3204 overlap may be referred to as a second region 3218. Lengths of the first region 3216 and the second region 3218 and/or other parameters associated with the coupler 3200 may be adjusted to optimize the multimode coupling from the SiN waveguide 3202 to the Si waveguide 3204, as illustrated in FIGS. 33A-33D.

FIGS. 33A-33D include various simulations for the coupler 3200 of FIG. 32 with various different sets of parameters, arranged in accordance with at least one embodiment described herein.

FIG. 33A includes a first table 3302 of parameters, a second table 3304 of simulated transmission efficiency from the SiN waveguide 3202 to the Si waveguide 3204 of FIG. 32, and simulations 3306A and 3306B. With combined reference to FIGS. 32 and 33A, the parameters of FIG. 33A that are listed in the first table 3302 will now be described. In this example, the first region 3216 has a length of 90 μm and the second region 3218 has a length of 10 μm. In the first region 3216, the tapered end 3214 of the Si waveguide 3204 has a width that tapers along the light propagation direction from 0.08 μm to 1.5 μm. In the second region 3218, the untapered end portion 3212 of the Si waveguide 3204 has a width of 1.5 μm. In the first region 3216, the untapered end portion 3206 of the SiN waveguide 3202 has a width of 2 μm. In the second region 3218, the tapered end 3208 of the SiN waveguide 3202 has a width that tapers along the light propagation direction from 2 μm to 0.2 μm.

The second table 3304 includes simulated transmission efficiency for the $TE_{00}$, $TE_{01}$, $TM_{00}$, and $TM_{01}$ optical modes associated with the parameters listed in the first table 3302.

The simulations 3306A and 3306B include graphs of transmission efficiency in the coupler 3200 along the vertical axis as a function of Si taper length along the horizontal axis in units of μm for the $TE_{01}$ optical mode (simulation 3306A) and the $TM_{01}$ optical mode (simulation 3306B) for five different wavelength channels. The Si taper length refers to the length of the first region 3216. In the simulations 3306A and 3306B, all parameters other than the length of the first region 3216 are assumed to be the parameters provided in the first table 3302.

FIG. 33B includes simulations 3306C and 3306D that use the same parameters as the simulations 3306A and 3306B of FIG. 33A except that the untapered end portion 3206 of the SiN waveguide 3202 has a width of 1.5 μm in the first region 3216 and the tapered end 3208 of the SiN waveguide 3202 tapers from 1.5 μm to 0.2 μm in the second region 3218.

FIG. 33C includes simulations 3306E and 3306F that use the same parameters as the simulations 3306C and 3306D of FIG. 33B except that the tapered end 3214 of the Si waveguide 3204 tapers from 0.08 μm to 1 μm in the first region 3216 and the untapered end portion 3212 of the Si waveguide 3204 has a width of 1 μm in the second region 3218. As illustrated in the simulations 3306E and 3306F, at a Si taper length (or first region 3216 length) of 90 μm, the $TE_{01}$ optical mode has a transmission efficiency of about 0.96 for all five wavelength channels and the $TM_{01}$ optical mode has a transmission efficiency between about 0.92-0.96 depending on the wavelength channel.

FIG. 33D includes simulations 3306G and 3306H that are similar to the simulations 3306A-3306E described above, except using parameters listed in table 3308. As illustrated in the simulations 3306G and 3306H, at a Si taper length (or first region 3216 length) of 100 μm, the $TE_{01}$ optical mode has a transmission efficiency of between about 0.95-0.97 depending on the wavelength channel and the $TM_{01}$ optical mode has a transmission efficiency between about 0.92-0.95 depending on the wavelength channel.

One or more of the WDM components described herein may have a polarization-dependent filter function. In these and other embodiments, one or more of the Si PICs described herein may further include one or more Si PIC polarization splitters or combiners (hereinafter "polarization splitter" or "polarization splitters"). The Si PIC may additionally include two polarization-specific WDM components, each of which has an input coupled to a different output of the polarization splitter. One of the polarization-specific WDM components may be optimized for TE polarization and the other may be optimized for TM polarization. Alternatively, each of the polarization-specific WDM components may be optimized for the same polarization and the SI PIC may additionally include a polarization rotator coupled between one of the two outputs of the polarization splitter and the input of one of the polarization-specific WDM components. The polarization rotator may include a Si PIC polarization rotator integrally formed in the Si PIC.

FIGS. 34A and 34B illustrate embodiments of a demultiplexer system 3400A and 3400B (collectively "demultiplexer systems 3400"), arranged in accordance with at least one embodiment described herein. Some or all of the demultiplexer systems 3400 may be implemented in a Si PIC, such as the Si PICs described above. The demultiplexer systems 3400 each include a Si PIC polarization splitter or combiner 3402 (hereinafter "polarization splitter 3402") a first WDM demux 3404, a second WDM demux 3406A or 3406B (generically "second WDM demux 3406"), first opto-electrical transducers 3408, second opto-electrical transducers 3410, and adders 3412 (only one of which is illustrated for simplicity). Additional adders 3412 are denoted by ellipses in each of FIGS. 34A and 34B. The demultiplexer system 3400B of FIG. 34B may additionally include a polarization rotator 3414.

The polarization splitter 3402 in each of the demultiplexer systems 3400 includes an input 3402A and first and second outputs 3402B and 3402C excepted when implemented as a combiner, in which case the inputs and outputs may be reversed. As described in more detail below, the polarization splitter 3402 may generally include first and second SiN waveguides formed in a corresponding layer of a Si PIC and a Si waveguide with two tapered ends formed in another layer of the Si PIC above or below the layer in which the first and second SiN waveguides are formed. In some embodiments, the first and second WDM demuxes 3404 and 3406 may be formed in the same layer of the Si PIC as the first and second SiN waveguides of the polarization splitter 3402, as described elsewhere herein.

The input 3402A may include a first end of the first SiN waveguide, the first output 3402B may include a second end of the first SiN waveguide, and the second output 3402C may include a second end of the second SiN waveguide. On the input, the polarization splitter 3402 may receive an input beam 3415 including an N-channel optical signal (e.g., a multiplexed optical signal with N wavelength channels $\lambda_1$, $\lambda_2$, $\lambda_3$, ..., $\lambda_n$) with two orthogonal polarizations, e.g., TE polarization and TM polarization. The input beam 3415 may be split according to polarization, with the TE polarization generally being outputted from the first output 3402B and the TM polarization generally being outputted from the second output 3402C.

Each of the first and second WDM demuxes 3404 and 3406 may be optimized for and/or specific to one of the two polarizations depending on the polarization of light that is input to the first or second WDM demux 3404 or 3406. For example, the first WDM demux 3404 in FIGS. 34A and 34B and the second WDM demux 3406B in FIG. 34B may be optimized for or specific to the TE polarization. The second WDM demux 3406A in FIG. 34A may be optimized for or specific to the TM polarization. In these and other embodiments, each of the first and second WDM demuxes 3404 and 3406 may include an Echelle grating with a polarization-dependent filter function.

The first WDM demux 3404 includes an input 3416 optically coupled to the first output 3402B of the polarization splitter 3402. Analogously, the second WDM demux 3406A or 3406B respectively includes an input 3418 or 3420 optically coupled to the second output 3402C or to the polarization splitter 3402.

The first WDM demux 3404 additionally includes outputs 3422 optically coupled to the first opto-electrical transducers 3408. Analogously, the second WDM demux 3406A or 3406B respectively includes outputs 3424 or 3426 optically coupled to the second opto-electrical transducers 3410. The first opto-electrical transducers 3408 and the second opto-electrical transducers 3410 may each include at least N PN diodes, avalanche photodiodes (APDs), or other suitable optical receivers.

The adders 3412 are electrically coupled to outputs of the first and second opto-electrical transducers 3408 and 3410, where each of the adders 3412 is electrically coupled to an output of a corresponding one of the first opto-electrical transducers 3408 and to an output of a corresponding one of the second opto-electrical transducers 3410. In particular, for i=1 to N, an ith one of the adders 3412 may be electrically coupled to an ith one of the first opto-electrical transducers 3408 and to an ith one of the second opto-electrical transducers 3410 to sum an electrical output of the ith one of the first opto-electrical transducers 3408 with an electrical output of the ith one of the second opto-electrical transducers 3410 to generate an ith combined electrical output 3428.

In FIGS. 34A and 34B, in operation, the first WDM demux 3404 receives the TE polarization of the input beam 3415 and demultiplexes it into N distinct wavelength channels $\lambda_1$, $\lambda_2$, $\lambda_3$, ..., $\lambda_n$ that are output to the first opto-electrical transducers 3408. The first opto-electrical transducers 3408 each output an electrical signal representative of a corresponding one of the N distinct wavelength channels received at the corresponding one of the first opto-electrical transducers 3408.

In FIG. 34A, in operation, the second WDM demux 3406A receives the TM polarization of the N-channel optical signal from the second output 3402C of the polarization splitter 3402 and demultiplexes it into N distinct wavelength channels that are output to the second opto-electrical transducers 3410. The second opto-electrical transducers 3410 each output an electrical signal representative of a corresponding one of the N distinct wavelength channels received at the corresponding one of the second opto-electrical transducers 3410.

In FIG. 34B, in operation, the polarization rotator 3414 rotates a polarization of the TM polarization received from the second output 3402C of the polarization splitter 3402 from the TM polarization to the TE polarization. In this and other embodiments, the polarization rotator 3414 may include a TM-to-TE polarization rotator. More generally, the polarization rotator 3414 may rotate the polarization from a first (or second) polarization to an orthogonal second (or first) polarization. The second WDM demux 3406A then receives the polarization-rotated signal from the polarization rotator 3414 and demultiplexes it into N distinct wavelength channels that are output to the second opto-electrical transducers 3410. The second opto-electrical transducers 3410 each output an electrical signal representative of a corresponding one of the N distinct wavelength channels received at the corresponding one of the second opto-electrical transducers 3410.

In both FIGS. 34A and 34B, the adders 3412 then combine the appropriate outputs from the first and second opto-electrical transducers 3408 and 3410 to generate an ith combined electrical signal 3428 that is representative of the ith wavelength channel from the input beam 3415 received at the input 3402A of the polarization splitter 3402. In particular, a first (or second, or third, or Nth) one of the ith combined electrical signals 3428 includes a sum of the electrical output of a first (or second, or third, or Nth) one of the first electro-optical transducers 3408 that is representative of a first (or second, or third, or Nth) one of the N distinct wavelength channels output by the first WDM demux 3404 and the electrical output of a first (or second, or third, or Nth) one of the second electro-optical transducers 3410 that is representative of a first (or second, or third, or Nth) one of the N distinct wavelength channels output by the second WDM demux 3406A.

By splitting the TE polarization from the TM polarization, demultiplexing each separately from the other, and then adding corresponding channels with the adders 3412, the demultiplexer systems 3400 of FIGS. 34A and 34B may eliminate or at least significantly reduce channel cross-talk that arises in WDM demuxes with polarization-dependent filter functions.

Various considerations and parameters associated with a Si PIC polarization splitter, such as the polarization splitter 3402, will now be discussed with respect to FIGS. 35-37, followed by a discussion of various example Si PIC polarization splitters with respect to FIGS. 38A-38C.

Figure 35:
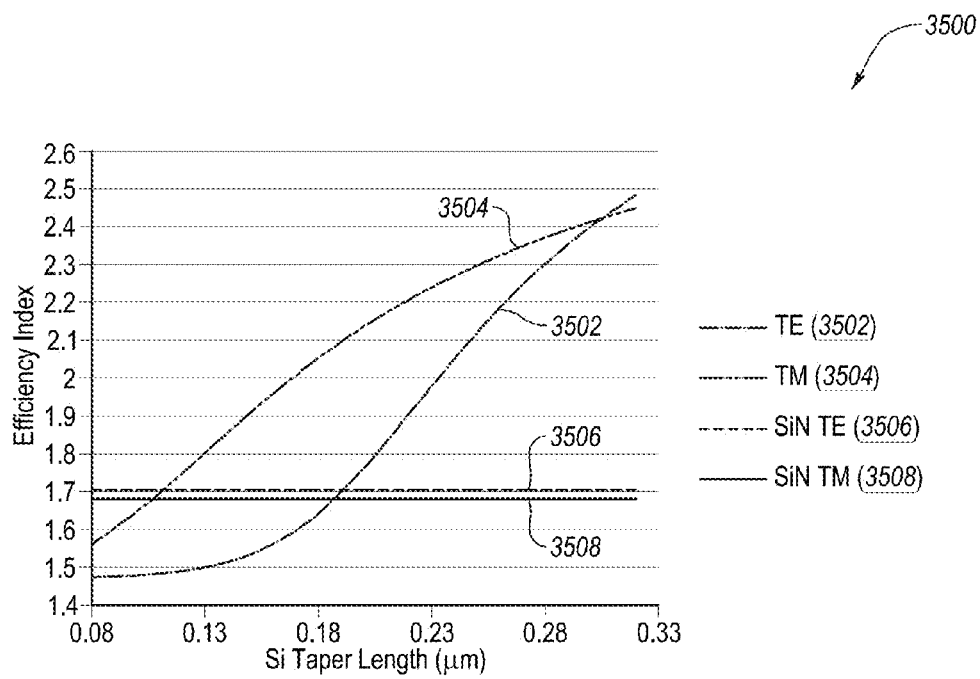
FIG. 35 is a graphical representation of a simulation of effective index as a function of Si waveguide width for TE and TM polarizations in Si and SiN waveguides of an adiabatic coupler region.

FIG. 35 is a graphical representation 3500 of a simulation of effective index as a function of Si waveguide width for TE and TM polarizations in Si and SiN waveguides of an adiabatic coupler region, arranged in accordance with at least one embodiment described herein. It can be seen from curves 3506 and 3508 of FIG. 35 that the effective index for TE and TM polarizations in the SiN waveguide does not vary with Si waveguide width and has a value of about 1.7. It can be seen from curves 3502 and 3504 of FIG. 35 that the effective index for TE polarization in the Si waveguide (see curve 3502) is less than 1.7 in the region from 130 nm to 180 nm (or 0.13 μm to 0.18 μm) and increases across this region, and the effective index for TM polarization in the Si waveguide (see curve 3504) is greater than 1.7 in the region from 130 nm to 180 nm and increases across this region. As such, TE and TM polarizations will necessarily have different coupling efficiencies in the adiabatic coupler region if a tip width of a tapered end of the Si waveguide is between 130 nm to 180 nm. Differences between the TE and TM coupling efficiencies for various tip widths in the 130 nm to 180 nm range are illustrated in FIGS. 36 and 37.

The Si waveguide width at which the effective index for TM polarization in the Si waveguide (curve 3504) crosses over the effective index for TM polarization in the SiN waveguide (curve 3508) may be referred to herein as a "TM maximum taper width", and is about 100 nm in FIG. 35. If a tip width of a tapered end of the Si waveguide is greater than the TM maximum taper width, it can be seen from FIG. 35 that adiabatic coupling with high efficiency of the TM polarization between the Si waveguide and the SiN waveguide may be prevented relative to coupling efficiency of the TE polarization. Analogously, the Si waveguide width at which the effective index for TE polarization in the Si waveguide (curve 3502) crosses over the effective index for TE polarization in the SiN waveguide (curve 3506) may be referred to herein as a "TE maximum taper width", and is about 180 nm in FIG. 35. If a tip width of a tapered end of the Si waveguide is less than the TE maximum taper width, it can be seen from FIG. 35 that adiabatic coupling with high efficiency of the TE polarization between the Si waveguide and the SiN waveguide may be permitted relative to coupling efficiency of the TM polarization.

Figure 36:
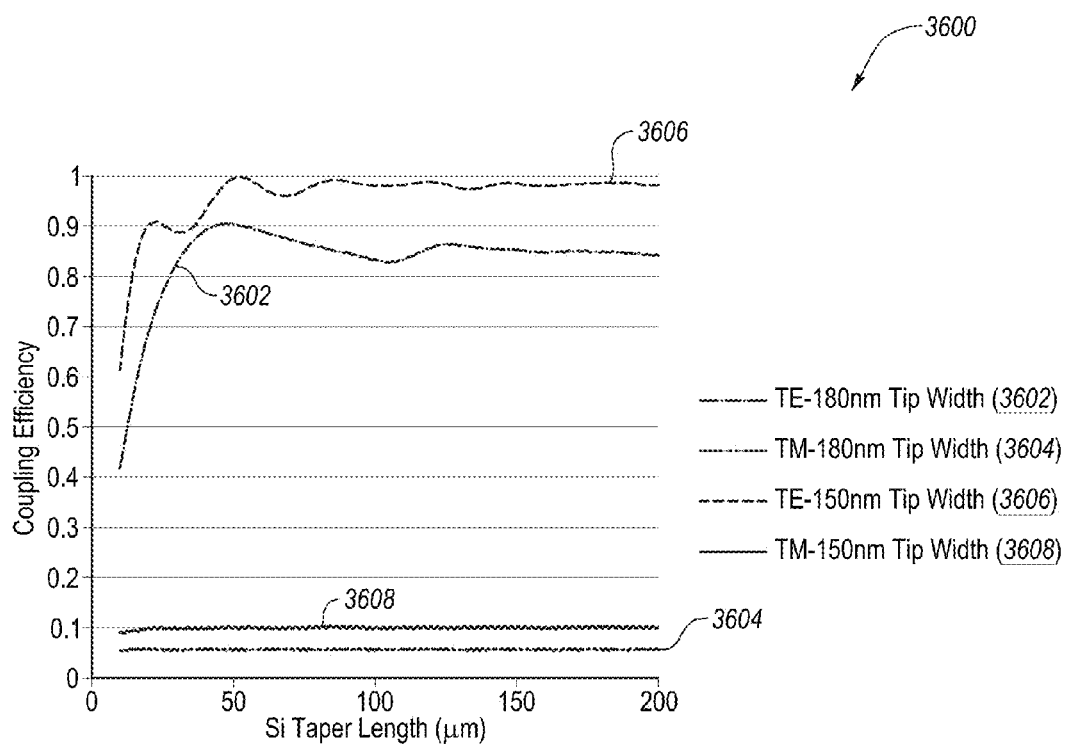
FIG. 36 is a graphical representation of a simulation of TE and TM polarization coupling efficiency as a function of Si waveguide taper length for a Si waveguide tip width of 180 nm and 150 nm.

FIG. 36 is a graphical representation 3600 of a simulation of TE and TM polarization coupling efficiency as a function of Si waveguide taper length for a Si waveguide tip width of 180 nm and 150 nm, arranged in accordance with at least one embodiment described herein. In particular, for a tip width of 180 nm, curve 3602 represents TE coupling efficiency while curve 3604 represents TM coupling efficiency. Analogously, for a tip width of 150 nm, curve 3606 represents TE coupling efficiency while curve 3608 represents TM coupling efficiency. It can be seen from curves 3602, 3604, 3606, and 3608 that at both tip widths, the TE polarization (curves 3602 and 3606) has a much better coupling efficiency than the TM polarization (curves 3604 and 3608). Curves 3602 and 3606 tend to indicate that for tip widths equal to or greater than 180 nm, TE coupling may be below 90%. Curves 3604 and 3608 tend to indicate that for tip widths less than or equal to 150 nm, TM coupling may be greater than 10%.

Figure 37:
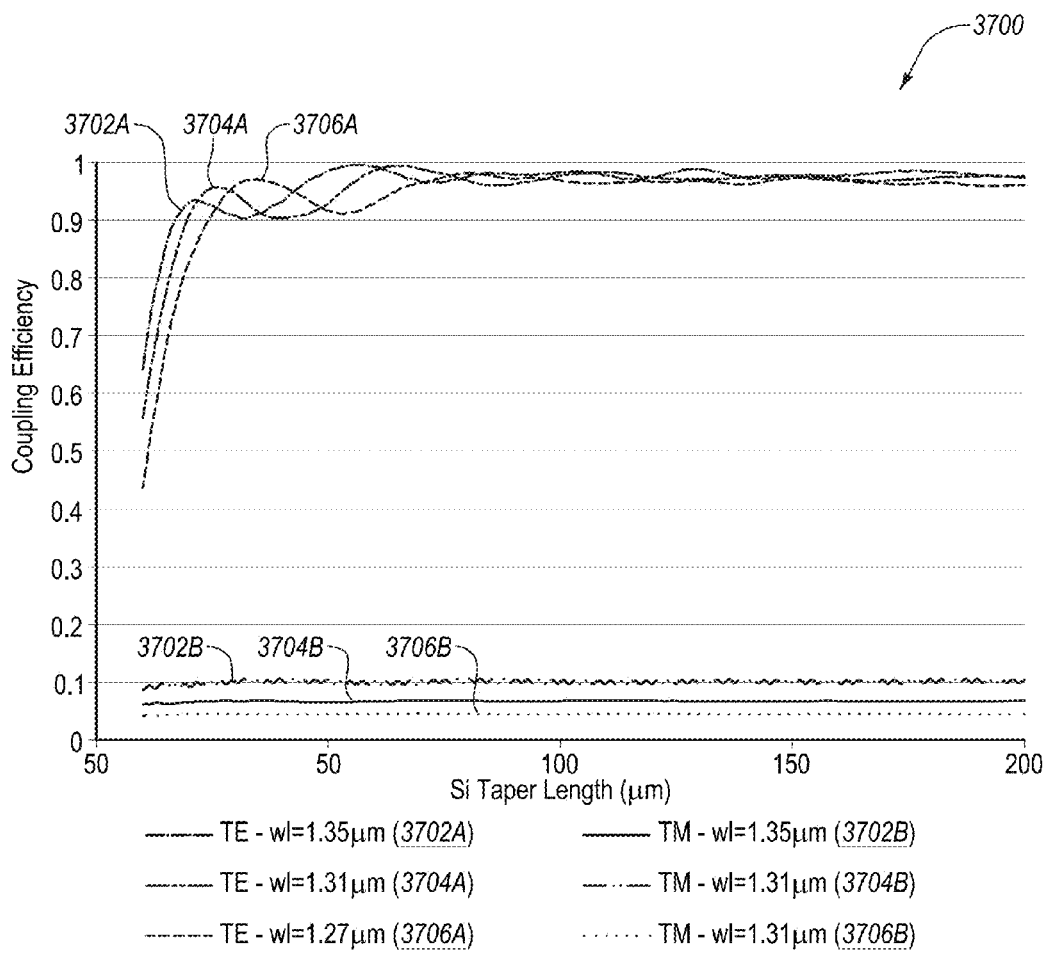
FIG. 37 is a graphical representation of a simulation of TE and TM polarization coupling efficiency as a function of Si waveguide taper length for a Si waveguide tip width of 160 nm for three different wavelength channels.

FIG. 37 is a graphical representation 3700 of a simulation of TE and TM polarization coupling efficiency as a function of Si waveguide taper length for a Si waveguide tip width of 160 nm for three different wavelength channels at 1.35 μm, 1.31 μm, and 1.27 μm, arranged in accordance with at least one embodiment described herein. The tip width of 160 nm is selected as a compromise between 150 nm (below which TM coupling may be greater than 10%) and 180 nm (above which TE coupling efficiency may be less than 90%). For a tip width of 160 nm and a 1.35 μm wavelength channel, curve 3702A represents TE coupling efficiency while curve 3702B represents TM coupling efficiency. Analogously, for a tip width of 160 nm and a 1.31 μm wavelength channel, curve 3704A represents TE coupling efficiency while curve 3704B represents TM coupling efficiency. Analogously, for a tip width of 160 nm and a 1.27 μm wavelength channel, curve 3706A represents TE coupling efficiency while curve 3706B represents TM coupling efficiency. It can be seen from curves 3702A, 3702B, 3704A, 3704B, 3706A, and 3706B that at all three wavelength channels, the TE polarization (curves 3702A, 3704A, and 3706A) has a much better coupling efficiency than the TM polarization (curves 3702B, 3704B, and 3706B).

FIG. 37 additionally includes a table 3708 with various TE and TM polarization coupling efficiency values for the three wavelength channels at 1.35 μm, 1.31 μm, and 1.27 μm where the Si waveguide taper length is about 200 μm. For each wavelength channel, a ratio of TE polarization coupling efficiency to TM polarization coupling efficiency is also provided in units of decibels (dB).

The simulations of FIGS. 35-37 indicate that, at least in some embodiments, an adiabatic coupler region that includes a Si waveguide with a tip width between 130 nm to 180 nm, or between 150 nm to 180 nm, or at about 160 nm, may be used to selectively couple most of the TE polarization from the Si waveguide to the SiN waveguide (or vice versa) without coupling most of the TM polarization from the Si waveguide to the SiN waveguide (or vice versa). Two or more such adiabatic coupler regions may be combined as described in more detail with respect to FIGS. 38A-38C to form a Si PIC polarization splitter or combiner, such as the polarization splitter 3402 discussed above.

Figure 38A:
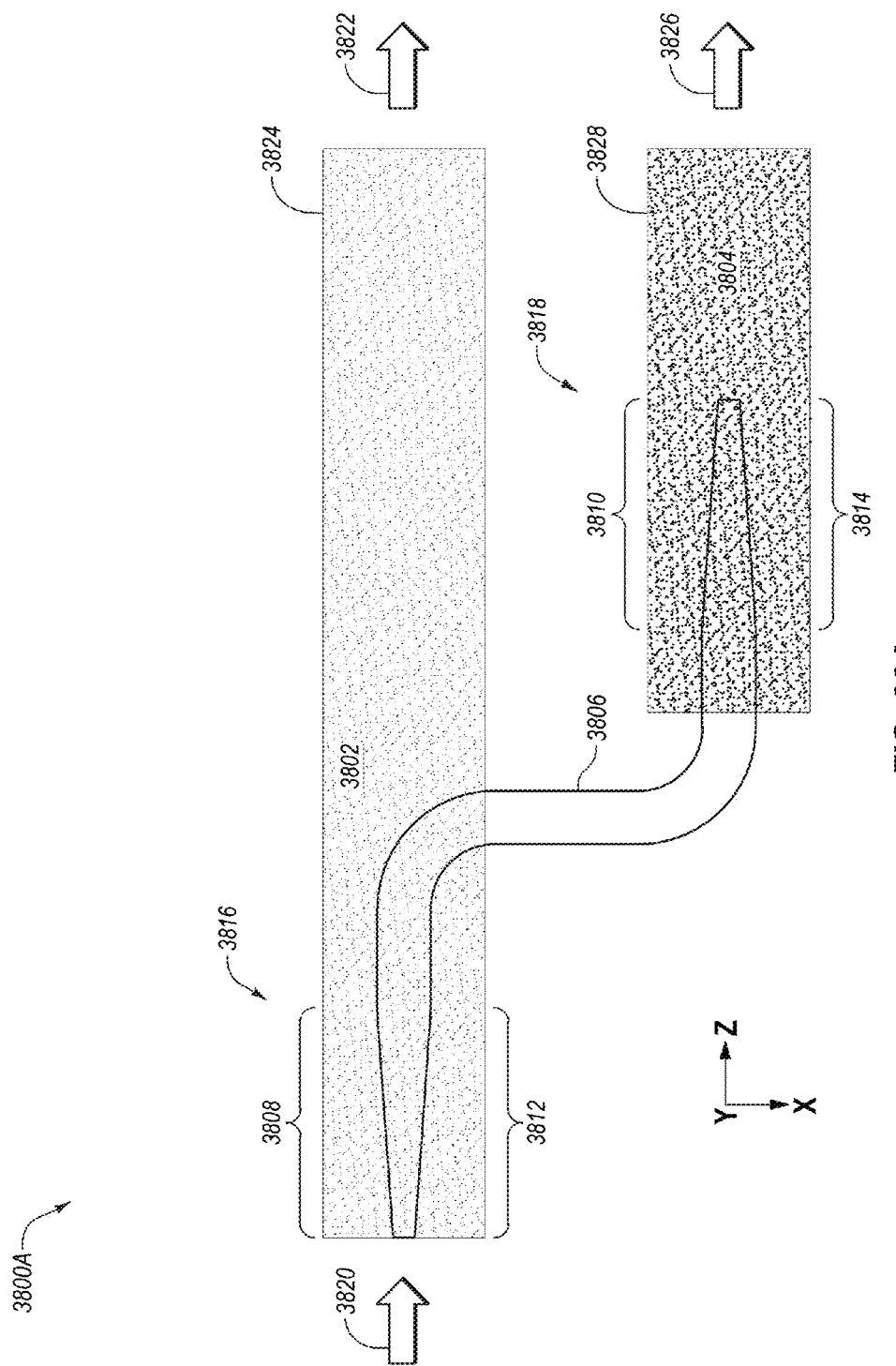
FIGS. 38A-38C illustrate example Si PIC polarization splitters or combiners (hereinafter collectively "polarization splitters")
Figure 38B:
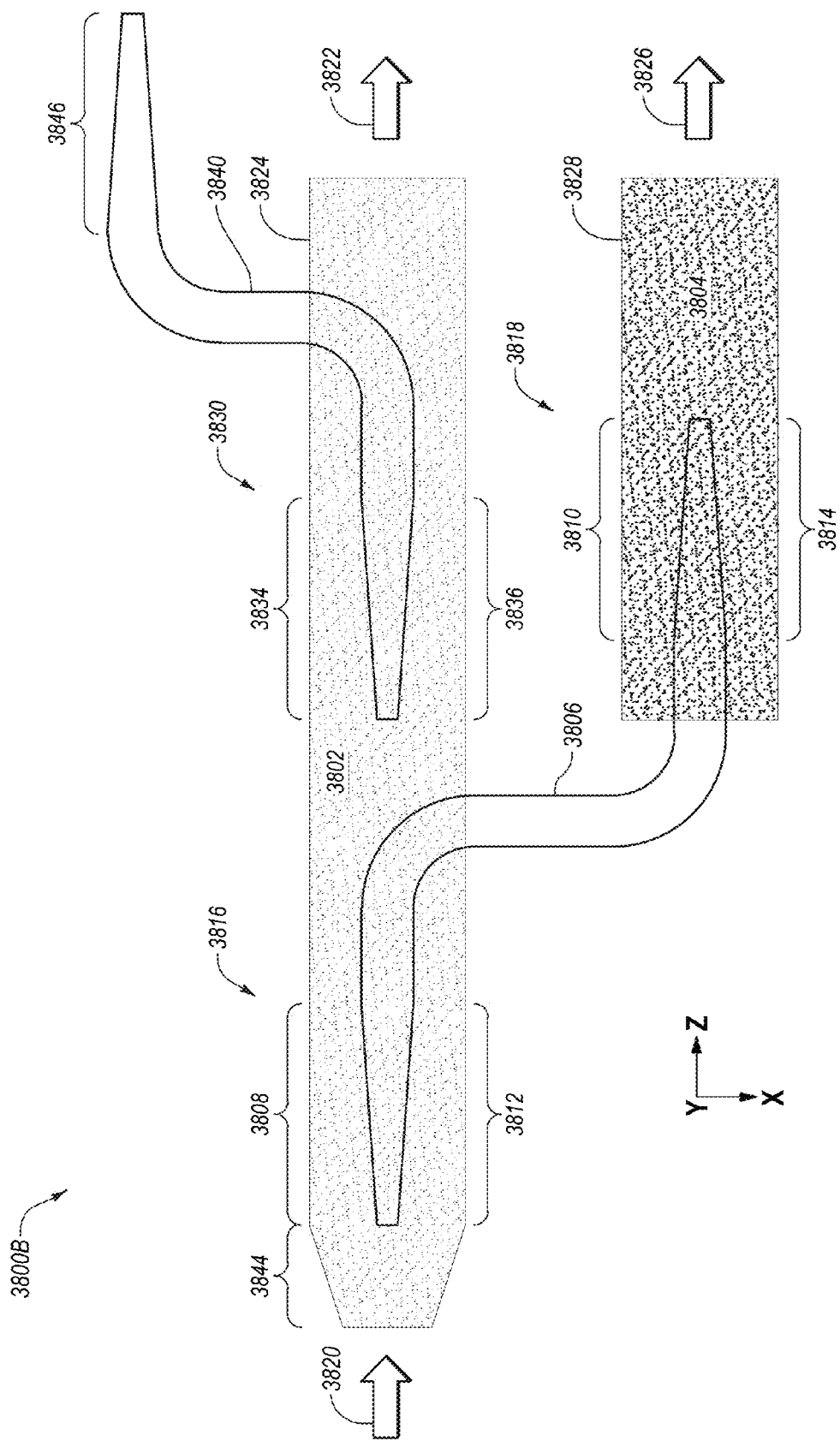
Figure 38C:
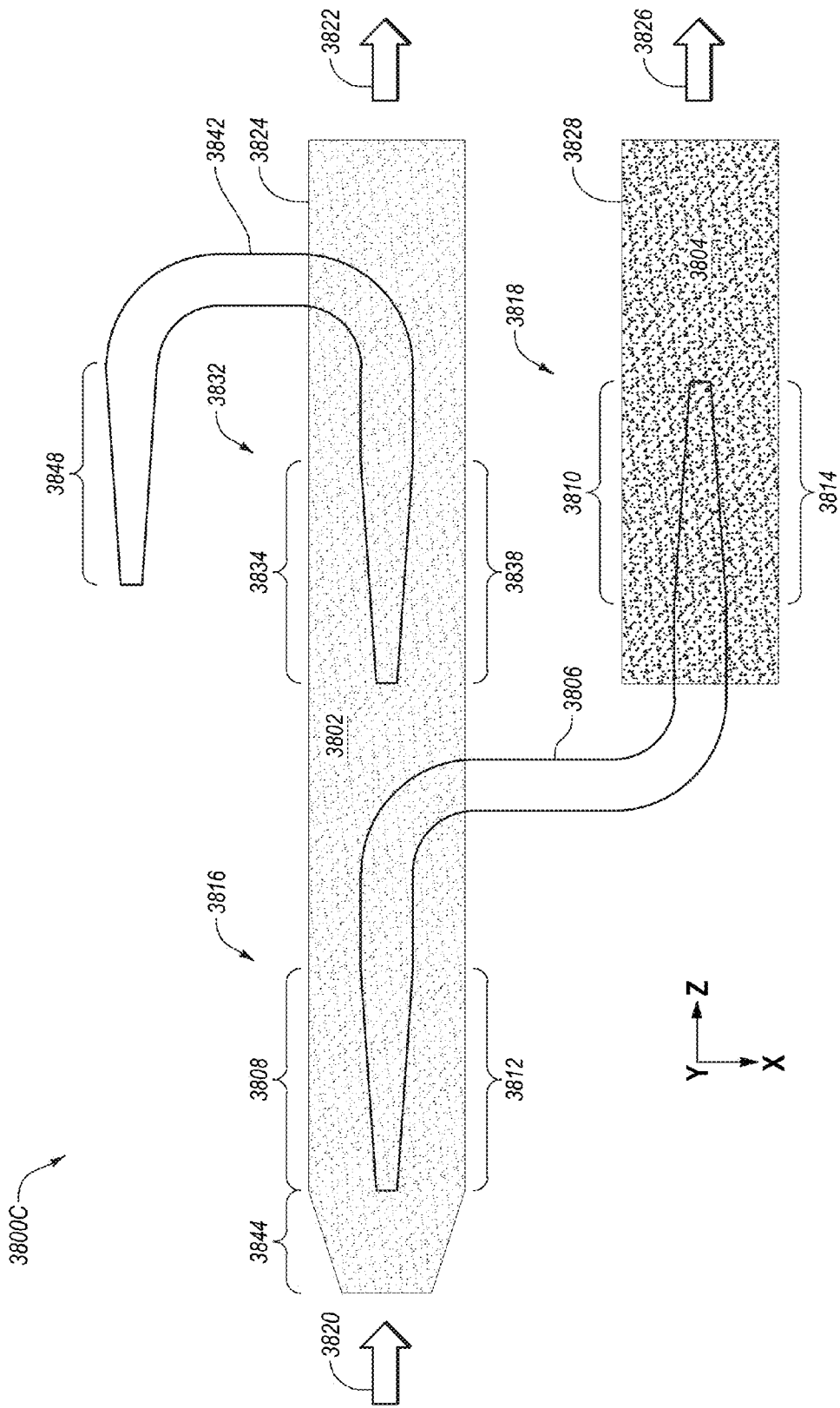

FIGS. 38A-38C illustrate example Si PIC polarization splitters or combiners 3800A, 3800B, and 3800C (hereinafter collectively "polarization splitters 3800"), arranged in accordance with at least one embodiment described herein. The polarization splitters 3800 may include or correspond to the polarization splitter 3402 of FIGS. 34A and 34B and may be implemented in the demultiplexer systems 3400 of FIGS. 34A and 34B and/or in other systems or devices.

FIGS. 38A-38C each include an overhead view of the polarization splitter 3800A, 3800B, or 3800C. The overhead views of FIGS. 38A-38C include outlines or footprints of various components of the polarization splitters 3800 at different levels in a material stack up of the polarization splitters 3800 that may not necessarily be visible when viewed from above, but are shown as outlines or footprints to illustrate x and z alignment of the various components with respect to each other.

Each of the polarization splitters 3800 includes a first SiN waveguide 3802, a second SiN waveguide 3804 spaced apart from the first SiN waveguide 3802, and a Si waveguide 3806. The first and second SiN waveguides 3802 and 3804 may be formed in a first layer of a Si PIC, such as any of the first layers with SiN waveguides described herein. The Si waveguide 3806 may be formed in a second layer of the Si PIC that is above or below the first layer of the Si PIC, such as any of the second layers with Si waveguides described herein.

The first SiN waveguide 3802 includes a coupler portion 3808, the second SiN waveguide 3804 includes a coupler portion 3810, and the Si waveguide 3806 includes a first tapered end 3812 and a second tapered end 3814. The first tapered end 3812 is aligned in two orthogonal directions (e.g., x and z) with the coupler portion 3808 of the first SiN waveguide 3802 such that the first tapered end 3812 overlaps in the two orthogonal directions and is parallel to the coupler portion 3808 of the first SiN waveguide 3802. The first tapered end 3812 and the coupler portion 3808 of the first SiN waveguide 3802 may generally form a first adiabatic coupler region 3816. Analogously, the second tapered end 3814 is aligned in two orthogonal directions (e.g., x and z) with the coupler portion 3810 of the second SiN waveguide 3804 such that the second tapered end 3814 overlaps in the two orthogonal directions and is parallel to the coupler portion 3810 of the second SiN waveguide 3804. The second tapered end 3814 and the coupler portion 3810 of the second SiN waveguide 3804 may generally form a second adiabatic coupler region 3818.

Each of the first and second tapered ends 3812 and 3814 of the Si waveguide 3806 may be configured to adiabatically couple most of a first polarization (e.g., TE polarization) of an input beam 3820 between a corresponding one of the first and second tapered ends 3812 and 3814 of the Si waveguide 3806 and a corresponding one of the first and second SiN waveguides 3802 and 3804 and to prevent most of a second polarization (e.g., TM polarization) of the input beam 3820 that is orthogonal to the first polarization from being adiabatically coupled between the corresponding one of the first and second tapered ends 3812 and 3814 and the corresponding one of the first and second SiN waveguides 3802 and 3804. The foregoing may be accomplished by providing each of the first and second tapered ends 3812 and 3814 of the Si waveguide 3806 with an appropriate tip width that generally discriminates between the first and second polarizations.

In more detail, the first tapered end 3812 of the Si waveguide 3806 may have a tip width configured to adiabatically couple most of the first polarization from the first SiN waveguide 3802 through the first tapered end 3812 to the Si waveguide 3806 and to prevent most of the second polarization from entering the Si waveguide 3806. For example, the first tapered end 3812 may have a tip width in a range between 130 nm and 180 nm, or in a range between 150 nm and 180 nm, or a tip width of about 160 nm. Analogously, the second tapered end 3814 of the Si waveguide 3804 may have a tip width configured to adiabatically couple most of a portion of the first polarization propagating through the Si waveguide 3806 from the Si waveguide 3806 through the second tapered end 3814 to the second SiN waveguide 3804 and to prevent most of a portion of the second polarization propagating through the Si waveguide 3806 from entering the second SiN waveguide 3804. For example, the second tapered end 3814 may have a tip width in a range between 130 nm and 180 nm, or in a range between 150 nm and 180 nm, or a tip width of about 160 nm. Accordingly, and consistent with FIGS. 35-37, a tip width of the first and second tapered ends 3812 and 3814 may be configured to selectively couple most of the first polarization of the input beam 3820 from the first SiN waveguide 3802 to the second SiN waveguide 3804 without coupling most of the second polarization from the first SiN waveguide 3802 to the second SiN waveguide 3804.

In the example of FIG. 38A, the Si waveguide 3806 may have a taper length of 200 nm (e.g., each of the first and second tapered ends 3812 and 3814 may be 200 nm long in a light propagation direction) and each of the first and second tapered ends 3812 and 3814 may have a tip width of 150 nm. Alternatively or additionally, the first and second SiN waveguides 3802 and 3804 may each have a width of 1 μm and each of the first and second tapered ends 3812 and 3814 may have a maximum width of 320 nm. In this example, and for a 1.31 μm wavelength channel, each of the first and second adiabatic coupler regions 3816 and 3818 may adiabatically couple about 98% of the TE polarization and about 10% of the TM polarization from one waveguide to the next (e.g., from the first SiN waveguide 3802 to the Si waveguide 3806 or from the Si waveguide 3806 to the second SiN waveguide 3804) and may prevent about 2% of the TE polarization and about 90% of the TM polarization from being adiabatically coupled from one waveguide to the next. As a result, in FIG. 38A, an output beam 3822 from an end 3824 of the first SiN waveguide 3802 may include about 2% of the TE polarization and about 90% of the TM polarization of the input beam 3820. Because an output beam 3826 from an end 3828 of the second SiN waveguide 3804 passes through both the first and the second adiabatic coupler regions 3816 and 3818, the output beam 3826 may include about 96% of the TE polarization and about 1% of the TM polarization of the input beam 3820.

In FIGS. 38B and 38C, each of the polarization splitters 3800B and 3800C additionally includes a third adiabatic coupler region 3830 or 3832 to improve a split ratio of the TE and TM polarizations in the output beam 3822 from the end 3824 of the first SiN waveguide 3802. The third adiabatic coupler region 3830 or 3832 may be made up of a second coupler portion 3834 of the first SiN waveguide 3802 and a tapered end 3836 or 3838 of a second Si waveguide 3840 or 3842. The second Si waveguide 3840 or 3842 may be formed in the same layer of the Si PIC as the Si waveguide 3806, or in a different layer of the Si PIC than the Si waveguide 3806.

Alternatively or additionally, the first SiN waveguide 3802 may include a tapered end 3844 upstream of the coupler portion 3808. In an example embodiment, the tapered end 3844 of the first SiN waveguide 3802 has a taper length (e.g., a length in the z direction) of about 50 μm. SiN waveguides in Si PICs according to some embodiments described herein may generally have a width (e.g., in the x direction) of about 0.7 μm or less, and may be referred to as standard SiN waveguides. In comparison, SiN waveguides in Si PIC polarization splitters such as the polarization splitters 3402 and 3800 described herein may have different widths than the standard SiN waveguides, e.g., widths of about 1 μm, and may be referred to as polarization splitter SiN waveguides. The tapered end 844 of the first SiN waveguide 3802 may serve as a transition from a standard SiN waveguide to the first SiN waveguide 3802 which is a polarization splitter SiN waveguide.

The tapered end 3836 or 3838 of the second Si waveguide 3840 or 3842 is aligned in two orthogonal directions (e.g., x and z) with the second coupler portion 3834 of the first SiN waveguide 3802 such that the tapered end 3836 or 3838 of the second Si waveguide 3840 or 3842 overlaps in the two orthogonal directions and is parallel to the second coupler portion 3834 of the first SiN waveguide 3802. The second Si waveguide 3840 in FIG. 38B generally includes an S shape, whereas the second Si waveguide 3842 in FIG. 38C generally includes a U shape. Other shapes may alternatively be implemented. In some embodiments, each of the second Si waveguides 3840 and 3842 includes a second tapered end 3846 or 3848 opposite the tapered end 3836 or 3838. In other embodiments, each of the second Si waveguides 3840 and 3842 terminates at a germanium (Ge) PIN detector rather than with the second tapered end 3846 or 3848.

Each of the tapered ends 3836 or 3838 of the second Si waveguide 3840 or 3842 may have an appropriate tip width to generally discriminate between the first and second polarizations. In more detail, the tapered end 3836 or 3838 of the second Si waveguide 3840 or 3842 may have a tip width configured to adiabatically couple most of the first polarization from the first SiN waveguide 3802 through the tapered end 3836 or 3838 to the second Si waveguide 3840 or 3842 and to prevent most of the second polarization from entering the second Si waveguide 3840 or 3842. For example, the tapered end 3836 or 3838 may have a tip width in a range between 130 nm and 180 nm, or in a range between 150 nm and 180 nm, or a tip width of about 160 nm. In some embodiments, the second tapered end 3846 or 3848 of the second Si waveguide 3840 or 3842 may similarly have a tip width in a range between 130 nm and 180 nm, or in a range between 150 nm and 180 nm, or a tip width of about 160 nm.

In the example of FIGS. 38B and 38C, the Si waveguide 3806 may have a taper length of 200 nm and each of the first and second tapered ends 3812 and 3814 may have a tip width of 160 nm. Alternatively or additionally, the second Si waveguide 3840 or 3842 may also have a taper length of 200 nm, each of the tapered end 3836 or 3838 and the second tapered end 3846 or 3848 may have a tip width of 160 nm, and the first and second SiN waveguides 3802 and 3804 may have a width of 1 µm. Alternatively or additionally, the first and second tapered ends 3812 and 3814 of the Si waveguide 3806, the tapered end 3836 or 3838 of the second Si waveguide 3840 or 3842, and/or the second tapered end 3846 or 3848 of the second Si waveguide 3840 or 3842 may have a maximum width of 320 nm. In this example, and for a 1.31 µm wavelength channel, each of the first, second, and third adiabatic coupler regions 3816, 3818, and 3830 or 3832 may adiabatically couple about 97.7% of the TE polarization and about 6.7% of the TM polarization from one waveguide to the next (e.g., from the first SiN waveguide 3802 to the Si waveguide 3806, from the Si waveguide 3806 to the second SiN waveguide 3804, or from the first SiN waveguide 3802 to the second Si waveguide 3840 or 3842) and may prevent about 2.3% of the TE polarization and about 93.3% of the TM polarization from being adiabatically coupled from one waveguide to the next. As a result, and because the output beam 3822 passes through both the first and third adiabatic coupler regions 3816 and 3830, the output beam 3822 from the end 3824 of the first SiN waveguide 3802 may include about 0.05% of the TE polarization and about 87% of the TM polarization of the input beam 3820. Also, because the output beam 3826 from the end 3828 of the second SiN waveguide 3804 passes through both the first and the second adiabatic coupler regions 3816 and 3818, the output beam 3826 may include about 95% of the TE polarization and about 0.5% of the TM polarization of the input beam 3820. As such, in the example of FIGS. 38B and 38C, the ratio of TM/TE in the output beam 3822 may be about 32 dB, and the ratio of TE/TM in the output beam 3826 may be about 23 dB. More generally, the tip widths of one or both of the first and second tapered ends 3812, 3814 of the Si waveguide 3806 may be configured to pass at least 80% of the TM polarization through the first SiN waveguide 3802 and to adiabatically pass at least 90% of the TE polarization from the first SiN waveguide 3802 to the second SiN waveguide 3804.

Alternatively or additionally, one or more of the polarization splitters 3800 may be implemented as a polarization combiner. In these and other embodiments, a TM input beam may be received at the end 3824 of the first SiN waveguide 3802 and a TE input beam may be received at the end 3828 of the second SiN waveguide 3804. In this example, the second tapered end 3814 of the Si waveguide 3806 may have a tip width in a range between 130 nm and 180 nm, or even less than 130 nm. The first tapered end 3812 of the Si waveguide 3806 may have a tip width in a range between 130 nm and 180 nm, or in a range between 150 nm and 180 nm, or a tip width of about 160 nm. The TM input beam may propagate through the first SiN waveguide 3802 from right to left. The TE input beam may propagate through the second SiN waveguide 3804 from right to left and may be adiabatically coupled through the adiabatic coupler region 3818 into the Si waveguide 3806 and through the adiabatic coupler region 3816 into the first SiN waveguide 3802 where it is combined with the TM input.

Figure 39A:
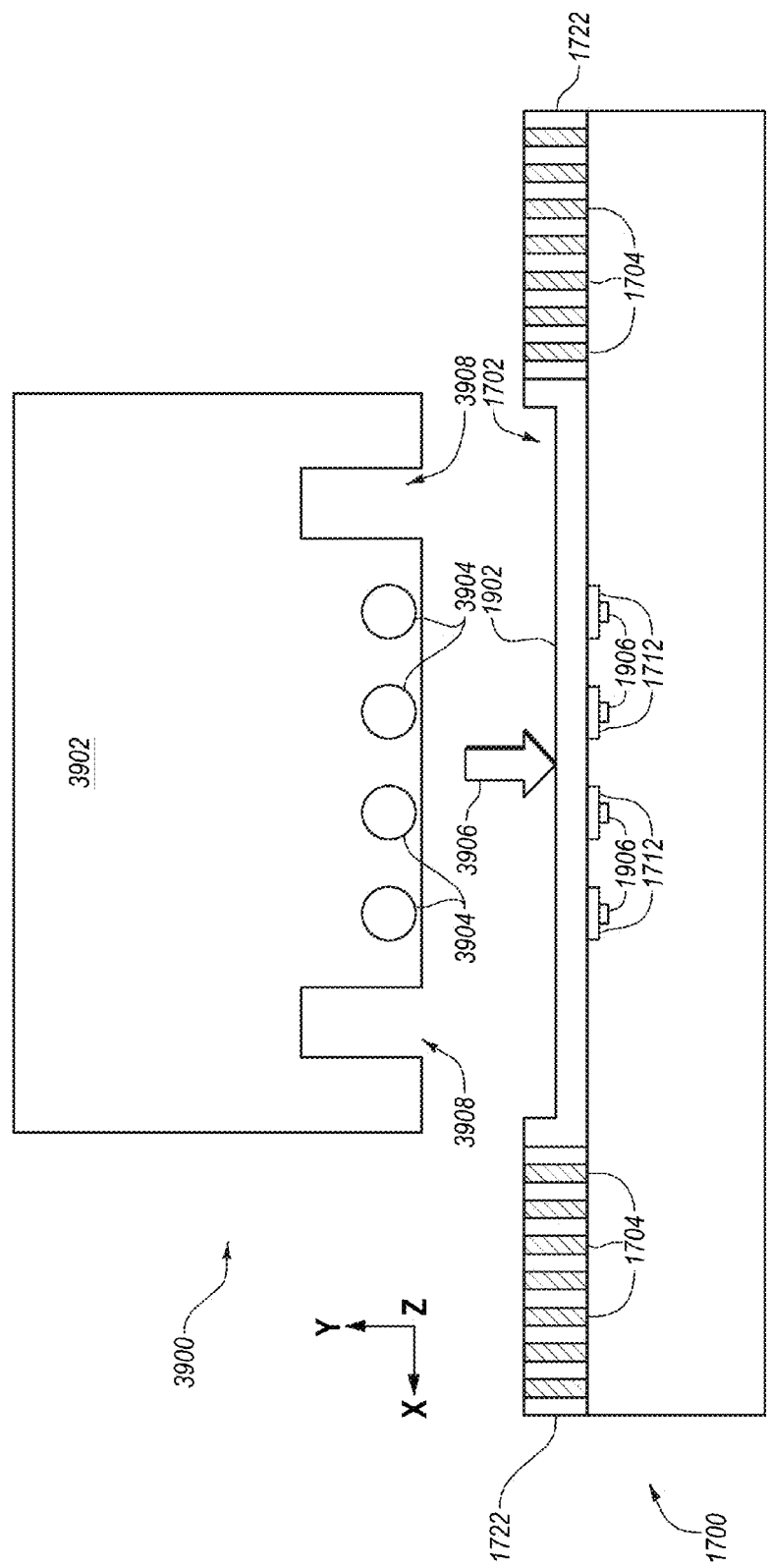
FIGS. 39A and 39B include side views that depict alignment and attachment of a high index glass interposer (hereinafter "interposer") and the Si PIC of FIG. 17.
Figure 39B:
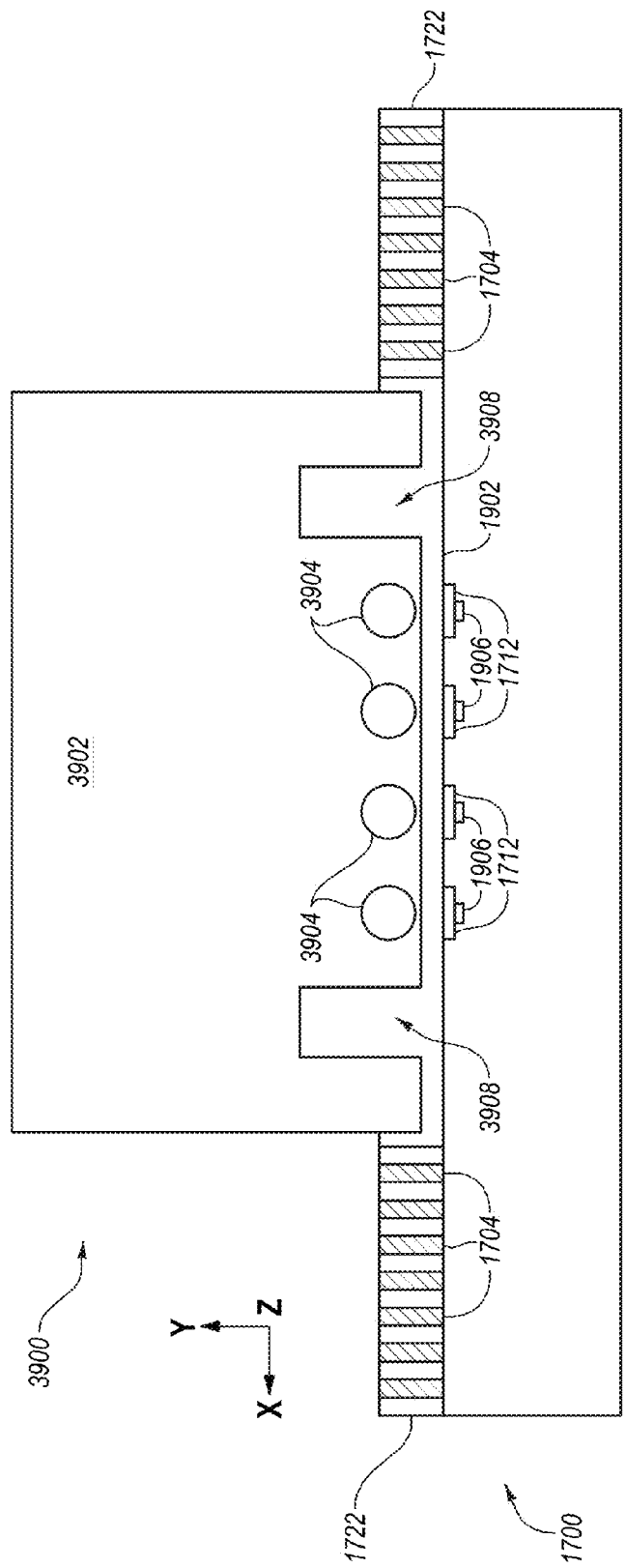

FIGS. 39A and 39B include side views that depict alignment and attachment of a high index glass interposer 3900 (hereinafter "interposer 3900") and the Si PIC 1700 of FIG. 17, arranged in accordance with at least one embodiment described herein. The interposer 3900 includes a high index glass waveguide block 3902 and one or more interposer waveguides 3904. The interposer waveguides 3904 may include high index glass waveguides that may be written into the high index glass waveguide block 3902, e.g., by ion exchange method or UV laser writing or other suitable index altering radiation or process.

As illustrated in FIG. 39A, the interposer 3900 is aligned to the etched window 1702 of the Si PIC 1700 with the interposer cores 3904 generally aligned in the x and z directions with the SiN waveguides 1712 of the Si PIC 1700 in the manner described above to form adiabatic coupler regions. The etched window 1702 may be at least partially filled with the epoxy underfill 1902. As illustrated in FIG. 39A, the interposer 3900 may then be moved towards the Si PIC 1700 (or vice versa) as indicated by the arrow 3906 until the interposer cores 3904 are in direct or at least close contact with the SiN waveguides 1712 of the Si PIC 1700.

In the illustrated embodiment, the high index glass waveguide block 3902 defines one or more holes or grooves 3908 that extend vertically from a bottom surface of the high index glass waveguide block 3902, e.g., in the positive y direction. Each of the holes or grooves 3908 may have a height (e.g., in the y direction) of 15 µm to 20 µm, or some other height. Each of the holes or grooves may extend a length (e.g., in the z direction) of a portion of the interposer 3900 configured to be received within the etched window 1702. The portion of the interposer 3900 configured to be received within the etched window 1702 may be between 2 mm to 3 mm in length in some embodiments. Alternatively or additionally, a width in the x direction of the interposer 3900 may be about 1.5 mm in some embodiments.

When the interposer 3900 is inserted into the etched window 1702 of the Si PIC 1700, the interposer 3900 may be pressed sufficiently tight against the Si PIC 1700 to at least partially displace the epoxy underfill 902 and thin it out so there is relatively little epoxy underfill 1902 between the interposer waveguides 3904 and the SiN waveguides 1712. For instance, a thickness (e.g., in the y direction) of the epoxy underfill 1902 in the attached configuration of FIG. 39B may be less than 1 µm. The displaced epoxy underfill 1902 may at least partially fill the holes 3908 to achieve good adhesion of the interposer 3900 to the Si PIC 1700.

Figure 40A:
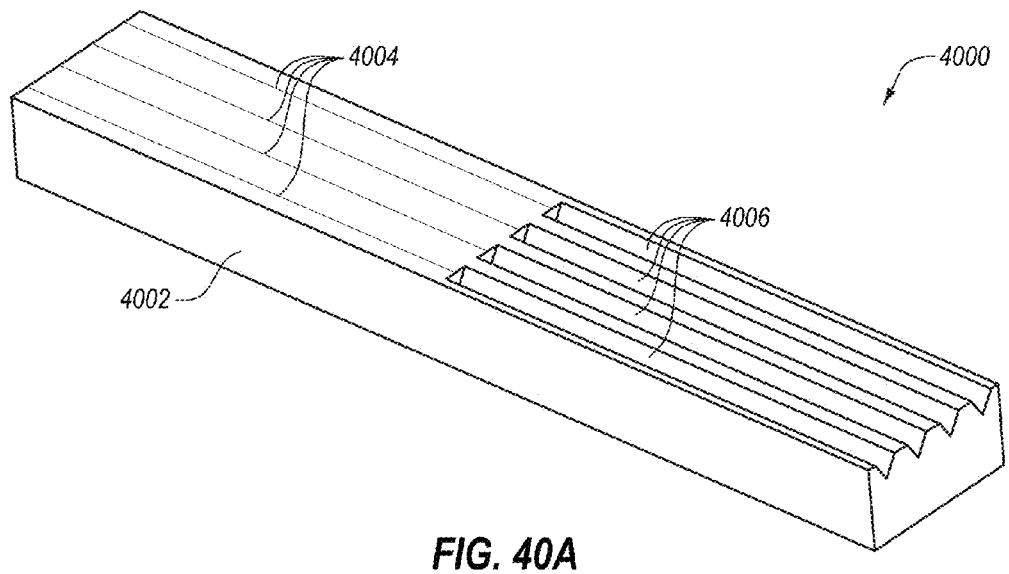
FIG. 40A includes an upside down perspective view of another high index glass interposer (hereinafter "interposer")

FIG. 40A includes an upside down perspective view of another high index glass interposer 4000 (hereinafter "interposer 4000"), arranged in accordance with at least one embodiment described herein. The interposer 4000 includes a high index glass waveguide block 4002 and one or more interposer waveguides 4004. The interposer waveguides 4004 may include high index glass waveguides that may be written into the high index glass waveguide block 4002, e.g., by ion exchange, UV laser writing, or other suitable index altering radiation or process. The interposer 4000 additionally defines v-grooves 4006 longitudinally adjacent to the interposer waveguides 4004.

Figure 40B:
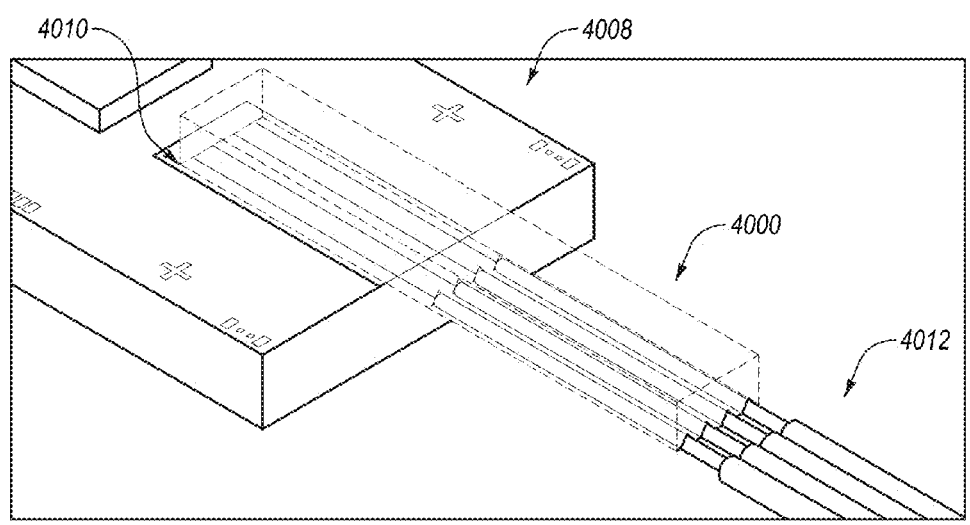
FIG. 40B includes a perspective view of the interposer of FIG. 40A adiabatically coupled to a Si PIC 4008, all arranged in accordance with at least one embodiment described herein.

FIG. 40B includes a perspective view of the interposer 4000 adiabatically coupled to a Si PIC 4008, arranged in accordance with at least one embodiment described herein. The interposer 4000 is illustrated in FIG. 40B as being transparent to allow the interposer waveguides 4004 and the v-grooves 4006 generally on a bottom surface of the interposer 4000 to be perceived. As can be seen from FIG. 40B, the interposer waveguides 4004 are generally disposed within an etched window 4010 defined through one or more dielectric layers of the Si PIC above a first layer of the Si PIC 4008. The first layer may include one or more SiN waveguides to which the interposer waveguides 4004 are adiabatically coupled within the etched window 4010.

FIG. 40B additionally illustrates optical fibers 4012 to which the interposer waveguides 4004 may be optically coupled. In particular, ends of the optical fibers may be stripped of a jacket and/or waveguide cladding such that optical fiber cores of the optical fibers 4012 are positioned within the v-grooves 4006. Insofar as the v-grooves 4006 may generally be optically aligned to the interposer waveguides 4004, positioning the optical fibers 4012 such that their optical fiber cores are positioned within the v-grooves 4006 may generally optically align each of the optical fibers 4012 to a corresponding one of the interposer waveguides 4004.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A photonic system comprising a silicon (Si) photonic integrated circuit (PIC) that includes:
   a Si substrate,
   a silicon dioxide (SiO$_2$) box formed on the Si substrate;
   a first layer formed above the SiO$_2$ box, the first layer including a silicon nitride (SiN) waveguide with a coupler portion at a first end and a tapered end opposite the first end; and
   a second layer formed above the SiO$_2$ box and vertically displaced above or below the first layer, the second layer including a Si waveguide with a tapered end aligned in two orthogonal directions with the coupler portion of the SiN waveguide such that the tapered end of the Si waveguide overlaps in the two orthogonal directions and is parallel to the coupler portion of the SiN waveguide, wherein the two orthogonal directions correspond to a length direction and a width direction of the Si and SiN waveguides;

wherein:
   the Si PIC defines an etched window through one or more layers above the first layer down to the first layer at least above the tapered end of the SiN waveguide; and
   the etched window is configured to receive at least a portion of an interposer that includes an interposer waveguide with a coupler portion configured to be positioned above the tapered end of the SiN waveguide and aligned in the two orthogonal dimensions with the tapered end of the SiN waveguide such that the coupler portion of the interposer waveguide overlaps in the two orthogonal directions and is parallel to the tapered end of the SiN waveguide.

2. The photonic system of claim 1, wherein:
the SiN waveguide is one of a plurality of SiN waveguides;
the plurality of SiN waveguides comprise a subset of transmit SiN waveguides and a subset of receive SiN waveguides;
ends of the plurality of SiN waveguides are exposed within the etched window in a plane that is parallel to a plane defined by the two orthogonal directions;
ends of the subset of transmit SiN waveguides terminate at a first location in a first one of the two orthogonal directions that is parallel to a length of each of the plurality of SiN waveguides;
ends of the subset of receive SiN waveguides terminate, in the first one of the two orthogonal directions, at a second location that is different than the first location; and
in a second one of the two orthogonal directions:
   the ends of the subset of transmit Si waveguides alternate with the ends of the subset of receive Si waveguides; or
   the ends of the subset of transmit Si waveguides as a group are located next to the ends of the subset of receive Si waveguides as a group.

3. The photonic system of claim 1, further comprising a wavelength division multiplexer or a wavelength division demultiplexer formed from SiN in the first layer of the Si PIC.

4. The photonic system of claim 1, wherein:
the Si PIC further includes a wavelength division multiplexer (WDM mux) or wavelength division demultiplexer (WDM demux) formed in the first layer in a wavelength division multiplexing (WDM) region of the Si PIC;
the SiN waveguide includes a first SiN waveguide that includes the coupler portion of the SiN waveguide and a second SiN waveguide in the WDM region that is optically coupled to the first SiN waveguide through the WDM mux or WDM demux;
along a length of the second SiN waveguide, the second SiN waveguide includes a square cross-section surrounded on all four sides by SiO$_2$.

5. The photonic system of claim 4, wherein:
the second layer is formed above the first layer such that the second layer that includes the Si waveguide is vertically displaced above the first layer that includes the first and second SiN waveguides;
one or more first SiO$_2$ layers formed above and in contact with the first layer have an aggregate thickness greater than 330 nanometers;

the SiO₂ box is below and in contact with the first layer that includes the first and second SiN waveguides and has an aggregate thickness greater than 200 nanometers; and along the length of the second SiN waveguide, the square cross-section of the second SiN waveguide is about 500 nanometers by about 500 nanometers.

6. The photonic system of claim 4, wherein:

the second layer is formed below the first layer such that the second layer that includes the Si waveguide is vertically displaced below the first layer that includes the first and second SiN waveguides;

one or more first SiO₂ layers formed above and in contact with the first layer have an aggregate thickness greater than 200 nanometers;

one or more second SiO₂ layers formed below and in contact with the first layer have an aggregate thickness greater than 330 nanometers; and along the length of the second SiN waveguide, the square cross-section of the second SiN waveguide is about 500 nanometers by about 500 nanometers.

7. The photonic system of claim 1, wherein:

the etched window is laterally bounded on three sides by the one or more layers of the Si PIC that are above the first layer; and a top layer included in the one or more layers of the Si PIC includes a plurality of metal dummies at least in a region of the top layer that bounds the etched window.

8. The photonic system of claim 7, wherein:

the SiN waveguide is one of a plurality of SiN waveguides included in the first layer of the Si PIC;

the plurality of SiN waveguides each include a tapered end exposed in the etched window;

the interposer waveguide is one of a plurality of interposer waveguides of the interposer;

the plurality of interposer waveguides each include a coupler portion configured to be positioned above a corresponding tapered end of a corresponding one of the plurality of SiN waveguides within the etched window and aligned in two orthogonal directions with the corresponding tapered end of the corresponding one of the plurality of SiN waveguides; and a width of the etched window is equal or approximately equal to N times X, where N is a number of the plurality of polymer waveguides and X is a core center-to-core center spacing of the plurality of polymer waveguides.

9. The photonic system of claim 8, wherein:

the interposer further includes a first interposer alignment ridge and a second interposer alignment ridge;

the Si PIC defines a first anchor window through the one or more layers above the first layer and disposed to a first side of the etched window and a second anchor window through the one or more layers above the first layer and disposed to a second side of the etched window that is opposite the first side of the etched window;

a shape and location of the first and second interposer alignment ridges is complementary to a shape and location of the first and second anchor windows;

the first and second interposer alignment ridges are respectively configured to be received in the first and second anchor windows; and alignment of the first and second interposer alignment ridges to be received within the first and second anchor windows aligns each coupler portion of each corresponding one of the plurality of interposer waveguides to the corresponding tapered end of the corresponding one of the plurality of SiN waveguides.

10. A silicon (Si) photonic integrated circuit (PIC), comprising:

a Si substrate;

a silicon dioxide (SiO₂) box formed on the Si substrate;

a first layer formed above the SiO₂ box, the first layer including a silicon nitride (SiN) waveguide with a coupler portion at a first end and a tapered end opposite the first end; and a second layer formed above the SiO₂ box and below the first layer, the second layer including a Si waveguide with a tapered end aligned in two orthogonal directions with the coupler portion of the SiN waveguide such that the tapered end of the Si waveguide overlaps in the two orthogonal directions and is parallel to the coupler portion of the SiN waveguide, wherein the two orthogonal directions correspond to a length direction and a width direction of the Si and SiN waveguides;

wherein in a vertical direction that is orthogonal to a plane defined by the two orthogonal directions, a total thickness of all layers of the Si PIC between a top of the Si substrate and a bottom of the first layer that includes the SiN waveguide is at least 1.2 micrometers.

11. The Si PIC of claim 10, wherein in a vertical direction that is orthogonal to a plane defined by the two orthogonal directions, the SiO₂ box has a thickness in a range of 2 micrometers plus or minus 10%.

12. The Si PIC of claim 10, wherein in a vertical direction that is orthogonal to a plane defined by the two orthogonal directions:

the first layer that includes the SiN waveguide has a thickness of about 0.6 to 0.7 micrometers.

the SiO₂ box has a thickness of about 0.6-0.8 micrometers the second layer has a thickness of about 0.3 micrometers; and a thickness of a SiO₂ layer of the Si PIC positioned between the first layer and the second layer is about 0.15 to 0.25 micrometers.

13. A silicon (Si) photonic integrated circuit (PIC), comprising:

a Si substrate;

a silicon dioxide (SiO₂) box formed on the Si substrate;

a first layer formed above the SiO₂ box, the first layer including a silicon nitride (SiN) waveguide with a tapered end;

a second layer formed above the SiO₂ box and below the first layer, the second layer including a Si waveguide with a tapered end; and a third layer formed between the first layer and the second layer, the third layer including a SiN transition waveguide with a coupler portion at a first end and a tapered end opposite the first end, wherein:

the tapered end of the SiN transition waveguide is aligned in two orthogonal directions with the tapered end of the SiN waveguide such that the tapered end of the SiN transition waveguide overlaps in the two orthogonal directions and is parallel to the tapered end of the SiN waveguide; and the tapered end of the Si waveguide is aligned in two orthogonal directions with the coupler portion of the SiN transition waveguide such that the tapered end of the Si waveguide overlaps in the two orthogonal directions and is parallel to the coupler portion of the SiN transition waveguide.

14. The Si PIC of claim 13, wherein in a vertical direction that is orthogonal to a plane defined by the two orthogonal directions, a total thickness of all layers of the Si PIC between a top of the Si substrate and a bottom of the first layer that includes the SiN waveguide is at least 1.2 micrometers.

15. The Si PIC of claim 13, wherein:
the two orthogonal directions include a light propagation direction and a transverse direction;
a width in the transverse direction of the coupler portion of the SiN transition waveguide is in a range from 1 micrometer to 2 micrometers; and
a width in the transverse direction of the SiN waveguide, excluding the tapered end of the SiN waveguide, is in a range from 0.6 micrometers to 1 micrometer.

16. The Si Pic of claim 14, wherein in a vertical direction that is orthogonal to a plane defined by the two orthogonal directions, the SiN waveguide and the SiN transition waveguide each have a thickness in a range of 0.5 micrometers plus or minus 10%.

17. The Si PIC of claim 14, wherein the total thickness of all layers of the Si PIC between the top of the Si substrate and the bottom of the first layer that includes the SiN waveguide is 1.6 micrometers plus or minus 10%.

18. The Si PIC of claim 13, wherein:
the two orthogonal directions include a light propagation direction and a transverse direction; and
a dual taper region that includes the tapered end of the SiN waveguide and the tapered end of the SiN transition waveguide has a length in the light propagation direction of at least 20 micrometers.

19. A silicon (Si) photonic integrated circuit (PIC), comprising:
a Si substrate,
a silicon dioxide (SiO$_2$) box formed on the Si substrate;
a first layer formed above the SiO$_2$ box, the first layer including a silicon nitride (SiN) waveguide with an untapered end portion and a tapered end that begins where the untapered end portion of the SiN waveguide ends;
a second layer formed above the SiO$_2$ box and below the first layer, the second layer including a Si waveguide with an untapered end portion and a tapered end that begins where the untapered end portion of the Si waveguide ends;
wherein:
the untapered end portion of the SiN waveguide is aligned in two orthogonal directions with the tapered end of the Si waveguide such that the untapered end portion of the SiN waveguide overlaps in the two orthogonal directions and is parallel to the tapered end of the Si waveguide; and
the tapered end of the SiN waveguide is aligned in the two orthogonal directions with the untapered end portion of the Si waveguide such that the tapered end of the SiN waveguide overlaps in the two orthogonal directions and is parallel to the untapered end portion of the Si waveguide.

20. The Si PIC of claim 19, further comprising an Echelle grating wavelength division demultiplexer (WDM demux) formed in the first layer with an output coupled to the untapered end portion of the SiN waveguide, wherein the Si waveguide is configured to accept a multimode optical signal from the SiN waveguide that is received from the output of the Echelle grating.

21. The Si PIC of claim 19, wherein:
the two orthogonal directions include a light propagation direction and a transverse direction;
the untapered end portion of the SiN waveguide and the tapered end of the Si waveguide overlap in the light propagation direction in a first region;
the tapered end of the SiN waveguide and the untapered end portion of the Si waveguide overlap in the light propagation direction in a second region longitudinally adjacent to the first region;
a length of the first region in the light propagation direction is at least 90 micrometers;
a length of the second region in the light propagation direction is 10 micrometers;
in the first region, a width in the transverse direction of the Si waveguide tapers along the light propagation direction from 0.08 micrometers to at least 1 micrometer; and
in the second region, a width in the transverse direction of the SiN waveguide tapers along the light propagation direction from at least 1.5 micrometers to 0.2 micrometers.

22. A coupled system, comprising:
a silicon (Si) photonic integrated circuit (PIC), comprising:
a Si substrate,
a silicon dioxide (SiO$_2$) box formed on the Si substrate;
a first layer formed above the SiO$_2$ box, the first layer including a first silicon nitride (SiN) waveguide with an untapered end portion and a tapered end that begins where the untapered end portion of the first SiN waveguide ends, the first layer further including a second SiN waveguide with a tapered end; and
a second layer formed above the SiO$_2$ box and below the first layer, the second layer including a Si waveguide with an untapered end portion and a tapered end that begins where the untapered end portion of the Si waveguide ends; and
an interposer comprising an interposer waveguide;
wherein:
the untapered end portion of the first SiN waveguide is aligned in two orthogonal directions with the tapered end of the Si waveguide such that the untapered end portion of the first SiN waveguide overlaps in the two orthogonal directions and is parallel to the tapered end of the Si waveguide;
the tapered end of the first SiN waveguide is aligned in the two orthogonal directions with the untapered end portion of the Si waveguide such that the tapered end of the first SiN waveguide overlaps in the two orthogonal directions and is parallel to the untapered end portion of the Si waveguide; and
the tapered end of the second SiN waveguide is adiabatically coupled to a coupler portion of the interposer waveguide.

23. The Si PIC of claim 22, further comprising an Echelle grating wavelength division demultiplexer (WDM demux) formed in the first layer, wherein:
an output of the Echelle grating WDM demux is optically coupled to the untapered end portion of the first SiN waveguide;
the Si waveguide is configured to accept a multimode optical signal from the first SiN waveguide that is received from the output of the Echelle grating; and
an input of the Echelle grating WDM demux is coupled to the second SiN waveguide to receive an optical signal adiabatically coupled from the interposer waveguide to the second SiN waveguide.

* * * * *